US012178363B2

(12) United States Patent
Yang et al.

(10) Patent No.: US 12,178,363 B2
(45) Date of Patent: Dec. 31, 2024

(54) CLEANING SUPPLY HOLDERS AND DISPENSERS

(71) Applicant: simplehuman, LLC, Torrance, CA (US)

(72) Inventors: Frank Yang, Rancho Palos Verdes, CA (US); Joseph Sandor, Newport Beach, CA (US); Myk Wayne Lum, Irvine, CA (US); Adam C. Wade, Rancho Santa Margarita, CA (US)

(73) Assignee: simplehuman, LLC, Torrance, CA (US)

( * ) Notice: Subject to any disclaimer, the term of this patent is extended or adjusted under 35 U.S.C. 154(b) by 0 days.

(21) Appl. No.: 18/316,992

(22) Filed: May 12, 2023

(65) Prior Publication Data

US 2024/0374089 A1 Nov. 14, 2024

(51) Int. Cl.
*A47K 5/12* (2006.01)
*A47K 10/38* (2006.01)
*B05B 9/04* (2006.01)

(52) U.S. Cl.
CPC ............ *A47K 10/3836* (2013.01); *A47K 5/12* (2013.01); *B05B 9/0403* (2013.01)

(58) Field of Classification Search
CPC ..... A47K 10/3836; A47K 5/12; B05B 9/0403
See application file for complete search history.

(56) References Cited

U.S. PATENT DOCUMENTS 1,255,772 A 2/1918 Miller
1,582,645 A 4/1926 Findley
(Continued)

FOREIGN PATENT DOCUMENTS

DE 102020008002 A1 * 9/2021
EP 1749581 A1 2/2007
(Continued)

OTHER PUBLICATIONS

Extended Search Report in corresponding European Patent Application No. 21214362.2, dated May 19, 2022, in 6 pages.
(Continued)

*Primary Examiner* — Bob Zadeh
(74) *Attorney, Agent, or Firm* — Knobbe Martens Olson & Bear LLP

(57) ABSTRACT

A device may include an enclosure configured to receive, store, and dispense a cleaning fluid. A device may include a support base, wherein the enclosure and support base can be configured to support a roll of cleaning wipes in a manner that permits the roll to rotate when one or more cleaning wipes are removed from the roll, wherein the enclosure is configured to be securely attached to the support base by pushing the enclosure downward onto an attachment region of the support base; and wherein the enclosure is configured to be released from the support base by pushing the enclosure downward. A liquid dispenser can have an elongate interior reservoir, a protruding carry loop, and an engagement zone with contours that engage with a latch in a paper-towel holder. The dispenser can have a spray trigger underneath the carry loop and a protruding roll stop. It can be sized to fit within a cylindrical cardboard tube configured to hold paper towels. A paper-towel holder can support and engage a liquid dispenser. The holder can have a stable base with a central latch, and a flat surface to support a paper towel roll.

24 Claims, 36 Drawing Sheets

(56) References Cited

U.S. PATENT DOCUMENTS

| | | | | |
|---|---|---|---|---|
| 4,436,224 | A * | 3/1984 | McInerny | A47K 10/32 222/181.2 |
| D306,809 | S | 3/1990 | Joseph | |
| 5,297,750 | A | 3/1994 | Hung | |
| 5,671,872 | A | 9/1997 | Daniels | |
| 5,819,989 | A | 10/1998 | Saraceni | |
| D432,828 | S | 10/2000 | Snell | |
| 6,138,874 | A | 10/2000 | Audrey | |
| 6,216,920 | B1 | 4/2001 | Baggett | |
| 6,431,405 | B2 | 8/2002 | Irwin | |
| D479,072 | S | 9/2003 | Duncan et al. | |
| 6,644,563 | B2 * | 11/2003 | Presson | B05B 11/0005 239/289 |
| D499,915 | S | 12/2004 | Snell | |
| D520,278 | S | 5/2006 | Mariano | |
| D522,292 | S | 6/2006 | Goodman | |
| D522,293 | S | 6/2006 | Yang | |
| D523,268 | S | 6/2006 | Goodman | |
| D523,672 | S | 6/2006 | Yang | |
| D530,549 | S | 10/2006 | Yang | |
| 7,140,573 | B1 | 11/2006 | Jerstroem et al. | |
| D545,599 | S | 7/2007 | Yu | |
| D548,504 | S | 8/2007 | Yang | |
| D555,954 | S | 11/2007 | Yang | |
| D562,042 | S | 2/2008 | Shek | |
| D563,130 | S | 3/2008 | Griffith | |
| 7,556,179 | B2 | 7/2009 | Yang et al. | |
| D609,949 | S | 2/2010 | Yang | |
| D610,382 | S | 2/2010 | Yang et al. | |
| 7,743,947 | B2 * | 6/2010 | Flasch | A47L 13/51 222/383.1 |
| D635,808 | S | 4/2011 | Gordon | |
| 8,096,445 | B2 | 1/2012 | Yang et al. | |
| D672,590 | S | 12/2012 | Yang et al. | |
| 8,371,479 | B2 | 2/2013 | Luft | |
| D761,039 | S | 7/2016 | Locker | |
| D778,634 | S | 2/2017 | Locker | |
| 10,004,374 | B2 | 6/2018 | Schildmeier | |
| 10,076,216 | B2 | 9/2018 | Yang et al. | |
| 10,527,224 | B1 * | 1/2020 | Park | F16M 13/02 |
| D878,077 | S | 3/2020 | Goodman | |
| D880,891 | S | 4/2020 | Zhou | |
| 10,806,305 | B2 | 10/2020 | Yang et al. | |
| D916,489 | S | 4/2021 | Stefani | |
| D935,215 | S | 11/2021 | Liang | |
| D935,216 | S | 11/2021 | Liang | |
| D964,772 | S | 9/2022 | He | |
| D966,006 | S | 10/2022 | Gao | |
| 11,910,969 | B2 | 2/2024 | Yang et al. | |
| 2002/0079380 | A1 | 6/2002 | Presson | |
| 2007/0034650 | A1 | 2/2007 | Pulch et al. | |
| 2007/0194168 | A1 | 8/2007 | Yang | |
| 2007/0262191 | A1 | 11/2007 | Amron | |
| 2008/0011331 | A1 | 1/2008 | Flasch | |
| 2009/0101665 | A1 | 4/2009 | Mulhern | |
| 2010/0301136 | A1 | 12/2010 | Scott | |
| 2011/0315715 | A1 * | 12/2011 | Ophardt | A47K 10/3818 242/597.5 |
| 2015/0196173 | A1 | 7/2015 | Hoefte et al. | |
| 2015/0366416 | A1 | 12/2015 | Hoefte et al. | |
| 2017/0266678 | A1 * | 9/2017 | Harrington | B05B 11/0035 |
| 2019/0329276 | A1 | 10/2019 | Simard | |
| 2022/0183509 | A1 | 6/2022 | Yang et al. | |
| 2022/0225845 | A1 * | 7/2022 | Steinmetz | F16M 13/022 |

FOREIGN PATENT DOCUMENTS

| | | | |
|---|---|---|---|
| EP | 4014824 | A1 | 6/2022 |
| JP | 2000309405 | A * | 11/2000 |
| WO | WO 2015/195604 | A1 | 12/2015 |

OTHER PUBLICATIONS

Office Action in corresponding EP Patent Application No. 21214362.2, dated Jun. 4, 2024, in 10 pages.
Extended Search Report in corresponding European Patent Application No. 23179179.9, dated Nov. 20, 2023, in 7 pages.
Simplehuman website, paper towel pump, Feb. 18, 2023, https://www.simplehuman.com/products/paper-towel-pump (Year: 2023).

* cited by examiner

CLEANING SUPPLY HOLDERS AND DISPENSERS

BACKGROUND

Field

This disclosure relates generally to dispensers and supports for commonly-accessed items. For example, sanitizing devices and materials such as paper towels and liquid sanitizers can be stored and dispensed in an efficient and convenient manner.

Related Art

Paper towels can be held in place using elongate structures that are inserted into the cardboard tube upon which paper towels are rolled. Liquid sanitizer can be stored in a spray bottle.

SUMMARY

This disclosure includes a description of a system that can store multiple commonly accessed items having very different properties in a combined or common structure. For example, a central rod of a paper towel holder can also store liquid cleaner and include features for disseminating liquid. A liquid sanitizer container can double as a carrying handle for the system (e.g., using a finger loop built into the container). The container can be rapidly releasable, to allow its use as an independent sprayer.

A system for dispensing a cleaning fluid and cleaning wipes can have: an enclosure configured to receive, store, and dispense a cleaning fluid, and a support base. The enclosure and support base can be configured to support a roll of cleaning wipes in a manner that permits the roll to rotate when one or more cleaning wipes are removed from the roll. The enclosure can be configured to be securely attached to the support base by pushing the enclosure downward onto an attachment region of the support base. The enclosure can be configured to be released from the support base by pushing the enclosure downward. In some embodiments, the user is not required to directly apply a force to any actuator aside from pushing down on the enclosure to attached or release the enclosure from the support base.

A compact storage and transport system for cleaning supplies can have an enclosure configured to contain and dispense liquid cleaner, the enclosure comprising a transport handle. The system can have a support base configured to position cleaning wipes for convenient access, the support base comprising a connection mechanism configured to use a latch with a transverse penetrating element to releasably secure the enclosure to the support base. The system's transport handle and connection mechanism can be configured to allow a user to transport both the enclosure and the base by inserting a finger to hold only the transport handle of the enclosure.

In some embodiments, the transverse penetrating element is configured to use a pivoting motion to achieve transverse penetration, thereby causing sufficient connection strength to allow transport by the user. The transport handle can comprise a finger loop. The connection mechanism can be configured to both secure and release the enclosure through user contact with the transport handle. The transport handle can be configured to protrude from the top of the cleaning wipes when they are positioned on the support base, such that the system can be obtained and transported with a single hand of a user. The transport handle can be configured to protrude from any stored cleaning wipes and mechanically link to the connection mechanism such that pushing on the transport handle triggers securement of the enclosure in the support base. The system can be configured such that the same exact motion or force provided by a user at the same exact location can both secure and release the enclosure to and from the support base. For example, as illustrated in this example, by pushing downward on the top of the enclosure (e.g., at the transport handle), the enclosure can be made to attach to the support base in a secure way; and after the enclosure is attached, by pushing downward on the top of the enclosure in the same way, the enclosure can also be released from the support base. In the illustrated embodiment, no rotating or twisting is required to attach or release the enclosure from the support base. In some embodiments, this arrangement can permit the user to attached and/or release the enclosure to and/or from the support base with one hand, not requiring that the user push or pull the enclosure with one hand and push or pull the support base with another hand. In some embodiments, as shown, the attachment and/or release system has no user-triggered actuator that is separate from the enclosure itself. For example, as in the illustrated example, there is no button, lever, pull tab, twisting knob, latch, clasp, slider, dial, key, or other actuator that the user is required to directly actuate (aside from merely moving the enclosure itself) in order to attach and/or release the enclosure from the support base. Rather, the attachment can be accomplished simply by advancing and pushing the enclosure into the attachment region of the support base and/or the release can be accomplished simply by pushing downward on the enclosure in the same direction of motion and in the same location. In some embodiments, the user is not required to use two hands to pull or push on the enclosure and at the same time actuate an attachment and/or releasing actuator. The enclosure can be attached to and released from the support base without requiring the user to directly touch or hold the support base. In some embodiments, as illustrated, the force applied to lift and/or carry the system can be applied by the user in the same location but in an opposite direction from the force applied to attach and/or release the enclosure from the support base. In this way, inadvertent releasing of the enclosure from the support base during transportation of the system can be avoided. The system can be configured such that pulling on the transport handle when the enclosure is secured to the support base lifts the system for transport, and pulling on the transport handle when the enclosure is released lifts the enclosure away from the support base. The connection mechanism can comprise two hooks configured for two positions: one secured position following inward hook movement to grasp and retain the enclosure, and one released position following outward hook movement to release the enclosure. The connection mechanism can comprise at least two resilient components configured to enable movement in both vertical and transverse directions. The connection mechanism can comprise a binary latch, actuated by pressure from the enclosure.

A liquid dispenser can be configured for engagement with a paper-towel holder. The dispenser can have: an elongate interior reservoir; a carry loop configured to protrude from a roll of paper towels; and an engagement zone having contours configured to engage with a latch in a paper-towel holder.

In some embodiments, the dispenser can also have a spray trigger underneath the carry loop. The spray trigger can be configured for displacement in the direction of the elongate dimension of the elongate interior reservoir. The engagement zone contours can be configured engage with a latch as movement of the dispenser in one direction causes engagement into the contours from a transverse direction. The dispenser can be configured to, when accepting pressure in the elongate dimension, push against the latch, and thereby cause engagement elements in the paper-towel holder to snap in from the sides. The dispenser can have a protruding roll stop configured to prevent the dispenser from freely rolling on flat surfaces. The dispenser can be shaped and configured to fit within a cylindrical cardboard tube configured to hold paper towels.

A paper-towel holder can be configured to support and engage a liquid dispenser. The paper-towel holder can comprise a stable base having a central latch with at least one rotating or translating transverse element and a flat surface on the stable base that is configured to support a paper towel roll. The central latch and the at least one rotating or translating transverse element can be configured to accept an end of a liquid dispenser with sufficient strength and stability that the liquid dispenser can serve as a carrying handle to support the paper-towel holder and a paper towel roll. The paper towel holder can comprise a friction support arm configured to support the paper towel roll from the side and provide sufficient resistance to allow a user to remove, with one hand, a single paper towel from a roll of such paper towels, without using a second hand to support or retain the roll.

A sanitizer storage and dispensing system can comprise a base and an elongate holder configured to extend through the interior of a tube for holding rolled paper-based cleaning products. The elongate holder can be structurally supported by the base. An elongate receptacle can be configured to hold and dispense liquid sanitizer. The receptacle can have a grasping hook at the top, it can have a spray trigger that moves vertically and/or does not protrude radially, and it can engage a latching mechanism in the base, with downward pressure on or by the receptacle, in turn, both engaging and releasing the receptacle.

The system can be configured to position the receptacle and the holder generally concentrically and/or generally coaxially. The elongate holder can be configured to contain the elongate receptacle. The elongate holder can be configured to removably receive the elongate receptacle. The elongate holder and the elongate receptacle can form part of the same structure. The elongate holder can comprise a hollow supporting tube, the elongate receptacle can comprise an internal, fluid-tight reservoir and a nozzle, and the receptacle can be sized and configured to be positioned at least partly within the supporting tube. The base can be configured to rigidly position the hollow supporting tube perpendicularly to a planar surface to facilitate holding a full roll of paper towels, the elongate receptacle can be configured to disengage from the system for independent use while the hollow supporting tube remains in place for supporting paper towels, and the receptacle can be refillable and configured to allow a user to periodically dispense fluid from the nozzle. The elongate receptacle can comprise: a spray trigger operable to initiate the transfer of fluid from the reservoir and out through the nozzle; a transparent portion configured to allow views of a fill-level state of the reservoir; and a removable lid configured to allow a user to refill or add liquid to the reservoir. The elongate receptacle can comprise a removable attachment (e.g., a catch mechanism) for securing the receptacle to the dispensing system and a release (e.g., a one-handed release) configured to disengage the attachment to allow a user to temporarily remove the receptacle from the base for use. The receptacle can have contours or other engageable features. The base can have an engagement module configured to mechanically connect to these features. For example, in the center of the base, the receptacle can push down on a latch having two opposing hooks that react by snapping toward and retaining a lip contour at the receptacle's base. These hooks can engage the receptacle strongly enough that the receptacle can itself serve as a handle to lift and carry the entire base. Subsequently, the receptacle can again push down on the latch, which can cause the two opposing hooks to lean back away from the lip contour, releasing the receptacle and allowing its separate use as a liquid sprayer.

A paper towel holder and liquid dispensing system can comprise: a tip-resistant base; an elongate rod sized to hold paper towel rolls; and a removable spray tube sized to fit within a paper towel roll while it is being held by the system. The spray tube can comprise a liquid reservoir and a manual dispenser having a nozzle. The removable spray tube can form at least a portion of the elongate rod. The removable spray tube can be sized for insertion into at least a portion of the elongate rod. A releasable securement can be configured to allow the spray tube to connect to the system and disengage in response to a motion by the user. The removable spray tube can comprise a reservoir, a mechanical spray trigger, and a tube connecting the reservoir to the nozzle such that activation of the trigger causes fluid from the reservoir to flow through the tube and spray out the nozzle. The removeable spray tube can have a roll stop, or other protrusion or shape configured to prevent the tube from rolling off a smooth, flat kitchen counter, for example. The spray tube can comprise a loop at the top configured to allow it to be lifted and carried with one or more fingers. The spray tube can have a spray trigger that is configured for vertical actuation and moves reciprocally up and down, without physically extending radially outside of the spray tube's external tubular profile. The removeable spray tube can have a graspable lip at its base to facilitate latching into the base (e.g., for when it serves as a handle for carrying the entire system).

A system for storing and dispensing both solid and fluid cleaning material can comprise a holder configured to extend at least partly within a roll of solid cleaning material and hold the roll during a dispensing action. It can have a sprayer configured to simultaneously extend at least partly within the same roll of solid cleaning material and to contain liquid cleaning material. The system can also be configured to facilitate simultaneous removal or use of the sprayer with one hand of a user and dispensing of solid cleaning material from the roll with the other hand of the user. The system can further comprise a base configured to rigidly support the holder. The holder can be configured as a hollow tubular structure sized to store and periodically allow a user to access and remove the sprayer. The sprayer can have a reservoir and be configured to reveal an amount of liquid cleaning material remaining within that reservoir. A securement can be configured to secure and/or hold the sprayer within the holder when not in use and quickly release the sprayer upon actuation of a releaser by a user. The securement can comprise a resilient latch having two stable positions: one engaged position that holds the sprayer in place strongly enough that the system can be carried by holding only a portion of the sprayer (e.g., an upper protruding loop handle); and one released position configured to not maintain, but to allow subsequent engagement with, the sprayer. The securement can be actuated and/or released by contact from, and/or pressure by, the sprayer itself.

A system for securing and releasing an object (e.g., a liquid dispenser) can comprise an object (e.g., a liquid dispenser) to be secured or released. The object can have a releasable portion with at least one retention zone. The system can have a securing/releasing mechanism comprising: a base; a trigger zone configured to be activated by the object; one or more retention features configured to engage with the one or more retention zones of the object to be secured (e.g., a liquid dispenser); and a latch carriage connecting the trigger zone to the one or more retention features of the securing/releasing mechanism.

In some embodiments, the trigger zone can comprise a push mechanism activated by the object (e.g., liquid dispenser) exerting a downward force on the push mechanism. In some embodiments, the push mechanism can comprise a central spring configured to exert an upward force on the push mechanism. In some embodiments, the one or more retention features can comprise at least one latch or at least one clasp. In some embodiments, the latch carriage can form part of an interaction complex comprising at least one spring. In some embodiments, the object to be released or secured can comprise a fluid dispenser. The interaction complex can comprise at least one spring configured to urge vertical movement (or movement transverse to a principal axis of the base) and at least one spring configured to urge lateral movement (or movement parallel to the principal axis of the base). In some embodiments, the releasable portion of the object is located near the bottom of the object (e.g., at the opposite side from a spray trigger). In some embodiments, the one or more retention zones can comprise a lip configured to engage with the retention feature. In some embodiments, the push mechanism is configured such that an initial push on the push mechanism causes the one or more retention features to engage the one or more retention zones of the object (e.g., liquid dispenser), thereby securing it. In some embodiments, the push mechanism is further configured such that a subsequent push on the push mechanism can cause the one or more retention features to disengage the at least one retention zone of the object, thereby releasing the object. In some embodiments, the central spring is configured to cause the push mechanism to move upward after being activated by the downward force of the object.

A binary attachment mechanism for liquid dispensers can comprise an active trigger zone configured to be triggered or activated by an object such as a liquid dispenser. One or more retainer structures can be configured to sequentially engage and release the liquid dispenser, and an interaction complex can connect the trigger zone to the one or more retainer structures.

In some embodiments, the interaction complex includes a latch carriage. In some embodiments, an initial activation of the trigger zone causes the one or more retainer structures to perform a first function. In some embodiments, a subsequent activation of the trigger zone causes the one or more retainer structures to perform a second function, reversing the first function. The first function can comprise engaging or releasing the liquid dispenser. the second function can comprise releasing or securing the liquid dispenser. In some embodiments, the mechanism can further comprise a base and a central spring connected to the base. The spring can exert an upward force tending to raise the active trigger zone. the central spring can be further configured to cause the active trigger zone to re-position the active trigger zone and thereby configure the active trigger zone for a second triggering after the active trigger zone is triggered an initial time.

A method of deploying a cleaning device can comprise: storing liquid and non-liquid cleaning materials in a shared component carrier; using a single appendage to transport the shared component carrier to an area in need of cleaning; using a single appendage to push down on and thereby detach a liquid-containing portion from the shared component carrier; dispensing the liquid from the liquid containing portion with a motion from a single appendage; and using a single appendage and a friction device to remove a non-liquid cleaning material from the shared component carrier.

In some embodiments, the method can further comprise: returning the liquid-containing portion to the shared component carrier; pushing down again on, and thereby securing the liquid containing portion to the shared component carrier with a motion of a single appendage; and transporting the shared component carrier to a storage location.

BRIEF DESCRIPTION OF THE DRAWINGS

Some of these drawings are schematic, showing some examples of basic parts and concepts. Many different or additional structures, implementations, components, mechanisms, steps, and processes can be used. The claimed inventions should not be limited in any way to anything illustrated in the drawings.

DETAILED DESCRIPTION

Figure 1:
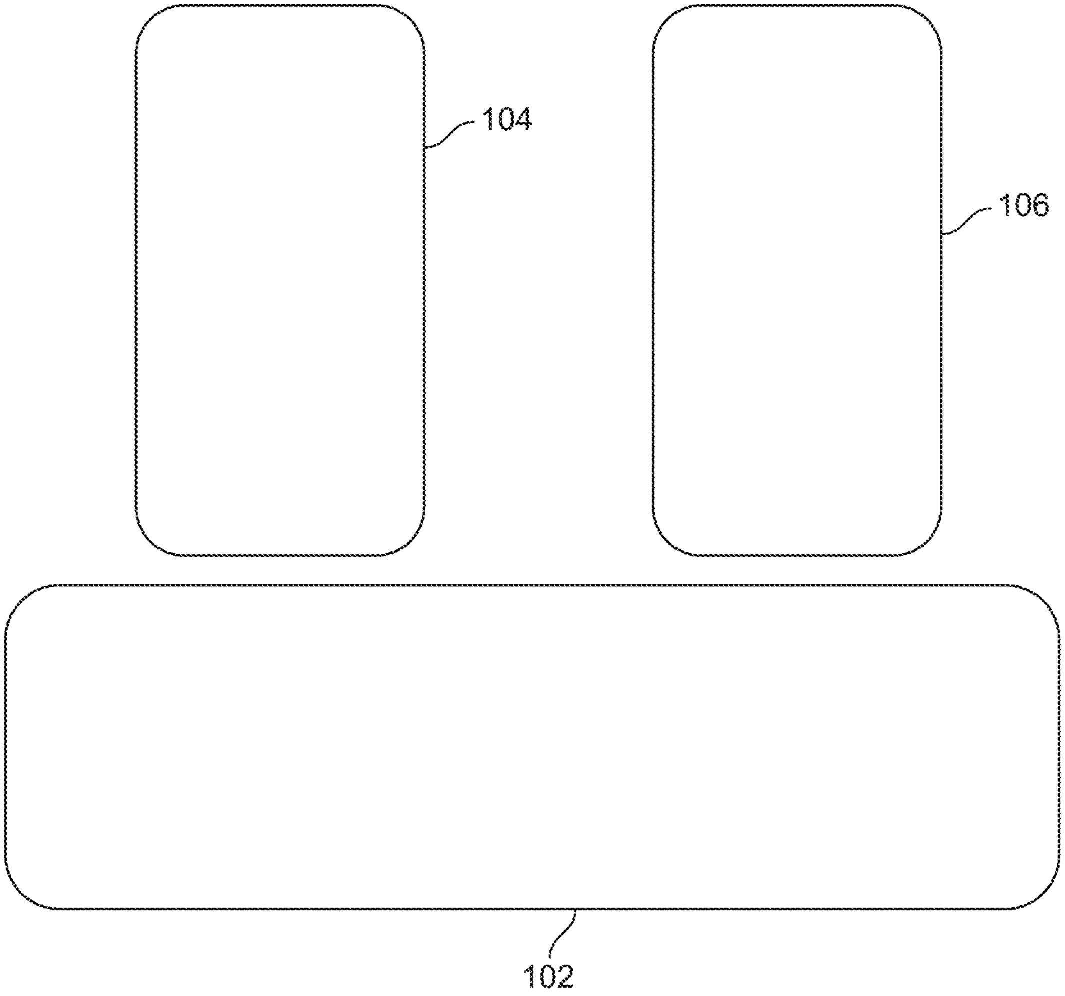
FIG. 1 schematically illustrates a system for storage and dissemination of commonly accessed items.

This specification provides textual descriptions and illustrations of many devices, components, assemblies, and subassemblies. Any structure, material, function, method, or step that is described and/or illustrated in one example can be used by itself or with or instead of any structure, material, function, method or step that is described and/or illustrated in another example or used in this field. The text and drawings merely provide examples and should not be interpreted as limiting or exclusive. No feature disclosed in this application is considered critical or indispensable. The relative sizes and proportions of the components illustrated in the drawings form part of the supporting disclosure of this specification, but it should not be considered to limit any claim unless recited in such claim.

A paper towel holder with a central support to hold a roll of paper towels can allow spinning dispensing of paper towels. The central support can also function separately as a removable disinfectant sprayer, enabling a user to carry and store paper towels and disinfecting solution in the same location, and providing a disinfecting sprayer nearby when paper towels are used to clean a surface.

When not in use, a sprayer can be inserted and removably attached (e.g., latched) within an elongate hollow rod (e.g., a vertical pole) of a paper towel holder. A release can be provided, for example a handle or button on top of the sprayer, to separate or release the sprayer from the paper towel holder. A sprayer can have a trigger button that is configured to initiate the spraying of liquid (e.g., disinfecting, cleaning, cooking, moistening, polishing, or other liquid) stored therein onto one or more surfaces, and nearby paper towels may be used to wipe those same surfaces. Additional liquid can be inserted into or refilled in the sprayer when some or all of the contained liquid is used. Various types of liquid can be usefully stored and dispensed in such a manner. In some embodiments, the described structures can be used. For example, one or more of water, sanitizer, cleaner, cleaning agents (detergent, soap), disinfectant, anti-microbial fluid, polishing compounds, window cleaner, cooking sprays, paint, fire starter, etc. can be stored and/or dispensed conveniently. All references to any particular type of liquid or fluid in this disclosure are also intended to include and refer to any or all of the above fluids.

FIG. 1 shows a first dispenser 104, a second dispenser 106, and a support 102. A first dispenser can be connected to the second dispenser 106, or these components can be integrally formed together. The dispensers 104, 106 can both be supported by the support 102. The first dispenser 104 can be configured to support and dispense a roll of paper towels or another cleaning product. The second dispenser 106 can be configured to contain and dispense a liquid cleaning product such as spray sanitizer. The two dispensers 104, 106 can be nested or can comprise a common structure. In some embodiments, as illustrated, the support 102 can be the bottom-most structure or component of the system. In some embodiments, the support 102 can contain, generally surround, generally enclose, and/or generally envelope, a majority, all, or substantially all of the first dispenser 104 and/or the second dispenser 106. The support 102 can be sufficiently stable and heavy to maintain balance and upright orientation when the first and second dispenser 104, 106 are both in place with their weight resting upon the support 102, thereby resisting tipping or tilting of the system when bumped or otherwise contacted by the type of external forces commonly encountered in kitchen or other household counter-top situations. The first and second dispensers 104, 106 can be configured for efficient storage and convenient access. Storage can be arranged concentrically and/or coaxially, such that a first dispenser 104 provides a space within its center for the second dispenser 106. In particular, a first dispenser can comprise a hollow rod for holding paper towels, and a second dispenser and comprise a thin, narrow, and/or elongate rod-shaped spray bottle configured to contain sanitizer. The bottle can be sized and shaped to fit closely within the rod of the first dispenser 104. For example, the bottle can be large enough to provide sufficient sanitizer for repeated, multi-day use in an average household before requiring sanitizer to be replenished, reinserted, and/or refilled; and the bottle can be sufficiently narrow so as not to create resistance or undo friction or contact against the hollow rod of a paper towel roll when the bottle is inserted and/or withdrawn within the hollow rod.

Figure 2:
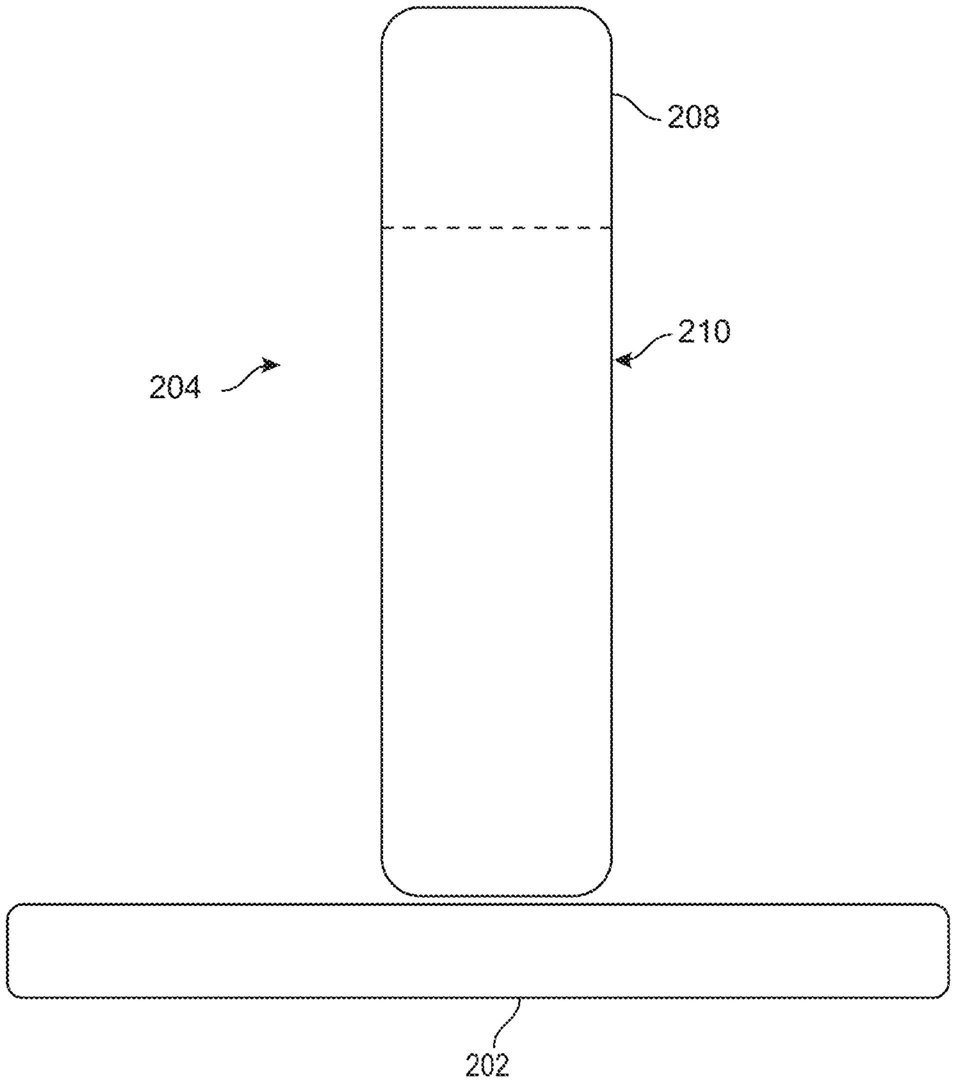
FIG. 2 illustrates a system having a combined dispenser.

FIG. 2 shows an example embodiment of FIG. 1. One or more of the features of FIG. 2 can be used within or instead of any embodiment in this specification. A support 202 is shown at the base of the system. A combined dispenser 204 can rest on the support 202. The combined dispenser 204 can have a first dispenser 208 and a second dispenser 210. A dashed line is provided on the combined dispenser 204 to indicate that the first dispenser 208 can be on a first portion of a solid object and a second dispenser 210 can be on a second portion of a solid object. However, the first and second dispensers 208, 210 can be different objects that fit together or can be stored efficiently in close proximity to each other. Although the combined dispenser 204 is depicted immediately adjacent and/or above the support 202, these two features can physically interact with each other such that the support 202 physically touches and structurally holds the combined dispenser 204 (e.g., in a manner that is generally erect or generally perpendicular). The first dispenser 208 can be configured for dispensing a liquid sanitizer, and a second dispenser 210 can be configured for dispensing a solid cleaning product such as a paper-based product. In some embodiments, multiple cleaning products in different states of matter can be stored and dispensed together by the same system and can be conveniently provided to a user, such that one hand of the user easily obtains one product while the other hand of the user easily obtains the other product. Different cleaning products can be dispensed to the same user simultaneously and conveniently.

Figure 3:
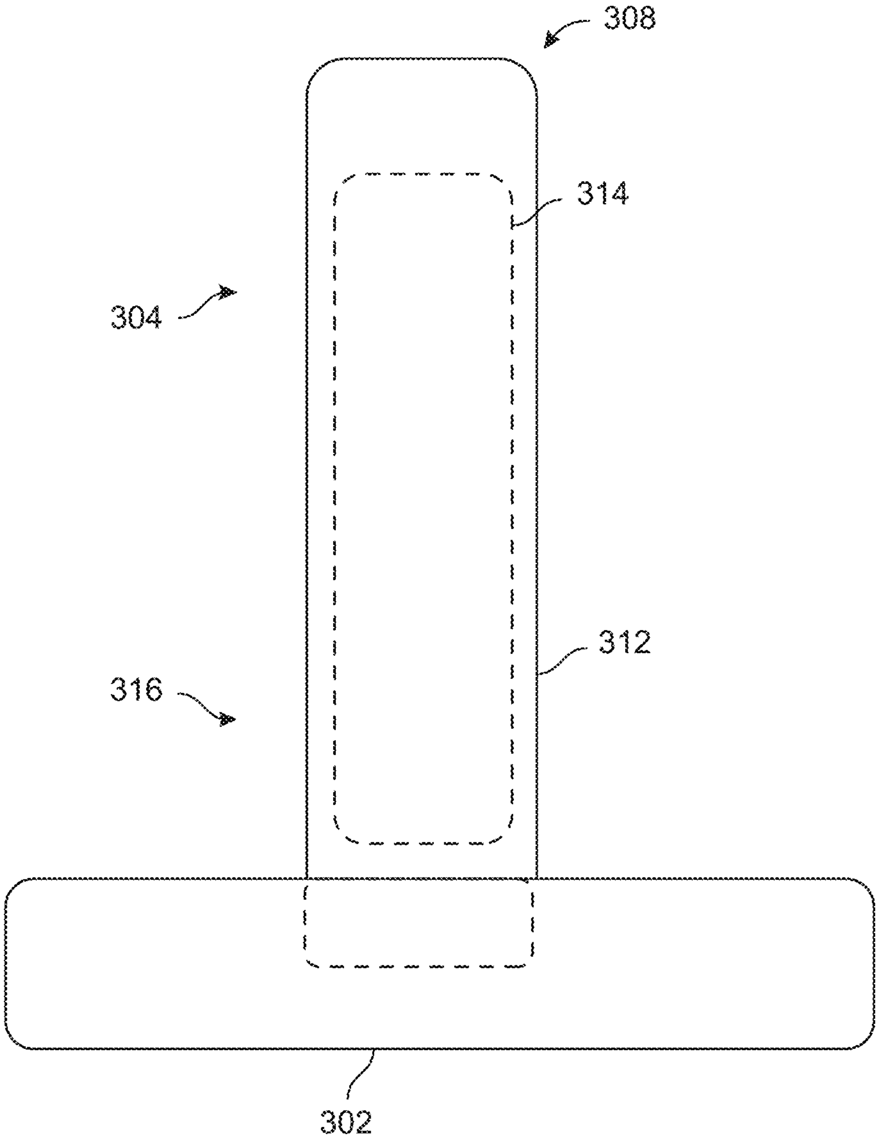
FIG. 3 illustrates a system for supporting a structure and an internal receptacle.

FIG. 3 shows an example embodiment of FIG. 1. One or more of the features of FIG. 3 can be used within or instead of the features of any embodiment in this specification. A primary support 302 provides a structure into or onto which the combined dispensers can be placed. A structural interaction zone 316 can allow the combined dispenser 304 to physically touch the primary support 302. For example, if a combined dispenser 304 is generally in the shape of an elongate rod, a primary support 302 can provide a slightly wider hollow rod into which he combined dispenser 304 can be inserted, or it can provide a generally right cylindrical opening into which the combined dispenser 304 can be inserted. A structural interaction zone 316 can comprise a lower portion of a rod-shaped structure and a hollow or otherwise supporting portion of a primary support 302. The structural interaction zone 316 can include a variety of releasable attachments for the combined dispenser 304. For example, a releasable attachment can releasably attach the primary support 302 to the dispenser 304. Various approaches to connection can be employed, including one or more threaded connections, friction fits, snap fits, latches, nesting, magnets, twist-lock, bayonet attachment, spring-loaded pressure fits, etc.

FIG. 3 also shows that a combined dispenser 304 can comprise a dispenser 308, an external storage and dispenser 312, and an internal receptacle 314. An internal receptacle 314, depicted here with dashed lines within the combined dispenser 304, can be particularly useful for liquid cleaning substances. For example, a liquid sanitizer can be stored within such a component that can comprise a reservoir inside an elongate structure. A dispenser 308 can be located toward the top of a combined dispenser 304 and an external storage and dispenser 312 can be located toward the bottom of a combined dispenser 304. FIG. 3 also shows how one dispenser can comprise internal storage while another dispenser and comprise external support. This is especially useful if one cleaning substance is a liquid and the other cleaning substance is a solid such as a roll of paper products. The present disclosure recognizes that an interior space within a roll of paper products can be efficiently utilized to position a liquid cleaning product, since liquid and paper cleaning products can be used together. They can be stored in a highly efficient and elegant manner such that a user can access both of them simultaneously and/or return either or both of them to their storage positions quickly and easily, one with each hand. The same primary support 302 can be used to store and provide access to multiple types of cleaning products in this matter, minimizing required shelf or counter space in a kitchen, laboratory, bathroom, workshop, or other cleanable area.

Figure 4:
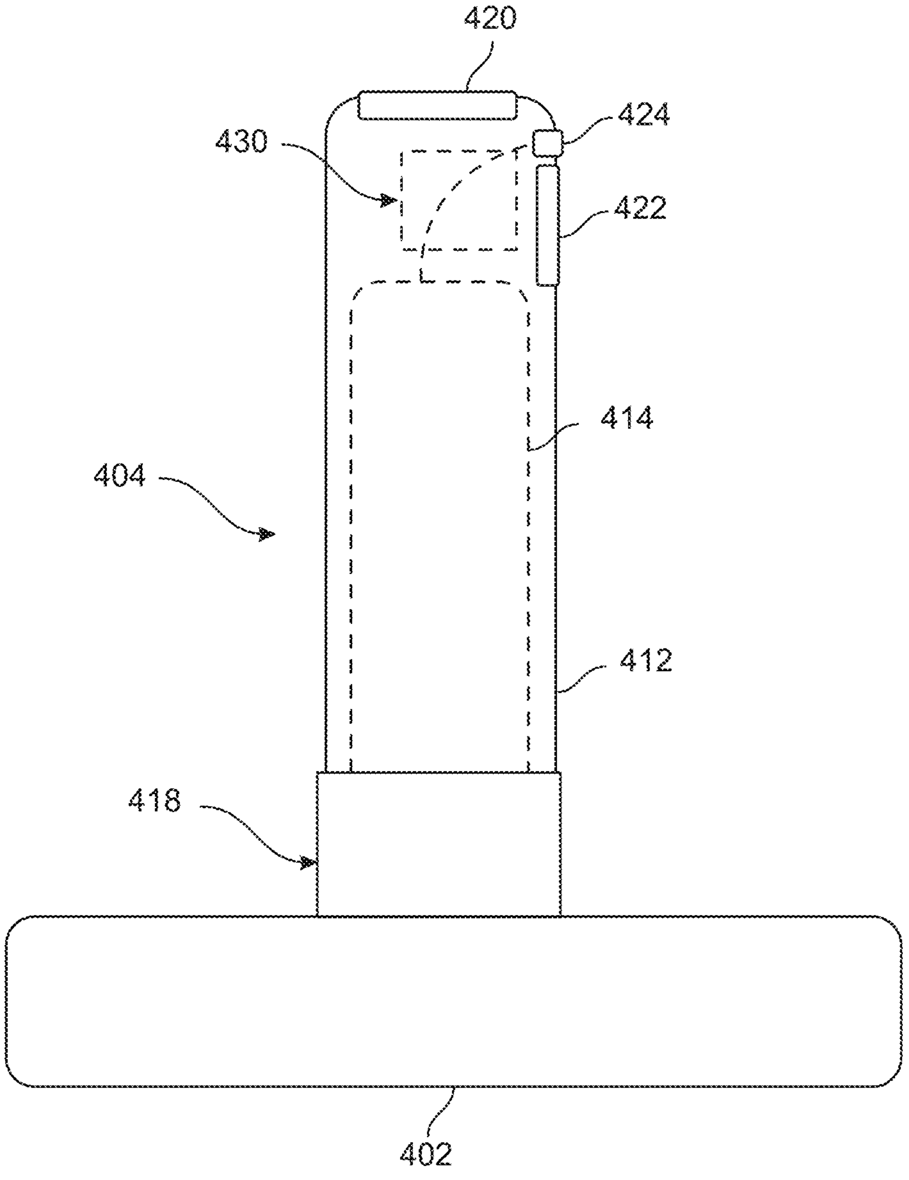
FIG. 4 illustrates a system that can be used to store and dispense both paper towels and liquid cleaning agent.

FIG. 4 shows an example embodiment of FIG. 1. One or more of the features of FIG. 4 can be used within or instead of the features of any embodiment in this specification. FIG. 4 depicts a base 402. On the base 402 a rod holder 418 is depicted as a generally hollow rod extending upward from the base 402. Into the rod holder 418 is inserted a tube support rod 412. The tube support rod 412 has within it a liquid storage reservoir 414 depicted with dashed lines. Extending from the top of the liquid storage reservoir 414 is a schematically depicted passage leading to a nozzle 424. A spray trigger 422 can interact with pump mechanics 430 to cause liquid stored in the reservoir to pass up to and out of the nozzle 424. The tube support rod 412 and one or more of the other features described to handle liquid together can form a combined dispenser 404. In some embodiments, both internal and external storage is provided. Internal storage is provided by the liquid storage reservoir 414 and external storage is provided by a surface of the base facing upward, as well as by the combination of the rod holder 418 and the tube support rod 412. In some embodiments, the rod holder 418 can extend along more of the length of the tube support rod 412, such that the tube support function is actually performed mostly or entirely by the rod holder 418.

In FIG. 4, the rod holder 418 can perform one or more functions of the structural interaction zone 316 in FIG. 3. The tube support rod can perform one or more functions of the external storage and dispenser 312 of FIG. 3 and the second dispenser 210 of FIG. 2, for example. Moreover, the liquid storage reservoir 414 can provide one or more functions of the internal receptacle 314 of FIG. 3. The spray trigger 422, the nozzle 424, and the pump mechanics 430, can all provide one or more of the functions and structures of the dispenser 308 of FIG. 3. The combined dispenser 404 can perform one or more of the functions of the combined dispenser 304 shown in FIG. 3, and the combined dispenser 204 of FIG. 2.

The base 402 can be weighted to prevent or to resist tipping. If electronic components are included, the base can provide space for one or more batteries, charging units, transformers, and other electrical features. Such features can interact with other system components such as a dispenser. A base can include a charging unit, and a dispenser can include at least one rechargeable battery that interacts with the recharging unit to increase its charge. The battery can power a motorized sprayer for dispensing liquid material from the dispenser (which can be a sprayer). The trigger can comprise an electrical actuator for actuating the motorized sprayer. One or more portions of the system (e.g., a base or dispenser) can also receive electrical power from a local or remote electrical plug and/or solar panel, for example. Electrical connections can be provided in, through, and/or in conjunction with a holder, latch, or other support structure (e.g., the rod holder 418). Insertion of a dispenser into a rod holder 418 can both physically and electrically support the dispenser. Electrical conducting and/or charging leads can be applied between the base and a dispenser when they are releasably joined, allowing electrical current to pass between them, thereby powering and/or recharging one or more electrical features.

A dispenser can comprise a sprayer sized to fit at least partially within a standard paper towel roll. For example, the dispenser can comprise an elongate portion in the shape of a cylinder that can have a diameter or cross-sectional area that is at least about 1 inch (e.g., about 1.5 inches) and/or can have a length that is at least about 10 inches (e.g., about 11 inches). A rod holder 418 may also fit within that same space. The dispenser can be held, removably secured by, insertable, and/or nested within the rod holder 418. The sprayer can maximize, optimize, or provide an advantageously sufficient interior reservoir volume within that space. A sprayer's shape can conform to or be compatible with such a cylindrical space to facilitate insertion into and withdrawal from that space, while providing a relatively large amount of liquid storage in a refillable reservoir. The sprayer can be generously sized to store enough liquid to provide for multiple uses and reduce frequency of refills. The sprayer can be configured to hold or contain, for example, at least about 8 fluid ounces and/or less than or equal to about 11 fluid ounces.

The spray trigger 422 can have a low profile and be formed to protrude only slightly if at all from the generally rod-like structure of a combined dispenser 404. A nozzle 424 can protrude only slightly, if it all, from the generally rod-like structure of a combined dispenser 404, thereby allowing the overall structure of a combined dispenser 404 to fit within a generally confined space such as would be available within the interior of a standard paper towel roll. In some embodiments, no spray trigger is provided and a combined dispenser 404 can be squeezable such that pressure to spray a fluid from an internal liquid storage reservoir 414 is provided by a user's hand squeezing the outside of the dispenser 404 such that liquid can flow out of a nozzle 424. In some embodiments, the pump 430 is not located at a specific position adjacent a liquid storage reservoir 414. Rather, the pump is inherent in the resilient structure of the combined dispenser 404 itself. A squeeze bottle approach may incorporate flexible or elastomeric, plasticized or rubberized, sidewalls that surround at least a portion of the liquid storage reservoir 414 and can comprise or be inserted within a tube support rod 412. In some embodiments, a spray trigger 422 does not provide the full mechanical force required to pump liquid from a liquid storage with over 414 out in nozzle 424. A force can be provided by pump components, which may include a motorized pump. In such an arrangement, the spray trigger 422 can be used to actuate the motorized pump contained within the pump 430. A battery can be included within the system (e.g., a rechargeable battery) to power the motorized pump. An electrical connection can be provided between the spray trigger 422 and the pump 430.

Various approaches for holding, supporting, or securing a dispenser (e.g., a sprayer) can be employed. Some of these can include a latching function. Some can be passive and/or can include non-articulating structures. A release of a dispenser can comprise a surface that allows a user to grip and lift, twist, or otherwise separate the dispenser from a base 402, a rod holder 418, or other holding structure. Twisting can release a threaded component. Sliding can release a nested or friction-fit component. Decoupling can release a latch or snap. Lifting can release a magnetic holder. Pushing and twisting can release a bayonet mount or spring-loaded pressure fit, etc.

FIG. 4 depicts a release 420, positioned in this illustration at the top of the combined dispenser 404. A release 420 can be actuated by a user to facilitate removal of a combined dispenser 404 from a base 402. A sprayer can be inserted within a rod holder 418 that is much taller than the shorter version depicted in this figure. A release 420 can allow a sprayer to release from the system. For example, a release 420 can apply a pressure on a physical spring, latch, actuating rod, string, or other mechanism causing the combined dispenser 404 to disengage from one or both of the rod holder 418 and the base 402. For example, a latch system can engage between a combined dispense and structure 404 and a rod holder 418 and/or base 420 on insertion of the combined dispenser 404 into the rod holder 418. A latch system can be disengaged when a user applies pressure on a button toward the top of the combined dispenser 404. A release 420 can comprise a button that in turn pushes on a spring, thereby releasing a catch that otherwise secures the combined dispenser 404 into place. In some embodiments, a dispenser 404 can be inserted into a rod holder 418 and be held in place without a latch. If a rod holder 418 is sized to snugly receive a dispenser 404, that snug fit can provide sufficient support and avoid rattling or wobbling of the dispenser 404. In some embodiments, a rod-shaped dispenser 404 can have external threads or snaps provided that interact with corresponding thread or snap structures in a rod holder 418. One or more interactive features can be released in various ways including by pulling, unscrewing, squeezing on cantilevered components, pushing, pulling, or extracting in another manner.

Figure 5A:
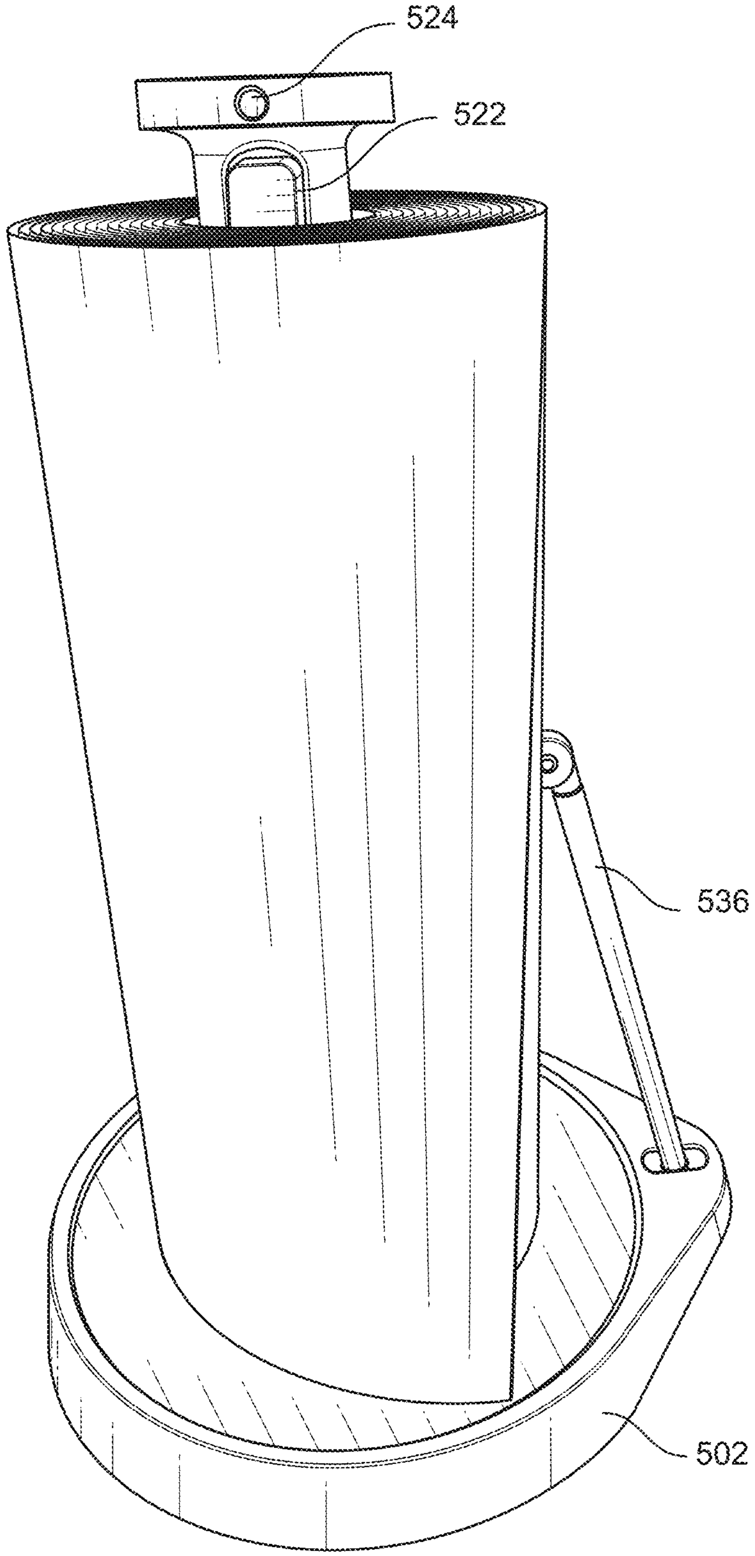
FIG. 5A shows a prototype system for dispensing paper towels and cleaning fluid.

FIG. 5A shows an example of a liquid and paper towel dispensing system. In FIG. 5A, a base 502 is shown with a raised lip around a perimeter thereof. This raised lip can be sized and configured to correspond to the outer edge of a full roll of paper towels, for example. The lip can indicate to a user where to position and hold a roll of paper towels, and it can also indicate how full a particular role can be with a quick visual inspection. A large distance between the outer paper towel and the lip and indicate that a paper towel refill is more likely to occur in the near future. An elongate, inwardly biased, friction-inducing component 536 is shown protruding from the base 502 and tipped to exert a slight pressure against a roll of paper towels to resist rolling or rotation of the roll of paper towels with respect to the sprayer. Protruding from the roll of paper towels at the top of FIG. 5A is shown a structure having a spray trigger 522 and a nozzle 524. The spray trigger 522 can provide one or more of any of the functions and/or benefits with respect to spray trigger 422 of FIG. 4 and/or any other embodiment. The nozzle 524 can provide one or more of the functions and/or benefits of nozzle 424 of FIG. 4. In this figure, a dispenser is shown protruding slightly from the top of the role of paper towels. The dispenser can dispense liquid cleaning agent and/or can also form or be nested within a structure that facilitates dispensing of paper towels from the roll as shown here.

Figure 5B:
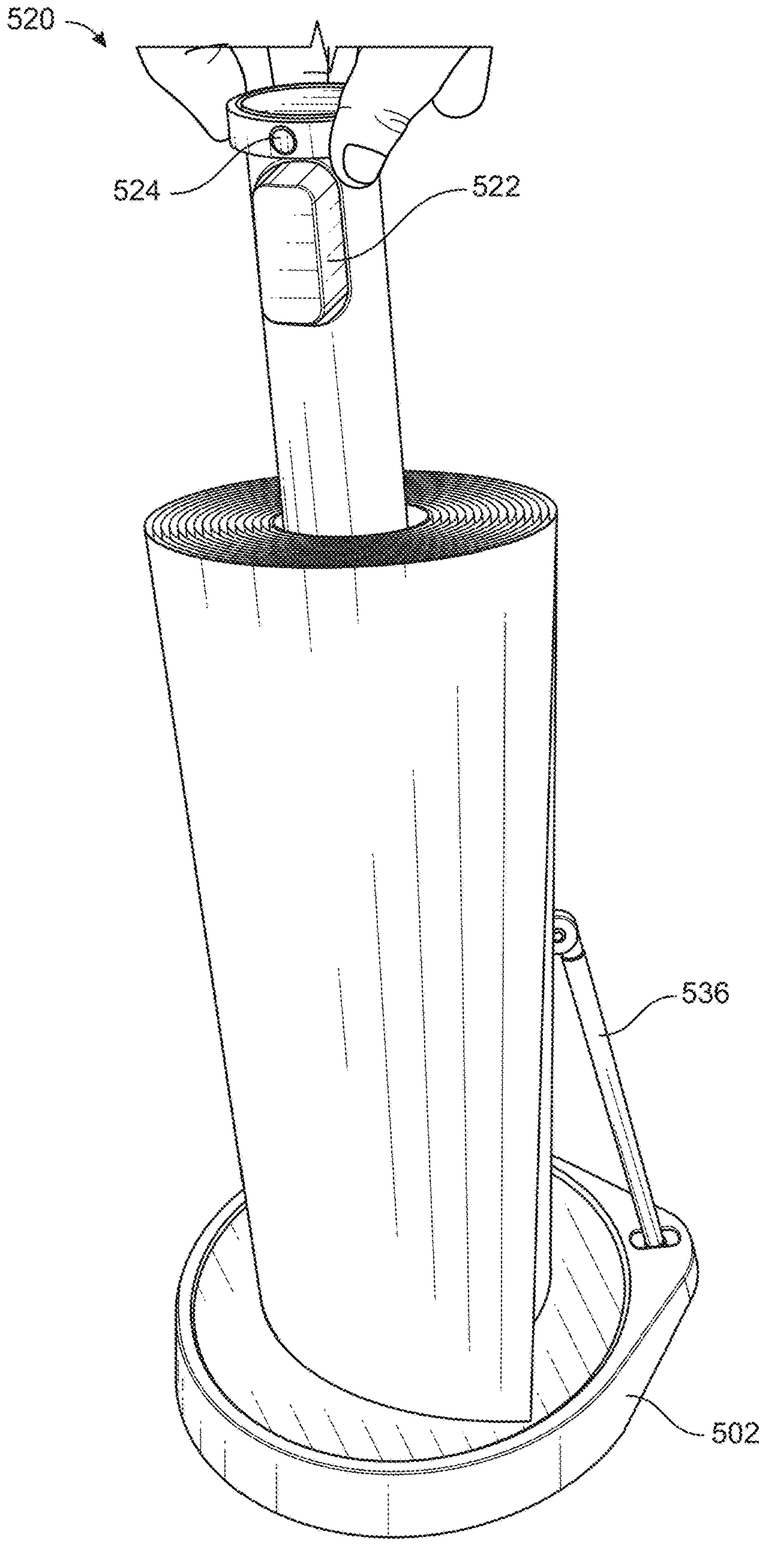
FIG. 5B shows a fluid dispenser being lifted up.

FIG. 5B shows the dispensing system of FIG. 5A, with a user grasping and pulling upward on a portion of the system (e.g., a dispenser that can comprise a sprayer, for example). The base 502 and the friction feature 536 are both still in place. However, a larger portion of the spray trigger 522 is now visible because a sprayer is being withdrawn upward and removed from the central axis of a roll of paper towels. A nozzle 524 is visible pointing in the same direction of the spray trigger 522. A release 520 can be provided at the top of the sprayer. This release can communicate electronically or physically with a spring, latch, magnet, or other mechanism configured to disengage or otherwise separate a dispenser from the base 502.

FIGS. 5A and 5B both depict a widened, protruding head portion for a sprayer that can provide a convenient grasping surface allowing a user to pull a sprayer upward in a convenient manner. This widened portion can also serve to retain paper towels in place if the system tips over. If a latching or other holding function is sufficiently strong, the widened portion can also provide a grip or handle (which can instead have a different gripping shape) for lifting, carrying, or moving the entire system. The widened portion can also allow for a twisting motion even when the thinner remainder of the removable dispenser is inaccessibly disposed within a paper towel roll. When a sprayer is functioning as a sprayer, the widened portion can provide a ledge that helps support the sprayer in a user's hand, resting atop a curved index finger as it sprays and carries the device.

A dispenser can include one or more grip-facilitating surfaces, for example at or near the top of such a structure. These surfaces can be configured for increased traction, and/or user comfort and satisfaction. For example, a stainless-steel surface can have a clean and smooth appearance. A soft grip can be provided where a user's hand grips a sprayer, the grip comprising a rubberized, elastomeric cushioned surface. The surface can be an elastomeric, resilient, non-slip, and/or easily cleanable material. A trigger can be formed from plastic, rubber, or other materials configured for comfort and efficiency of a trigger finger.

Figure 6:
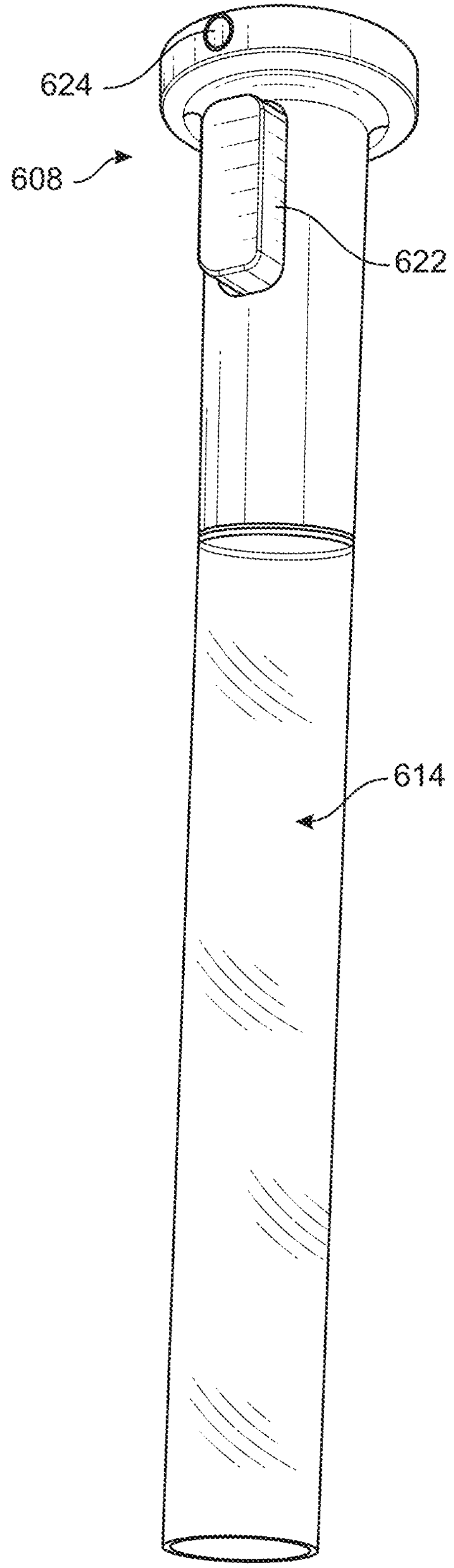
FIG. 6 shows a fluid dispenser prototype with a viewable reservoir.

FIG. 6 shows a liquid dispenser 608 that can perform one or more of the functions of the sprayer of FIGS. 5A and 5B. The liquid dispenser 608 can have a liquid storage reservoir 614, a spray trigger 622, and a nozzle 624. The liquid storage reservoir can have a clear or otherwise revealing wall structure, allowing a user to easily see how much liquid is remaining within the reservoir 614 and upper portion of the liquid dispenser 608 can be formed from metal or another convenient material for cleaning and grasping. Stainless steel provides a clean look and is practical because it avoids staining and can be cleaned readily. An upper portion of a liquid dispenser 608 can be joined to a lower portion of a liquid dispenser 608 by gluing, screwing, snap fit, heat assisted fusion, or other manufacturing methods. A tube that can form the liquid storage reservoir 614 as depicted here can be formed from extruding, rolling, or any other manufacturing methods. A stainless-steel spray portion can be formed from extrusion, rolling, molding, or other manufacturing methods. FIG. 6 shows a product having a brushed metal surface toward the top and a polished plastic surface toward the bottom. Polishing, brushing, painting, smoothing, or other finishing approaches can be used.

Figure 7:
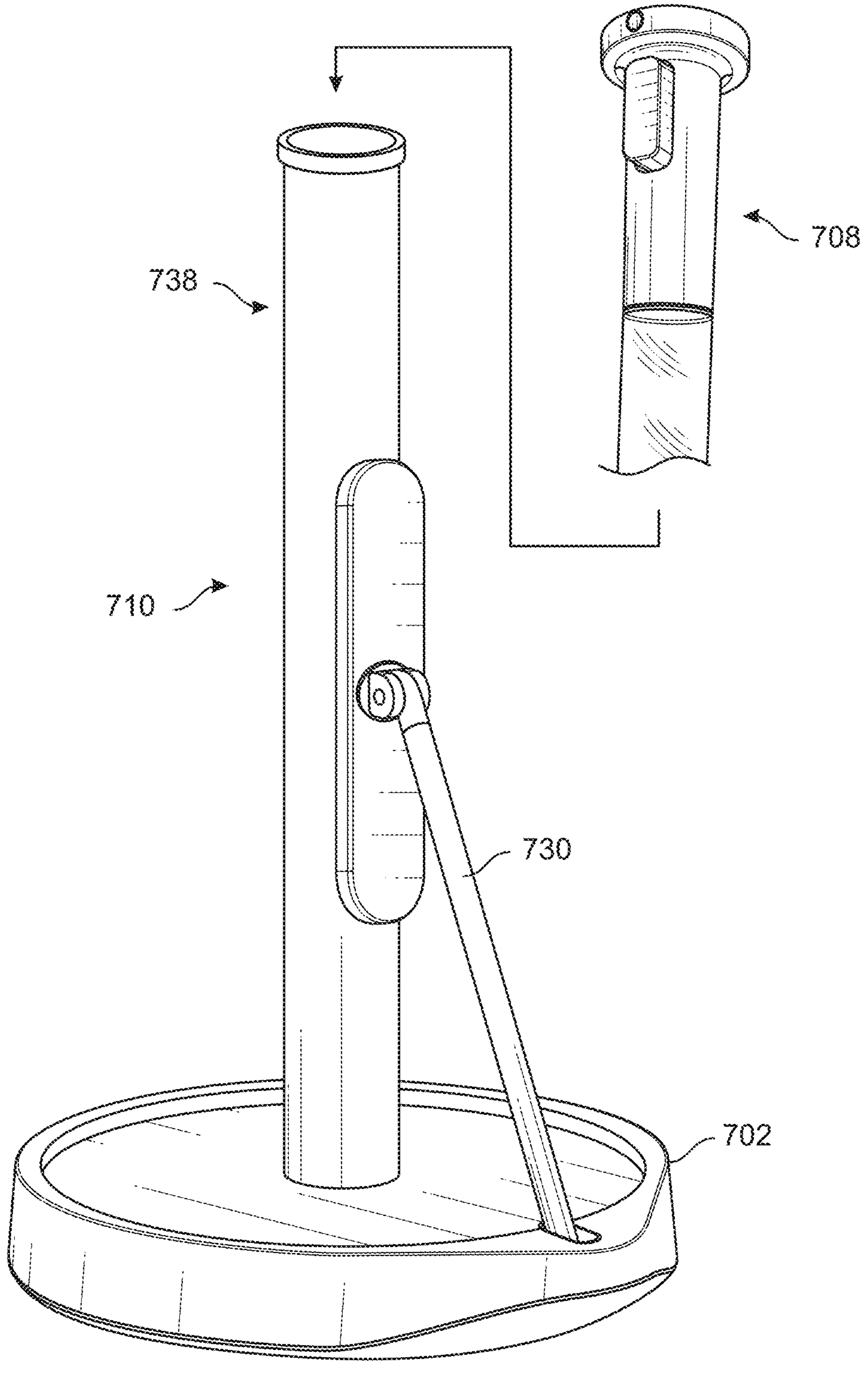
FIG. 7 shows how a liquid dispenser can be supported and stored.

FIG. 7 shows a structure without any paper towels present. A liquid dispenser 708 can include one or more structures or functions of FIG. 6 or any other embodiment. The entire structure is not shown. The liquid dispenser 708 can comprise any elongate tube that is sized to fit within a liquid dispenser holder 738. The liquid dispenser holder 738 can play a dual role as a solid dispenser 710. The solid being dispensed can in some cases comprise paper towels, for example. A friction feature 730 is shown extending up from a base 702 and resting against the solid dispenser 710. As shown here, and upper rim of a liquid dispenser holder 738 can have a surface configured to smoothly hold and interact with a portion of a liquid dispenser 708. For example, when a liquid dispenser 708 is inserted within a liquid dispenser holder 738, it can be received with a pressure fit when it nests fully within the hollow tube of the liquid dispenser holder 738.

Figure 8A:
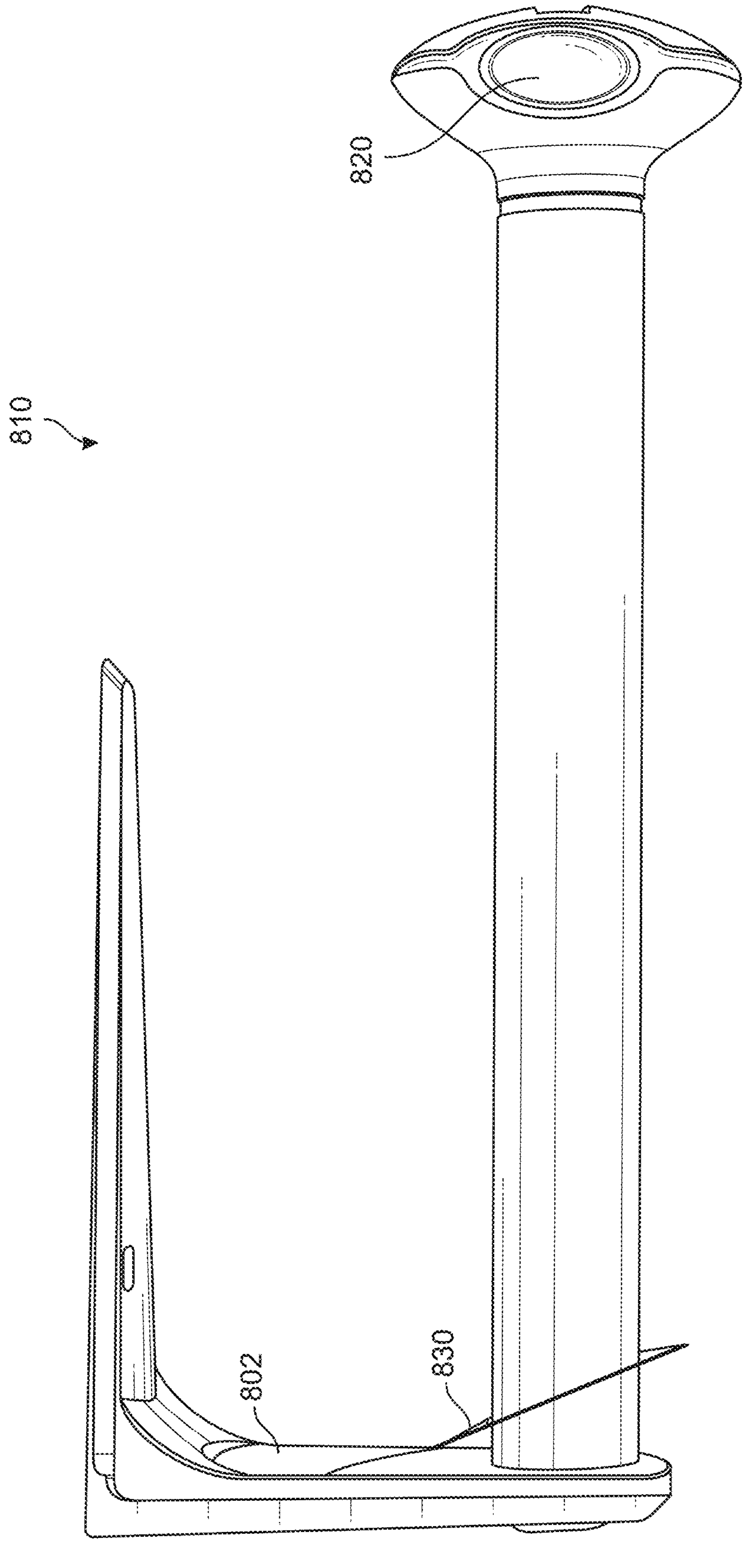
FIG. 8A shows an alternative orientation of a structure for dispensing cleaning materials.

FIG. 8A shows another system for a paper dispenser 810. This structure is configured for mounting horizontally, for example underneath a kitchen cabinet. The base 802 is located to the side rather than below the support component. FIG. 8A shows a friction feature 830 that can interact with a paper towel holder, for example. The friction feature 830 can exert the force against a paper towel roll or the paper towels themselves thereby preventing the roll from turning too quickly, and allowing a user to pull paper towels from the roll with a single hand rather than holding the roll with the other hand at the same time. In this figure a release 820 is shown at the right, allowing a user's thumb to press in and remove the horizontal rod structure from the solid dispenser 810. This can facilitate refilling the paper towel holder with a new roll of paper towels. The features and benefits of any embodiment of a liquid dispenser can also be applied to this embodiment. For example, the horizontal rod of FIG. 8*a* can support or comprise a liquid reservoir, and the structures shown at the right containing the release 820 can be modified to include a spray function, including a trigger and a nozzle, for example. Any elongate structure configured to hold a paper towel roll can also be modified to contain, support, store, and/or dispense liquid sanitizing agents.

Figure 8B:
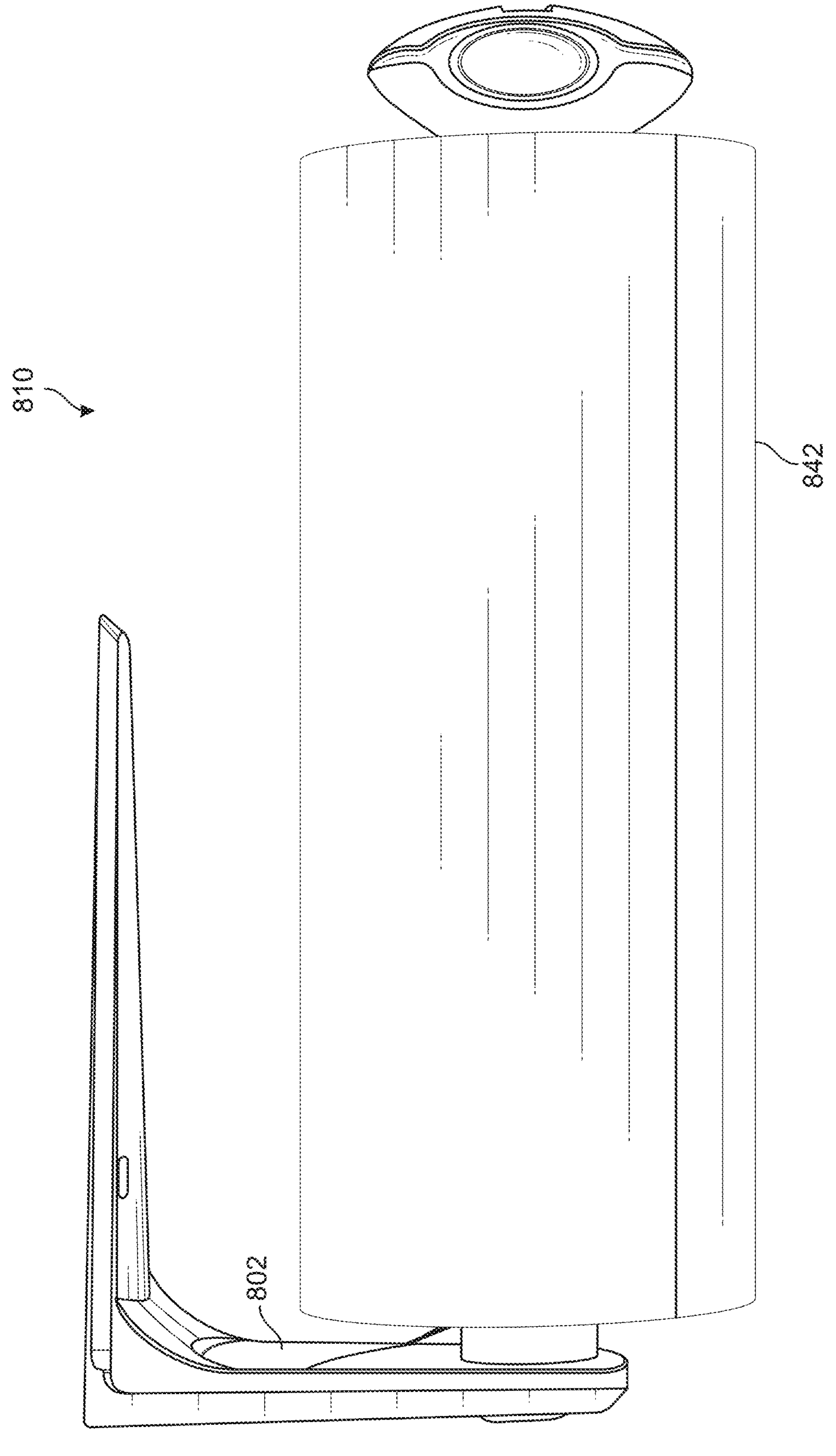
FIG. 8B shows the structure of FIG. 8 with a paper towel roll in place.

FIG. 8B shows the structure depicted in FIG. 8A, including the base 802. The solid dispenser 810 is depicted in this view as holding a paper towel roll 842.

Figure 9:
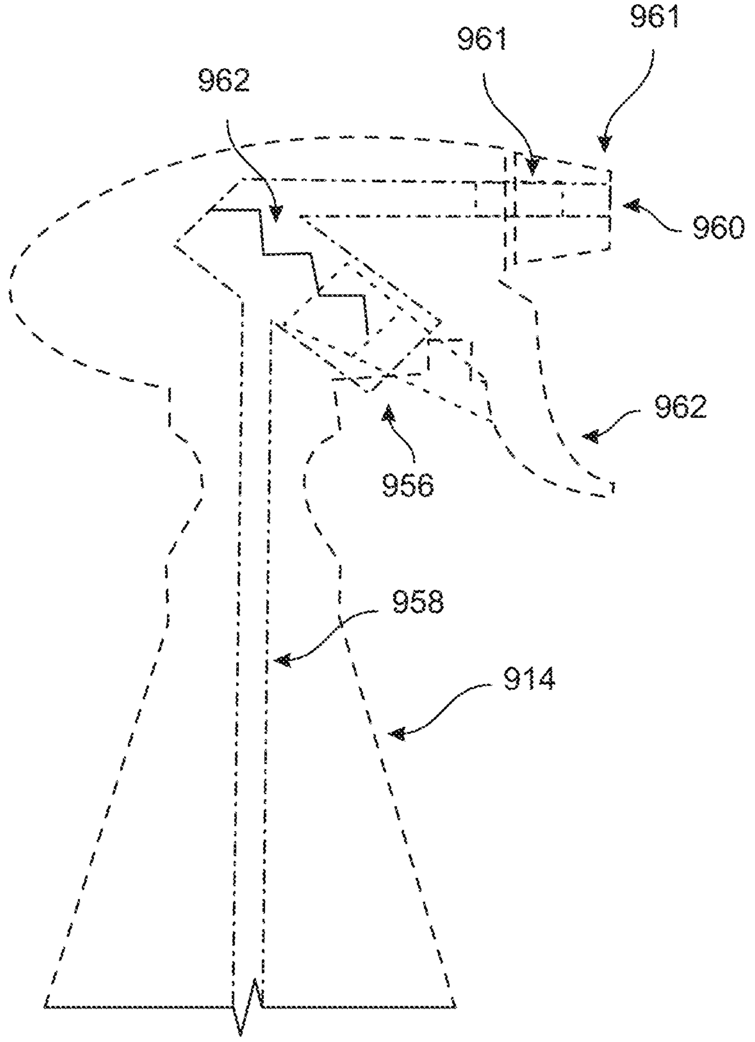
FIG. 9 provides an example of pump mechanics.

FIG. 9 provides an example of pump mechanics 430 (see FIG. 4) in the context of a spray bottle that can be used in any embodiment and/or that can be modified in any suitable way for use in any embodiment, whether manual or motorized. Hand actuated mechanical pump 956 can draw fluid up a connected straw 958 and force the fluid through an orifice 960 creating a stream of fluid. This stream of fluid can be modified in a number of dispenser configurations by a variable pitch nozzle 961 that changes the fluid stream into a mist. Pump 956 typically is a piston style displacement pump with a spring return pump handle 962. Each time the spray handle 962 is compressed, the volume of fluid is driven out of the pump 956 to the orifice 960 which creates the stream of fluid drawn from the straw and a similar quantity of fluid is drawn up into the pump 956 through the straw 958 on the return stroke of the pump handle 962. A check valve 964 blocks the backward flow of fluid from the orifice 960 allowing the return stroke of the pump handle 962 to draw up more fluid from the reservoir 914. Pump handle 962 is repeatedly actuated by the user until a sufficient quantity of fluid is dispensed. The assembly described here can be modified to fit within the elongate sprayer described herein for inserting in a paper towel roll, or in any other suitable way. For example, the handle can be shortened, the angle of the spring can be changed, and the volume and shape of internal passages can be adjusted. One or more of the components can be used and/or modified to be attached to a motor to enable motorized dispensing of fluid.

Additional or alternative structures and approaches to electromechanical pump mechanics 430 are provided in: U.S. Pat. Nos. 7,556,179; 8,096,445; 10,076,216; and 10,806,305. The entire disclosure of each of these patents is hereby fully incorporated by reference into the present specification, for all purposes. For example, some of the examples described in these documents can convey fluid from an internal reservoir using an electrical pump. These or similar mechanisms can be incorporated into a spray bottle of an elongate shape with one or more of the features described in this specification. In some embodiments, a dispenser such as those described in the referenced patents can be modified to also dispense or store paper cleaning products such as paper towels. A spout or nozzle of a soap dispenser can extend over the top of a roll of paper towels so that sanitizer or soap is dispensed beyond the edge of the roll, and a user can quickly grasp paper towels shortly after dispensing the fluid material.

Figure 10:
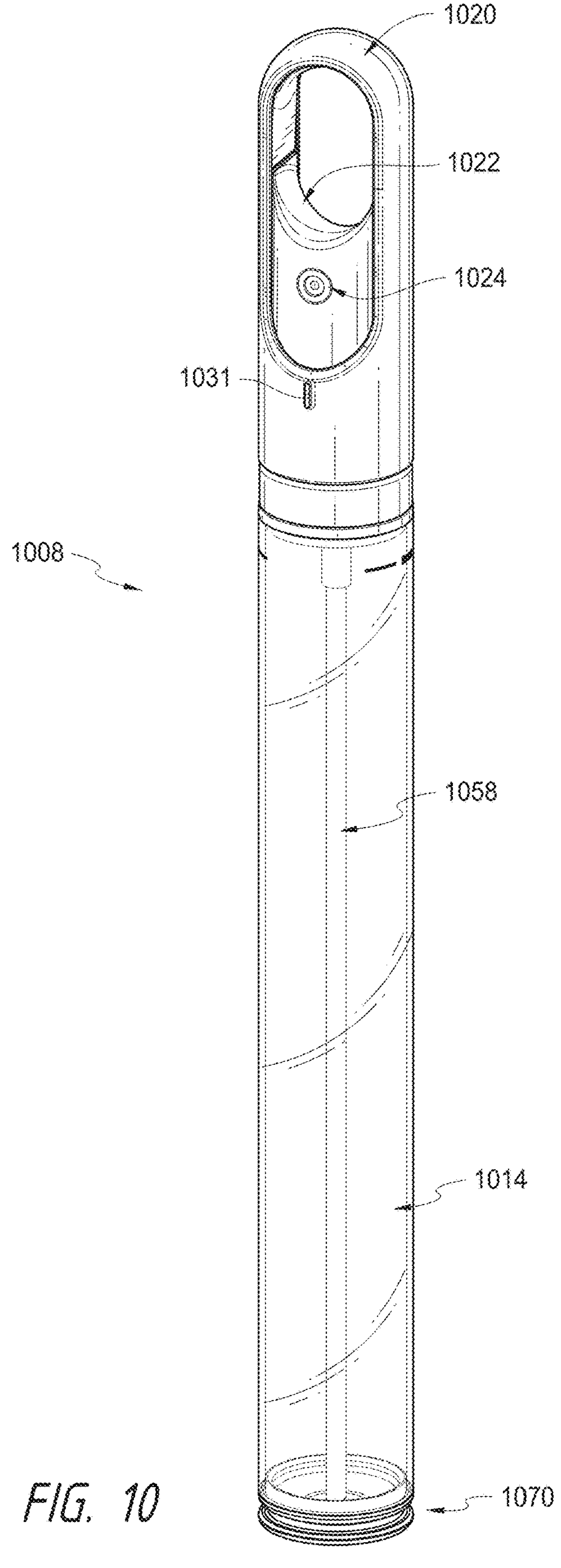
FIG. 10 is a perspective view, from above, of the front and left side of a fluid dispenser embodiment.

FIG. 10 is a perspective view, from above, of the front and left side of a fluid dispenser embodiment 1008. The description above with respect to the function and general features of all of the following can also apply to this embodiment: first dispenser 208 (FIG. 2); dispenser 308 (FIG. 3); combined dispenser 404 (FIG. 4); liquid dispenser 608 (FIG. 6); liquid dispenser 708 (FIG. 7).

The dispenser 1008 can have a spray trigger 1022, a nozzle 1024, and a liquid storage reservoir 1014 with a straw 1058 extending therein and configured to take in fluid, as shown. It can have connection features 1070 that facilitate connection at a structural interaction zone of a base (not shown—see description of the structural interaction zone 316 described above with respect to FIG. 3). In some embodiments, the connection feature 1070 can comprise a lip.

The dispenser 1008 provides an example of a sprayer sized to fit at least partially within a standard paper towel roll. It can slide into a rod holder (not shown) and be held, removably secured by, insertable, and/or nested within such a rod holder. Such a rod holder can comprise a version of the rod holder 418 described with respect to FIG. 4, for example. A taller rod holder can provide a support for a roll of paper towels when a friction feature (see the friction feature 730 of FIG. 7, for example) presses against such a roll even when a dispenser such as the dispenser 1008 has been removed, for example. The rod holder can, at some heights, support and allow the paper towel roll to remain erect despite lateral pressure from such a friction feature. The shape of the dispenser 1008 can maximize, optimize, or provide an advantageously sufficient interior reservoir volume within a central void of a rod holder. The dispenser 1008 and a corresponding holder need not be cylindrical but can form other elongate shapes (e.g., having other geometric cross-sections, such as an oval, a square, a rectangle, an octagon, etc.). Advantageously, the dispenser conforms to or is compatible with a (e.g., cylindrical) space within a holder to facilitate insertion into and withdrawal from that space, while providing a relatively large amount of liquid storage in a refillable reservoir. The sprayer can be generously sized to store enough liquid to provide for multiple uses and reduce frequency of refills.

In FIG. 10, a roll stop 1031 is seen protruding toward the front. This can help prevent or deter the dispenser 1008 from rolling off a table or countertop by interrupting an otherwise smooth cylindrical surface.

As shown, a nozzle 1024 can be located within a spray trigger 1022. In this figure, both the nozzle 1024 and the spray trigger 1022 have low profiles such that both can slide downward together during a pumping action when the spray trigger 1022 is depressed (e.g., when a finger pushes it down from above). Both do not protrude radially from the generally rod-like structure of the dispenser 1008. This allows the overall structure of the dispenser 1008 to fit within a standard paper towel roll, for example (and allow such a roll to slide on and off the dispenser 1008 if needed). In this way, an empty paper towel roll can be replaced without removing the dispenser 1008.

As shown, the dispenser may have inside a connected straw 1058, which extends down through the liquid storage reservoir 1014. The straw can be connected to the nozzle 1024. Additionally, the straw can be configured in such a way to allow liquid to flow through the straw 1058 and exit through the nozzle 1024 upon depressing the spray trigger 1022. This can be assisted by a pump mechanism, which can include a spring structure that helps return the spray trigger 1022 to an original height after it is depressed, for example.

Various approaches for holding, supporting, or securing a dispenser (e.g., a sprayer) can be employed. Some of these can include a latching function. Decoupling can release a latch or snap. Pushing can release a spring-loaded mechanism. Examples of mechanisms for such a latching function are provided herein (see, e.g., discussion of FIG. 22 et seq.).

The top of the dispenser 1008 can act as a release 1020. Such a release can receive downward force (and thereby be actuated by a user) to facilitate removal of the dispenser 1008 from a base (not shown). A release 1020 can allow a dispenser 1008 to release from the system. For example, a latch system can engage between a dispenser 1008 and/or base (not shown) on insertion of the dispenser 1008 into a rod holder. A latch system can be disengaged when a user applies pressure on a surface or release 1020 toward the top of the dispenser 1008. A release 1020 can cause the dispenser 1008 to push on a spring or other resilient feature, thereby releasing a catch that otherwise secures the dispenser 1008 into place. One or more interactive features can be released in various ways including by pulling, unscrewing, squeezing on cantilevered components, pushing, pulling, or extracting in another manner. An initial push on a release 1020 can perform one function (e.g., latching the dispenser 1008 in place), and a subsequent push on the release 1020 can perform a different function (e.g., releasing the dispenser 1008 for separate use). The descriptions above relating to release button 420 (FIG. 4) and release button 820 (FIG. 8) can apply to the top surface of the dispenser 1008, which can transfer force to a button hidden in a base of a device.

Figure 11:
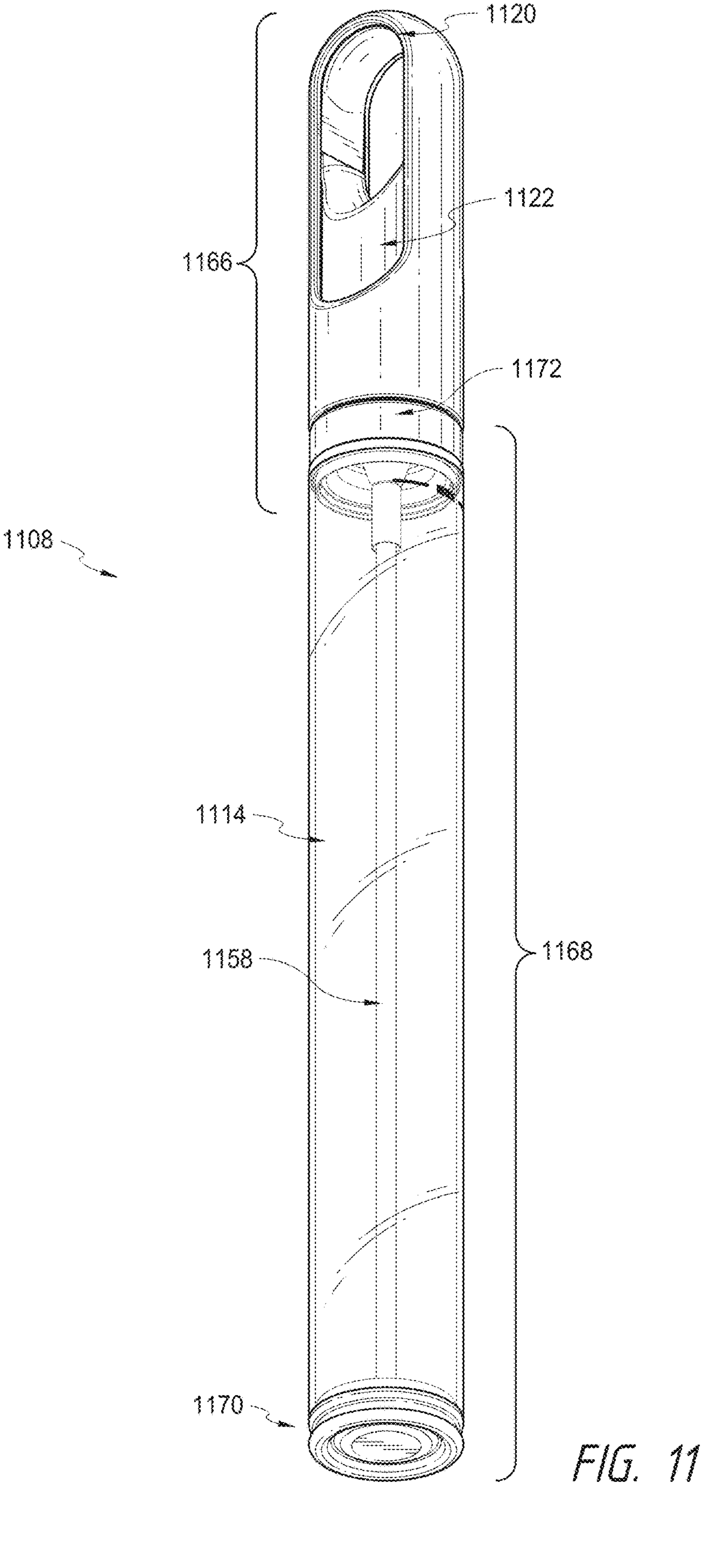
FIG. 11 is a perspective view, from below, of the right side and rear of the fluid dispenser embodiment of FIG. 10.

FIG. 11 is a perspective view, from below, of the right side and rear of a fluid dispenser 1108, consistent with the dispenser 1008 of FIG. 10. The dispenser may include some or all the features of FIG. 10 and of any of the above embodiments (e.g., combined dispenser 404, liquid dispensers 608, 708, etc.). The dispenser may have two major segments. A top segment 1166 can comprise a release 1120, a spray trigger 1022, and a nozzle (not shown in this view). A straw 1158 can be attached to the top segment 1166 of the fluid dispenser 1108 and be configured to transport fluid from the liquid storage reservoir 1114 to the nozzle as described above in connection with other embodiments (e.g., straws 958, 1058, and 1158). A bottom segment 1168 of the dispenser 1108 can comprise a liquid storage reservoir 1114 and connection features 1170 (e.g., for connection to a base). As seen in FIG. 11, the bottom segment 1168 and/or the liquid storage reservoir 1114 may have one or more side walls composed of an at least partially clear (e.g., plastic) material. The at least partially clear material can be beneficial for easily identifying the color, volume level, type, or other characteristics of the liquid contained within the liquid storage reservoir 1114. The bottom segment 1168 of the dispenser 1108 may connect to the top segment 1166 of the dispenser 1108 through the use of a connection mechanism 1172. The connection mechanism 1172 can comprise, for example, one or more of a pressure-fit, a screwing mechanism, a latching mechanism, or a clasping mechanism, for example. The connection mechanism 1172 can be configured to prevent liquid from leaking from the liquid storage reservoir 1114 while the top segment 1166 of the dispenser 1108 is connected to the bottom segment 1168 of the dispenser 1108. FIG. 11 also shows more advantageous features for user convenience. The release 1120 can take the form of a finger hook. A user can insert one or more fingers through the opening of release 1120 to conveniently carry the fluid dispenser. This can be at least partly enabled by a strong connection mechanism 1172, for example, as well as robust strength of and between both the top segment 1166 and the bottom segment 1168.

Figure 12:
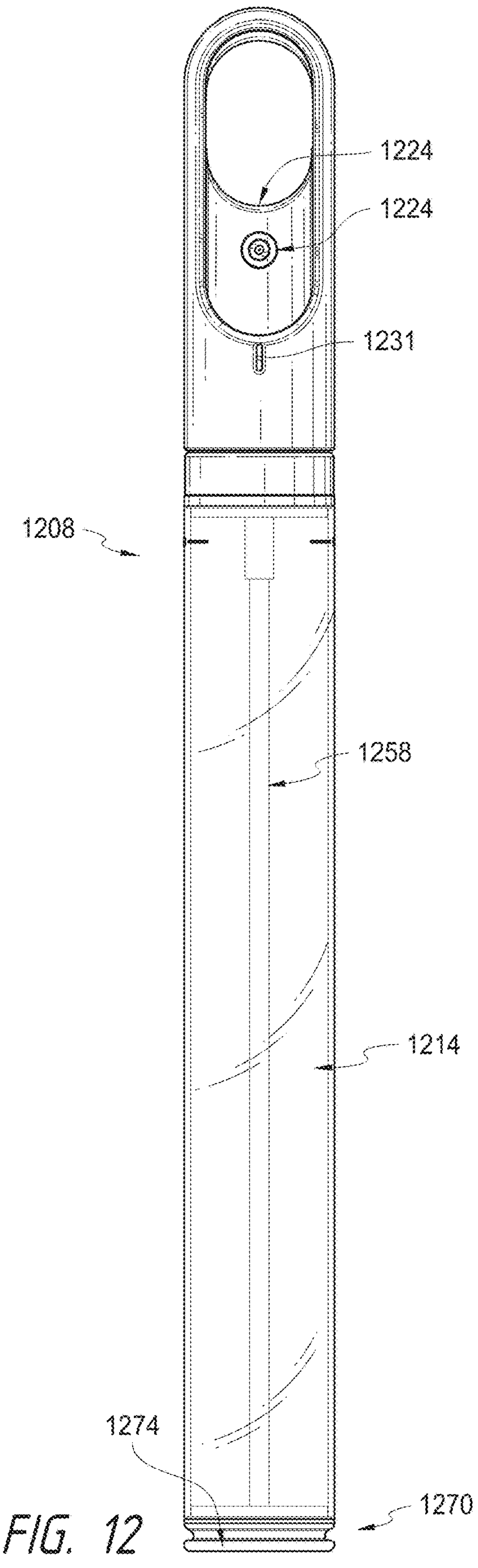
FIG. 12 is a front elevational view of the fluid dispenser embodiment of FIG. 10.

FIG. 12 is a front elevational view of the fluid dispenser embodiment of FIG. 10. As seen in FIG. 12, the connection mechanism 1270 can comprise a lip 1274. Although the base is not shown in this figure, The lip 1274 can be configured to engage with a structural interaction zone of the base to secure the dispenser 1208 thereto. As seen in FIG. 12, the nozzle 1224 can define or be located on the front of the fluid dispenser 1208. As described in connection with the embodiments above, fluid can be configured to flow through a straw 1258 from the liquid storage reserve 1214 and through the nozzle 1224 when a user depresses the spray trigger 1222. As seen in FIG. 12, the nozzle 1224 can be located on the spray trigger 1222. In some embodiments, the nozzle 1224 can be located on the spray trigger 1222 at a location such that when the spray trigger 1222 is depressed, the nozzle 1224 remains fully visible such that the spray of fluid is not inhibited by other components of the fluid dispenser 1208. This figure shows a roll stop 1231 protruding toward the front. This can help prevent or deter the dispenser 1208 from rolling off a table or countertop by disrupting an otherwise smooth cylindrical surface.

Figure 13:
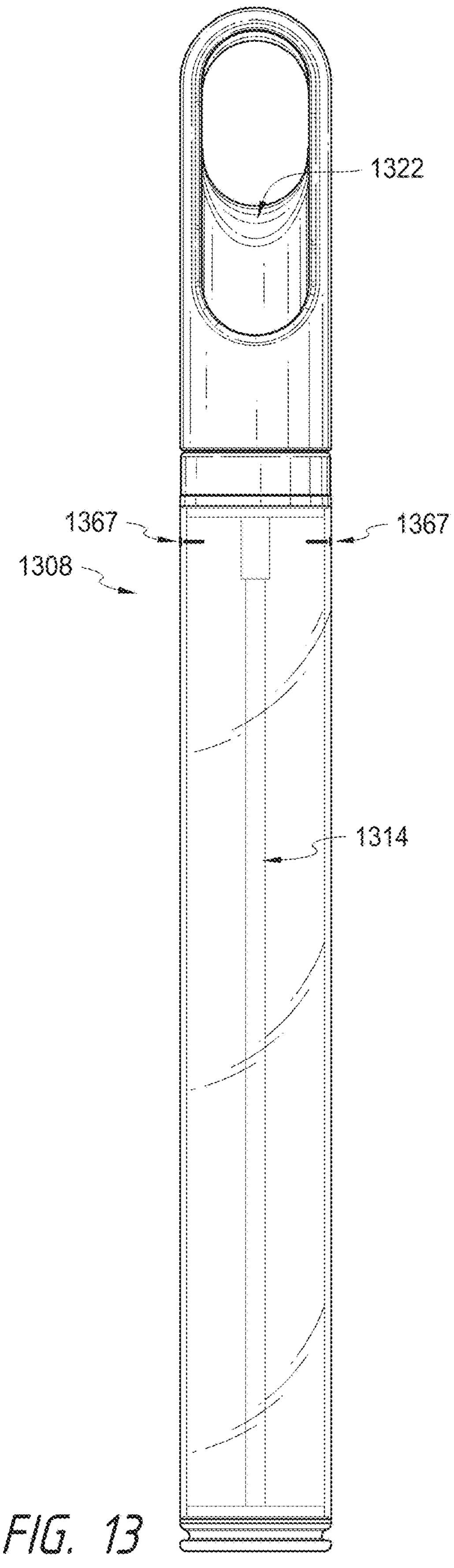
FIG. 13 is a rear elevational view of the fluid dispenser embodiment of FIG. 10.

FIG. 13 is a rear elevational view of the fluid dispenser embodiment of FIG. 10. As seen in FIG. 13, the fluid dispenser 1308 can comprise a spray trigger 1322 as described above in connection with the other embodiments. As seen in FIG. 13, the backside of the spray trigger 1322 can be angled down slightly such that a back face thereof is not as tall in comparison with a front face of the spray trigger 1322, as seen in FIG. 12. The angled backside of the spray trigger 1322 can be beneficial for an appendage, such as a finger, to more easily engage with to depress the spray trigger 1322. Additionally, the angled or sloping top/back surface of the spray trigger 1322 can be beneficial for indicating to a user on which side of the spray trigger 1322 the nozzle (not shown in this view; see 1224 of FIG. 12) is located, without the user having to look at the fluid dispenser 1308. E.g., a user can feel with a finger for the sloping surface and deduce the direction it will spray. Additionally, as seen in FIG. 13, the fluid dispenser 1308 can comprise one or more informational features such as two fill lines 1367 on either side of the fluid dispenser 1308 to indicate to a user the maximum liquid level in the liquid storage reservoir 1314.

Figure 14:
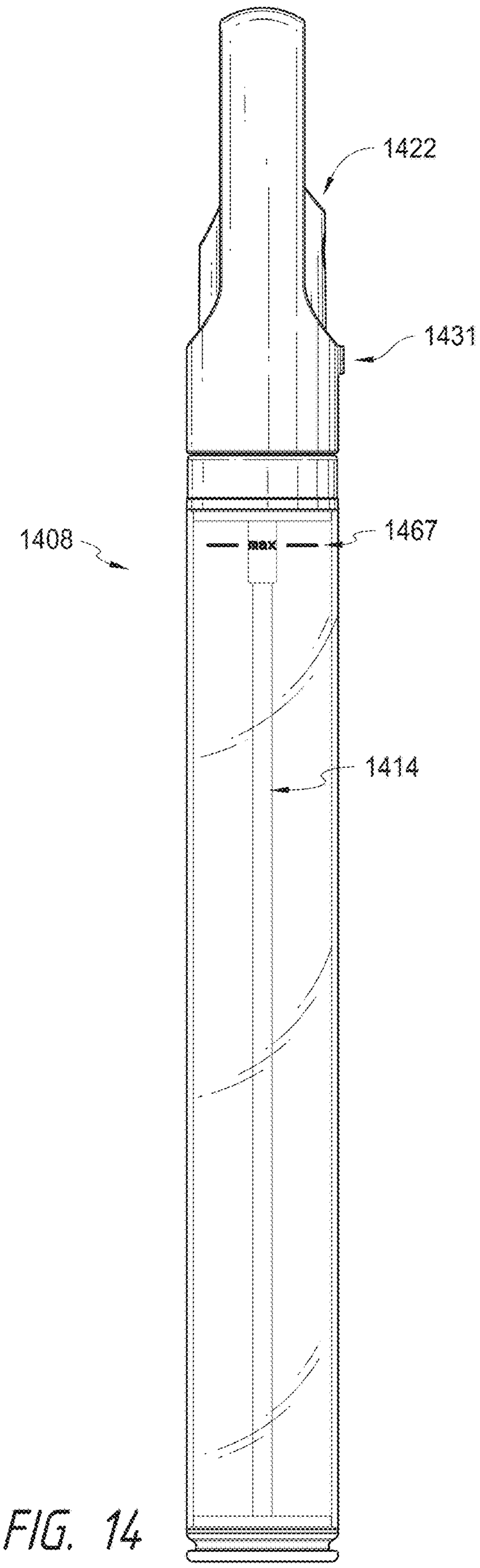
FIG. 14 is an elevational view of the right side of the fluid dispenser embodiment of FIG. 10.
Figure 15:
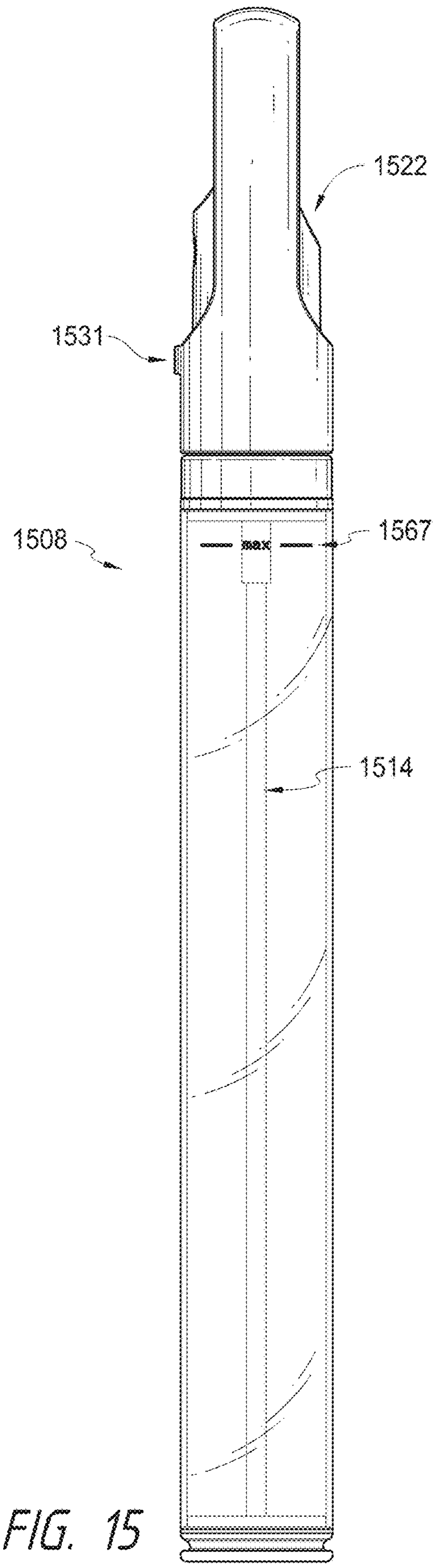
FIG. 15 is an elevational view of the left side of the fluid dispenser embodiment of FIG. 10.

FIG. 14 is an elevational view of the right side of the fluid dispenser embodiment of FIG. 10, and FIG. 15 is an elevational view of the left side of the fluid dispenser embodiment of FIG. 10. As seen in FIGS. 14 and 15 (and resulting from the downward angle referred to for FIG. 13), the back side of the spray trigger 1422, 1522 can be lower than the front side of the spray trigger 1422, 1522. As seen in FIGS. 14 and 15, the fluid dispenser 1408, 1508 can comprise a fill line 1467, 1567 to indicate the "max," or maximum fluid capacity of the liquid storage reservoir 1414, 1514. These figures show roll stops 1431, 1531 protruding toward the front. This can help prevent or deter the dispenser 1408, 1508 from rolling off a table or countertop by disrupting an otherwise smooth cylindrical outer surface.

Figure 16:
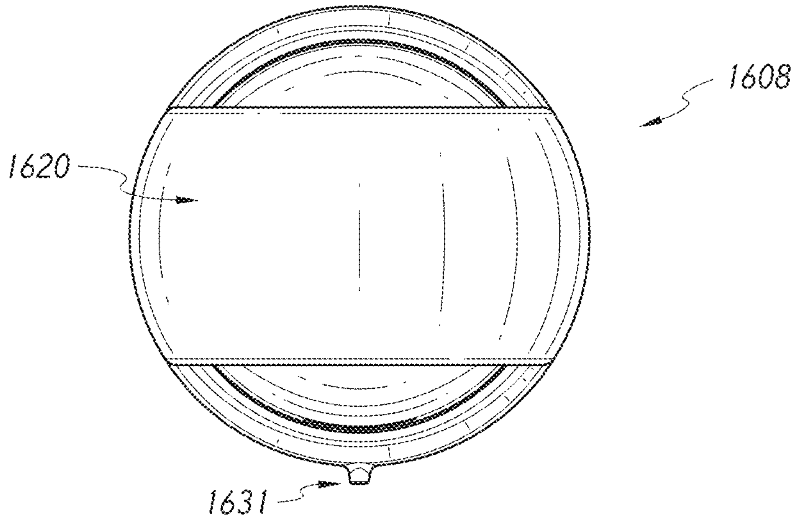
FIG. 16 is a plan view of the top of the fluid dispenser embodiment of FIG. 10.

FIG. 16 is a plan view of the top of the fluid dispenser embodiment of FIG. 10. As seen in FIG. 16, the fluid dispenser 1608 can comprise a release 1620. The release 1620 can take the form of a finger hook. The finger hook can be configured such that the fluid dispenser 1608 can be easily carried by a user with a single appendage, such as a finger. Similarly, a finger or hand can push down on the release 1620, causing the dispenser 1608 to push downward on a latch mechanism located in the base (shown in later views). Thus, the release 1620 can serve to initiate release because it protrudes in an accessible manner, even if components of the release mechanism are located further down in a less accessible location. This figure shows a roll stop 1631 protruding toward the front.

Figure 17:
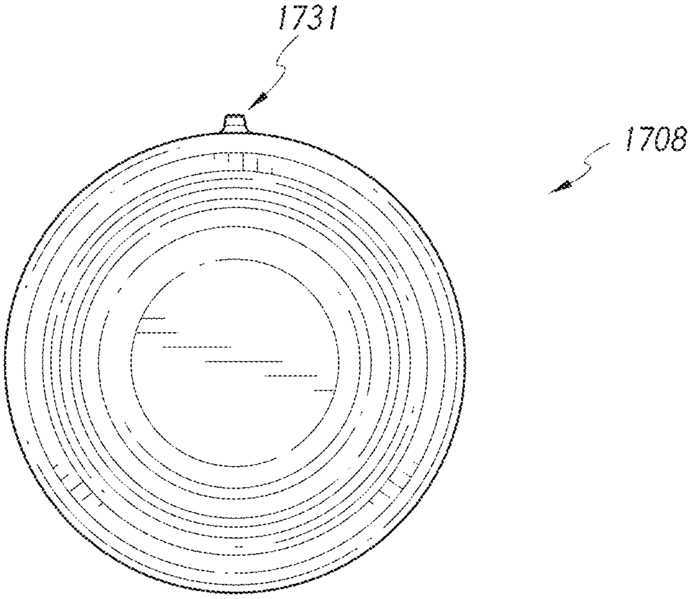
FIG. 17 is a view of the bottom of the fluid dispenser embodiment of FIG. 10.

FIG. 17 is a view of the bottom of the fluid dispenser embodiment of FIG. 10. As seen in FIG. 17, the bottom of the fluid dispenser 1708 may not be flat. A non-flat bottom can be beneficial because it can be easier to manufacture (e.g., to release from a mold without harm). Additionally, the non-flat bottom can be beneficial for providing enhanced structural integrity, given that flanges, lips, and other features can add strength and rigidity. A bottom floor of a fluid dispenser 1708 can be thicker than the one or more side walls. This can permit a dispenser 1708 to stand alone on a flat surface (e.g., by establishing a low center of mass), to strongly connect to a base, to retain its shape, to last a long time, etc. This figure shows a roll stop 1731 protruding toward the front.

Figure 18:
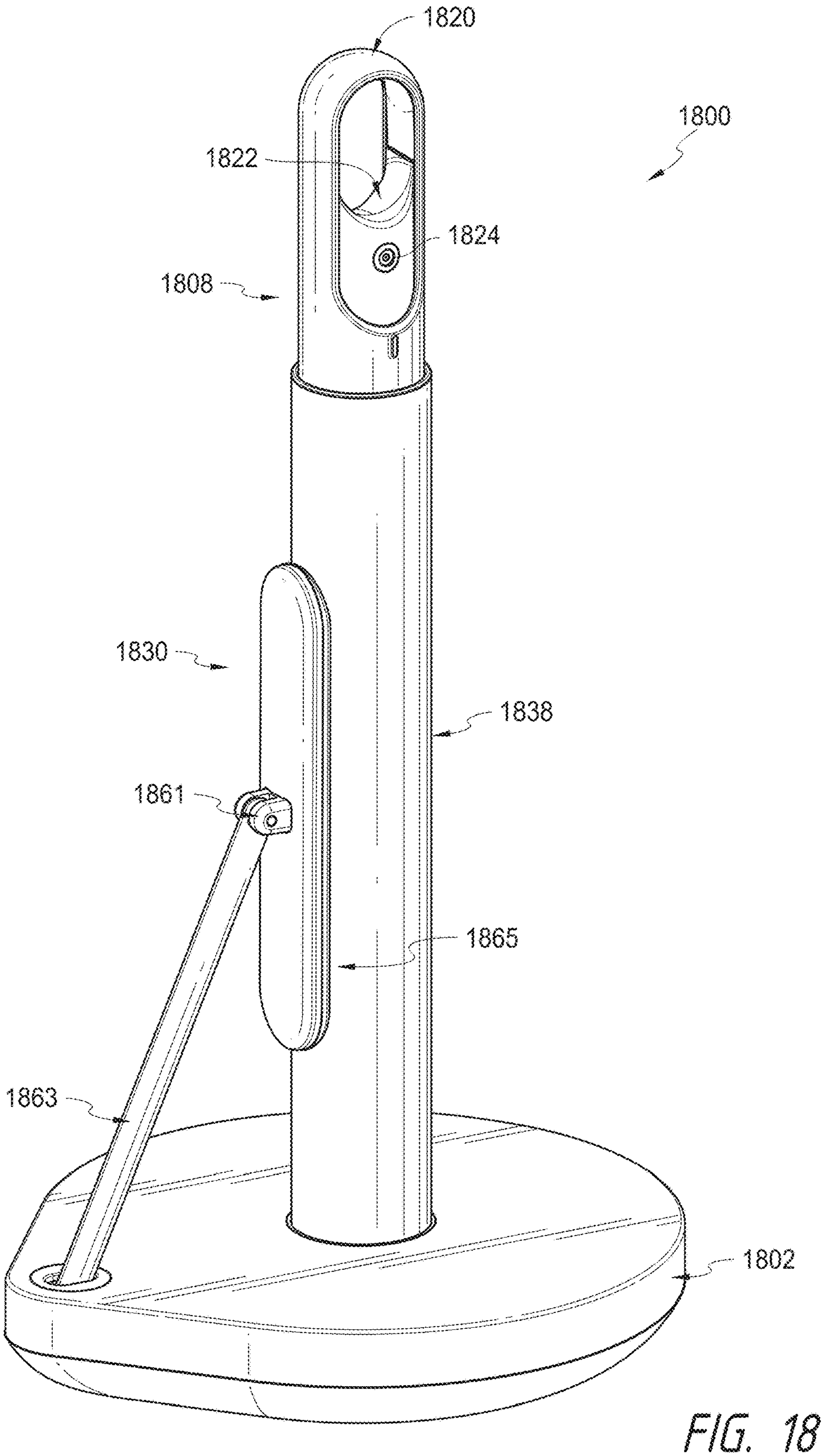
FIG. 18 shows perspective view of a compact storage and transport system similar to that seen in FIG. 7.

FIG. 18 shows a dispensing structure without any paper towels, analogous to FIG. 7. A structure 1800 can include one or more features or functions of FIG. 7, or any other figure. The structure 1800 of FIG. 18 can be composed, at least in part, of a stainless-steel material. A stainless-steel material can be beneficial for cleaning or polishing the structure 1800. The structure 1800 can comprise a fluid dispenser 1808 like the fluid dispensers described above in connection with other embodiments. The fluid dispenser 1808 can be disposed within a liquid dispenser holder 1838. The liquid dispenser holder 1838 can be a hollowed-out cylinder to allow an elongated tube to be disposed within the hollow portion of the cylinder. The fluid dispenser 1808 can comprise a liquid storage reservoir (not seen in this view). FIG. 18 shows how the liquid storage reservoir can be concealed when the fluid dispenser 1808 is disposed within the liquid dispenser holder 1838. The liquid dispenser holder 1838 can be connected to a base 1802 of the structure 1800. When the fluid dispenser 1808 is disposed within the liquid dispenser holder 1838, the fluid dispenser 1808 can be secured to the base 1802 through a securing/releasing mechanism (not shown in this view). The liquid dispenser 1808 may further comprise a release 1820, a nozzle 1824 and a spray trigger 1822 as described above in connection with other embodiments. The securing/releasing mechanism can be configured to release the liquid dispenser 1808 when a downward force is applied to the release 1820.

The structure 1800 may further comprise a friction feature 1830 like those described in connection with other embodiments. The friction feature 1830 can comprise a friction pad 1865, a rod 1863, a first connection feature 1861. It may also have one or more additional connection features (not seen in this view). As seen in FIG. 18, the friction pad 1865 can be connected, via the first connection feature 1861 to the rod 1863. The first connection feature 1861 may permit the friction pad 1865 to rotate along a rotational axis that is perpendicular or otherwise transverse to elongate axis of the rod 1863. In some embodiments, the ability of the friction pad 1865 to rotate is beneficial for consistently applying friction across an uneven surface. For example, in a static mode, it may maintain a paper towel roll in a present state, preventing further paper towels from unrolling. In a dynamic mode, it can lightly retain paper towels in place while still allowing a user to unroll paper towels and tear them off for use. In some embodiments, it can enable one-handed operation of the dispenser. When a user pulls on the end of a paper towel roll to separate the terminating paper towel, the paper towel next to the terminating one can remain, held in place by the friction pad 1865, under tension (from a hidden spring) through the rod 1863, for example.

The rod 1863 can be connected to a portion of the base 1802. The second connection feature can be located within the base and therefore not visible in FIG. 18. It may allow the rod 1863 to rotate around a rotational axis that is perpendicular or otherwise transverse to the elongate axis of the rod 1863. The second connection feature may permit the top of the rod 1863 to swing toward the liquid dispenser holder 1838 until the friction pad 1865 contacts that vertical structure. The second connection feature may also permit the top of the rod 1863 to swing in a second, opposite (outward) direction until the rod 1863 and friction pad 1865 are substantially vertical, thereby better permitting an object (e.g., a full roll of paper towels) to be disposed on the liquid dispenser holder 1838 without interference. In some embodiments, the friction feature 1838 may further comprise a spring associated with the second connection feature and configured apply to a continuing force (e.g., on the rod 1863) such that when an object such as a full paper towel roll is not disposed on the liquid dispenser holder 1838, the rod 1863 swings inwardly, in the first direction, until it makes contact with the liquid dispenser holder 1838.

Figure 19:
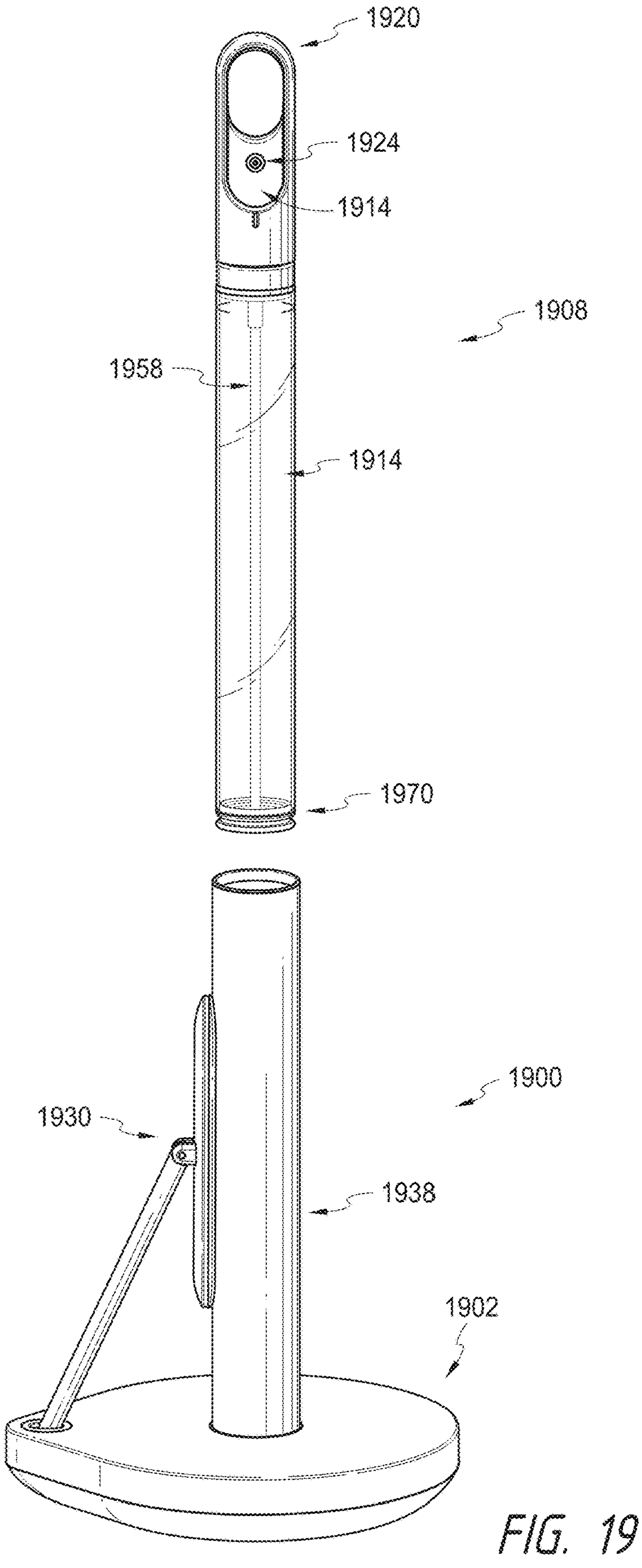
FIG. 19 shows the structure of FIG. 18 with a liquid dispenser removed from the liquid dispenser holder.

FIG. 19 is a front view of a structure consistent with FIG. 18, with the dispenser 1908 removed from the liquid dispenser holder 1938. The liquid dispenser 1908 may have all the features of a liquid dispenser described above in connection with the other embodiments (e.g., nozzle, a spray trigger, a finger hook). A liquid storage reservoir 1914 can be at least partially comprised of a clear plastic material. The clear plastic material can be beneficial for seeing the volume level and other properties of any liquid contained within the liquid storage reservoir 1914. In some embodiments, the liquid dispenser 1908 can be secured to the base 1902 by sliding the liquid dispenser 1908 into the liquid dispenser holder 1938 and applying a downward force to the release 1920 of liquid dispenser 1908. In response, the securing/releasing mechanism (not seen in this view) can be configured to engage with the liquid dispenser 1908 and secure it to the base 1902. In some embodiments, the securing/releasing mechanism is configured to engage with a connection feature 1970 at the bottom of the liquid dispenser 1908.

As seen in FIG. 19, the base 1902 of the structure 1900 can be substantially round, or it can have a generally tear-drop shape. The tear-drop shape can be beneficial for supporting a full roll of paper towels while simultaneously allowing a friction feature 1930 to be connected to the base 1902. In some embodiments, the bottom of the base 1902 can be composed of a rubberlike material. The rubberlike material can be beneficial for minimizing damage to the structure 1900 should the structure 1900 be dropped. It can also serve to provide traction and stability for a dispenser, preventing sliding on slick floors or countertops, for example, the bottom of the base 1902 can be substantially rounded such that are no sharp edges on the bottom. This can enhance survivability should the structure 1900 be dropped, since sharp corners often concentrate forces and can be susceptible to breaking. The upwardly-rounded downward facing surfaces around the perimeter of the base can also help avoid injury or pain when a user carries and, e.g., swings the device while walking. Rounded edges are less likely to cause pain when swung against a leg or knee, for example.

Figure 20:
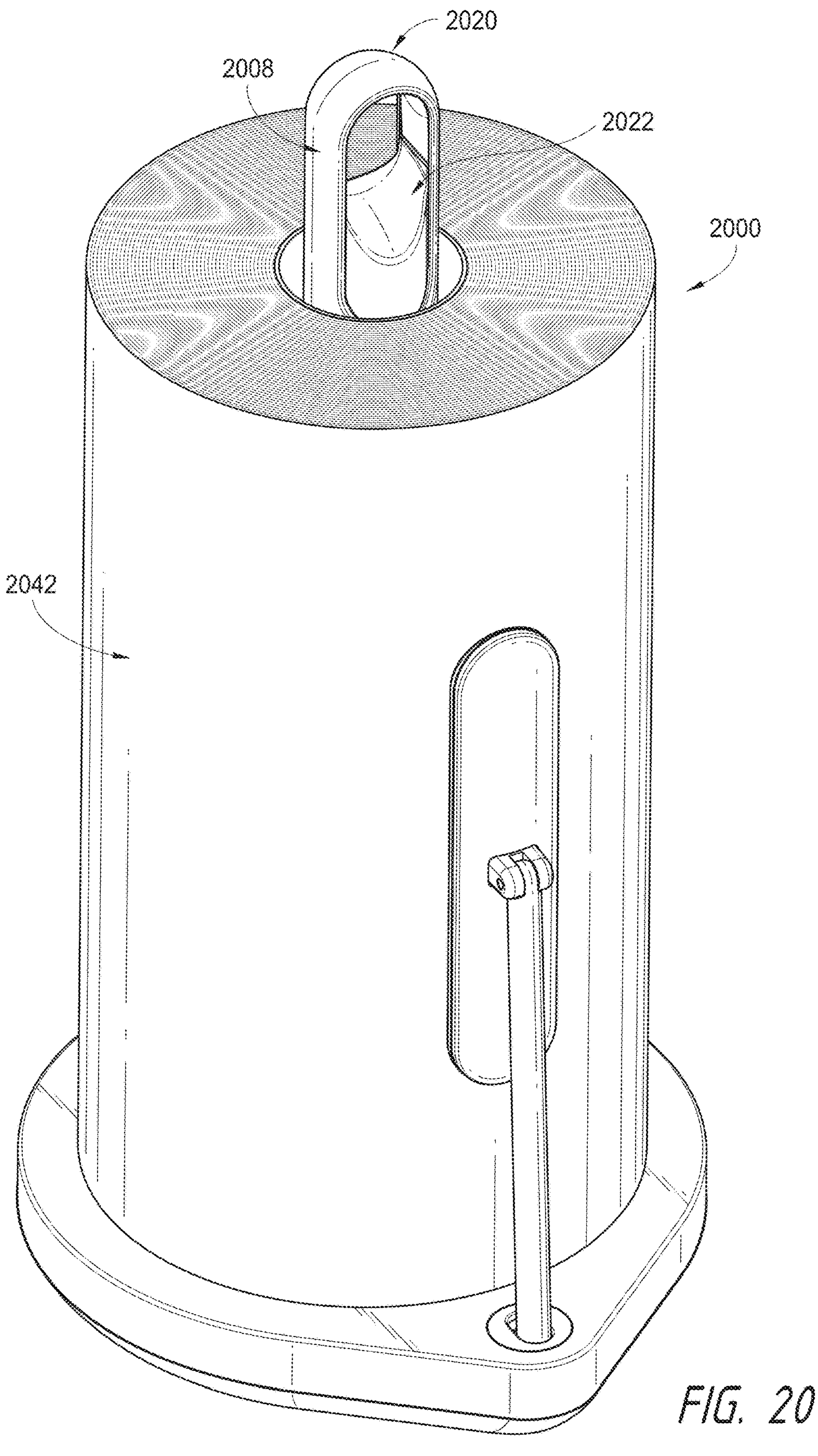
FIG. 20 is a top perspective view of the structure of FIG. 18 with a paper towel roll in place.

FIG. 20 is a top perspective view of a dispensing structure with a paper towel roll in place. The liquid dispenser 2008 and liquid dispenser holder (not seen in this view) can be configured such that a top portion of the liquid dispenser 2008 protrudes above the paper towel roll 2042. The top portion of the liquid dispenser 2008 can comprise a release 2020, a nozzle 2024, and a spray trigger 2022 of the liquid dispenser 2008. This configuration is beneficial for allowing a user to remove the liquid dispenser 2008 from the liquid dispenser holder, while a paper towel roll 2042 is disposed on the liquid dispenser holder 2008. The liquid dispenser 2008 can be disengaged for removal by applying a downward force to the release 2020 of the liquid dispenser 2008. Upon applying a downward force to the release 2020 of the liquid dispenser 2008, the securing/releasing mechanism (not seen in this view) can release the liquid dispenser 2008, thereby allowing the liquid dispenser 2008 to be pulled up and out of the liquid dispenser holder and paper towel tube. The release 2020 may take the form of a finger hook. The finger hook can be beneficial for conveniently allowing a user to grasp and remove the liquid dispenser 2008 from the liquid dispenser holder by inserting one or more fingers and lifting the liquid dispenser 2008. Accordingly, the release 2020 can have two surfaces intended for interaction with a user's finger or hand: the smooth top surface for pushing down, and a curved bottom surface for a finger to hook through and pull up.

Figure 21:
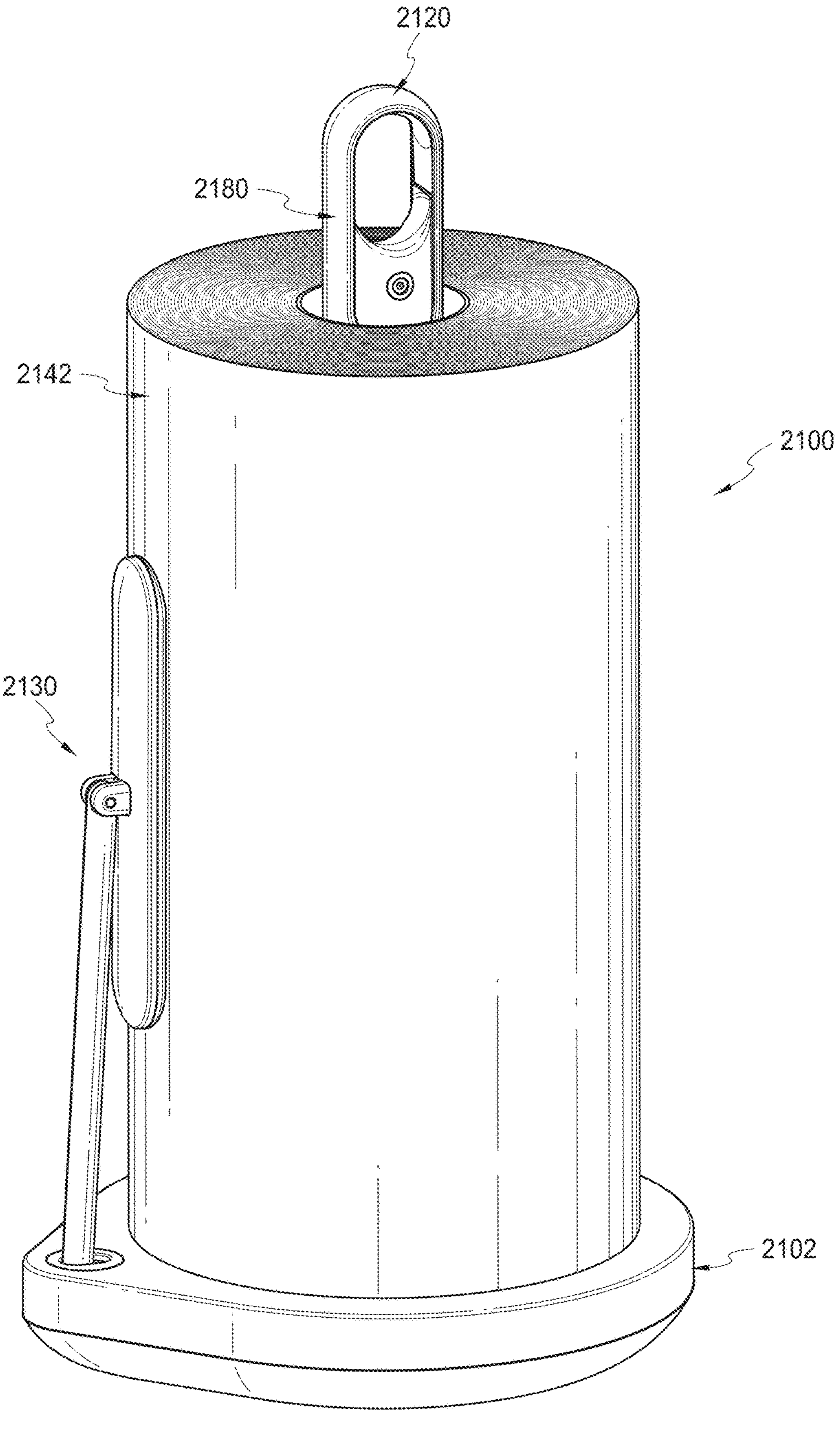
FIG. 21 is a front view of the structure of FIG. 18 with a paper towel roll in place.

FIG. 21 is a front and side perspective view of dispensing structures with a paper towel roll in place. The friction feature 2130 may apply a transverse force on the paper towel roll 2142, thereby allowing a user to conveniently tear a paper towel from the roll 2142. The force applied by the friction feature 2130 (e.g., as caused for example by a spring within the base) can be sufficient to allow convenient removal of paper towels from the roll 2142 once a scam is located next to the friction feature 2130, but advantageously the force is not so extreme as to prevent the paper towel roll 2142 from turning on the liquid dispenser holder prior to that time, so the seam can be positioned for towel removal. In some embodiments, the force applied by the friction feature 2130 is sufficient to detach a single paper towel from the roll 2142 using only one appendage (e.g., one hand), because the friction feature 2130 can stabilize and provide a countervailing force to the user's ripping force. As seen in FIG. 21, the liquid dispenser 2108 can be disposed within the obscured liquid dispenser holder such that a top portion of the liquid dispenser 2108 protrudes from the top of a paper towel roll 2142. In some embodiments, a finger hook 2120 protrudes from the top of the paper towel roll 2142 such that an appendage can easily lift the liquid dispenser 2108 from the liquid holder dispenser.

Figure 22:
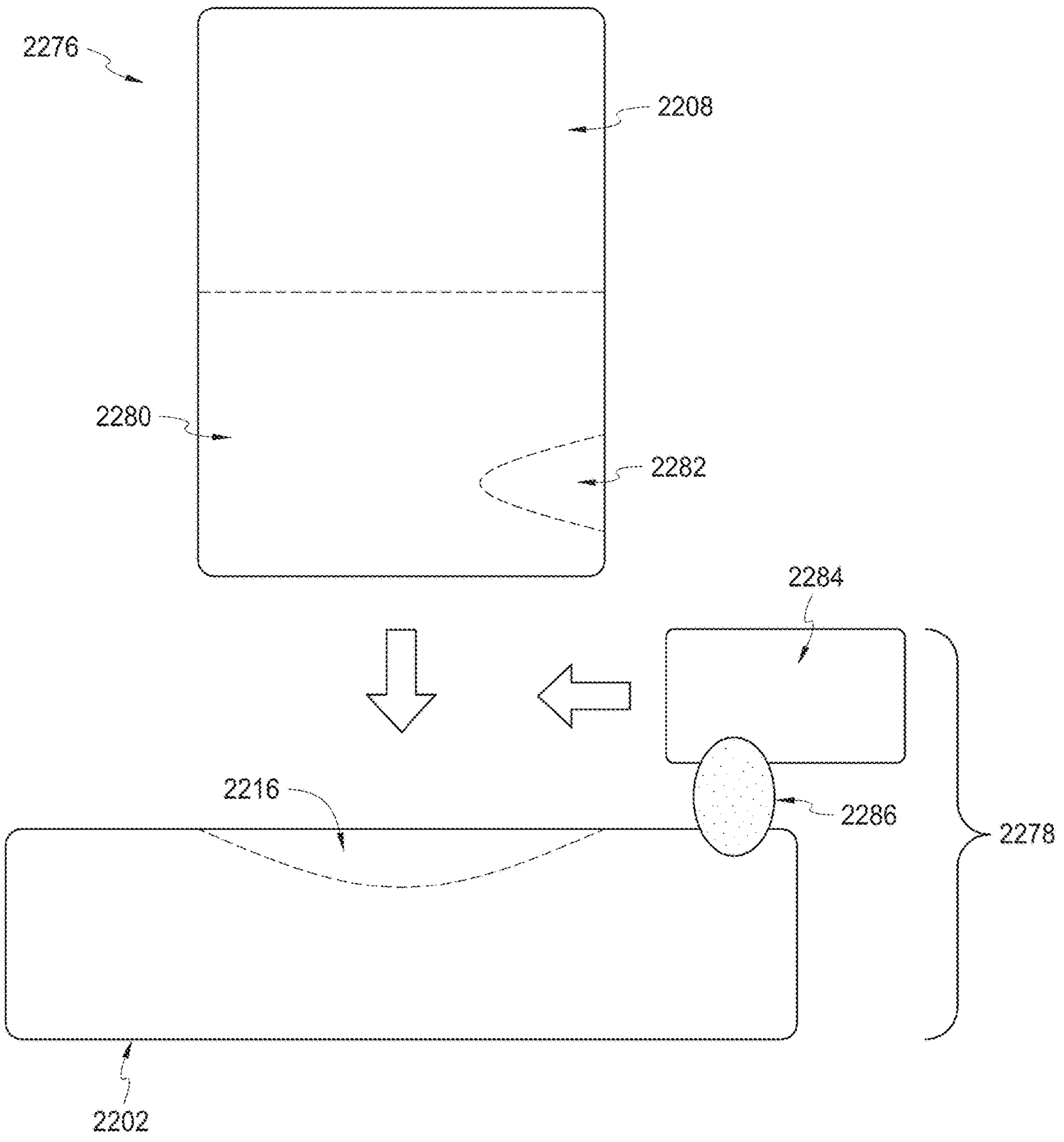
FIG. 22 schematically illustrates a storage and transport system with securement features.

FIG. 22 schematically illustrates a system for securing and releasing an object. As seen in FIG. 22, the system 2276 can comprise an object 2208 to be secured or released and a securing/releasing mechanism 2278. In some embodiments, the object 2208 is the fluid dispenser described herein. The object 2208 can comprise a releasable portion 2280. In some embodiments, the releasable portion 2280 can be near or at the bottom of the object 2208. The releasable portion 2280 of the object 2208 can comprise at least one retention zone 2282. In some embodiments, the at least one retention zone 2282 can comprise a lip or other engageable feature (see, e.g, the lip 1274 of FIG. 12) configured to the engage with a retention feature 2284 of the securing/releasing mechanism 2278.

The securing/releasing mechanism 2278 can comprise a base 2202, a trigger zone 2216, one or more retention features 2284 and an interaction complex 2286. In some embodiments, the base 2202 may have features similar to those described above for the base of any of the above embodiments. The trigger zone 2216 can be configured to activate upon engaging with the object 2208. Upon activating, the trigger zone 2216 may cause the interaction complex 2286 to engage with the retention feature(s) 2284, which in turn may perform a first function (e.g., a mechanical function such as engaging with the retention zone 2282 of the object 2208, thereby securing the object 2208 to the securing/releasing mechanism 2278). In some embodiments, the trigger zone 2216 can be configured to activate a subsequent time. After activating for a second time, the trigger zone 2216 may cause the interaction complex 2286 to engage with the at least one retention feature 2284, which in turn may perform a different, second function (e.g., disengaging from the retention zone 2282 of the object 2208, thereby releasing the object 2208 from the securing/releasing mechanism 2278). Thus, the same triggering motion (e.g., pushing down) can cause two different results, depending on whether the starting condition is engaged or disengaged. In some embodiments, the interaction complex can comprise a latch carriage.

Similarly, a triggering force can have two different effects based on a sequence. In some embodiments, the trigger zone 2216 can comprise a push mechanism which is activated by the object 2208 exerting a downward force upon the trigger zone 2216. In some embodiments, the trigger zone 2216 is configured such that an initial activation of the trigger zone 2216 causes the one or more retention features 2284 to engage the one or more retention zones 2282 of the object 2208, thereby securing or retaining the object. In some embodiments, the trigger zone 2216 is further configured such that a subsequent activation of the trigger zone 2216 causes the one or more retention features 2284 to disengage the one or more retention zones 2282 of the object, thereby releasing the object 2208. In some embodiments, the interaction complex 2286 can comprise a spring or other similar component configured to engage with the at least one retention feature 2284. The interaction complex 2286 can comprise a latch carriage. The at least one retention feature 2284 can comprise a latch or clasp or similar feature. The one or more retention zones 2282 of the object 2208 can be configured to engage with one or more retention features 2284 of a securing/releasing mechanism 2278.

Arrows in FIG. 22 indicate how an object 2208 can engage with another object (e.g., a base 2202) in one direction, but be retained through engagement from a transverse direction (e.g., using a retention feature 2284). However, other engagement and retention directions are possible. Mechanical interaction between objects, subject to resilient forces, can be established using various complementary structures. The shape of the engaging structures can be configured for compatibility with the engagement and retention movements and directions. However, transverse retention can be an advantageous way to establish sufficient strength for carrying a relatively heavy base, as illustrated by examples herein.

Figure 23:
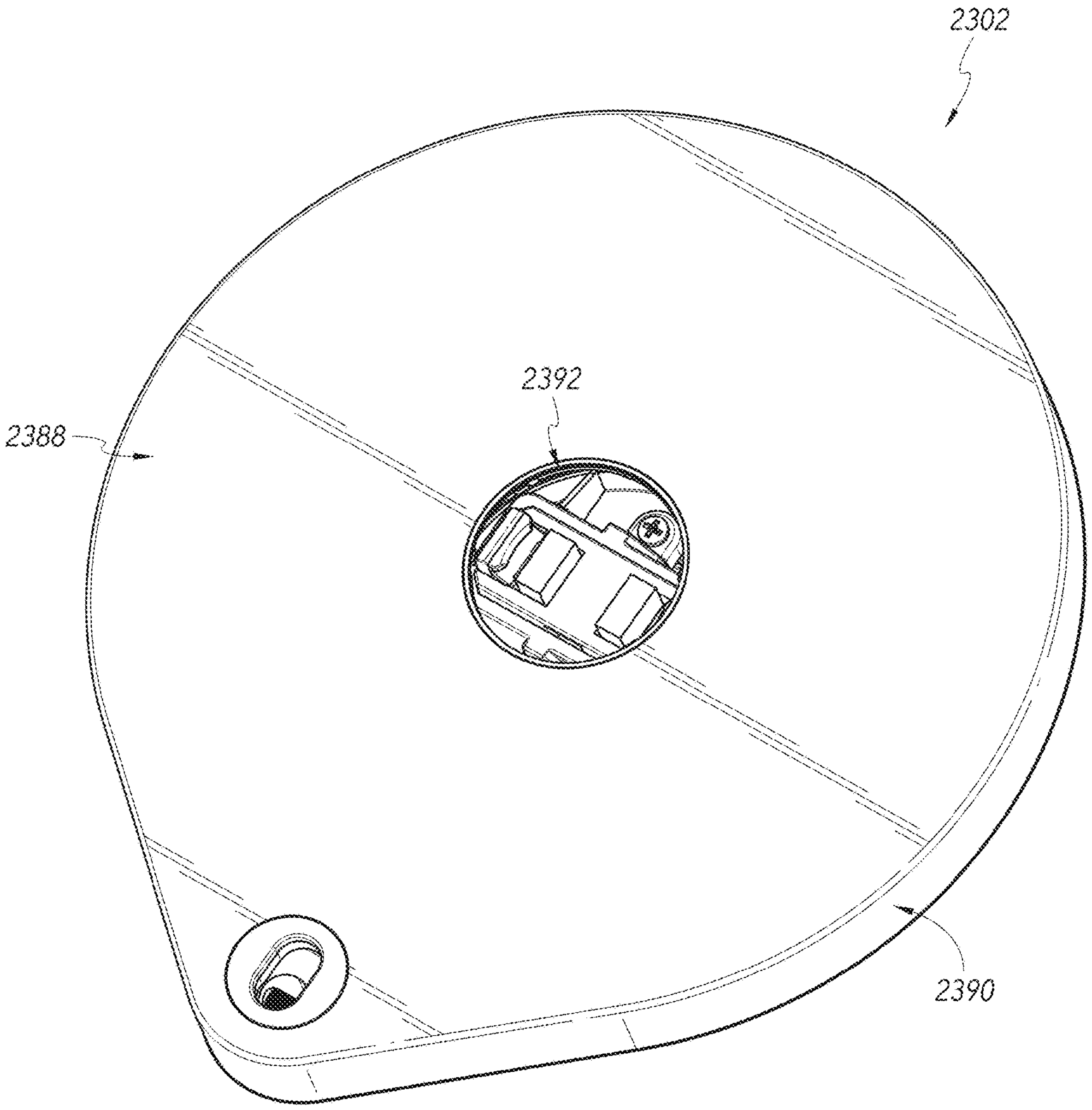
FIG. 23 is a top perspective view of a base containing a system for securing and releasing an object.

FIG. 23 is a top perspective view of a base 2302, consistent with descriptions of other bases herein, but not showing the fluid dispenser or the other elevated features. As seen in FIG. 23, the base 2302 may have a top cover 2388 and a bottom feature 2390. A latch system 2392 can be disposed within the base 2302. The latch system 2392 can be configured to engage the fluid dispenser (not shown, see 1208 of FIG. 12) and secure it to the base 2302. In this view, a hollow supporting tube (e.g., the liquid dispenser holder 1938 of FIG. 19) is not illustrated. This allows a better view of the interior of the base 2302, including the latch system 2392. Such a latch system can be present whether or not the system includes a hollowing supporting tube above it.

Figure 24:
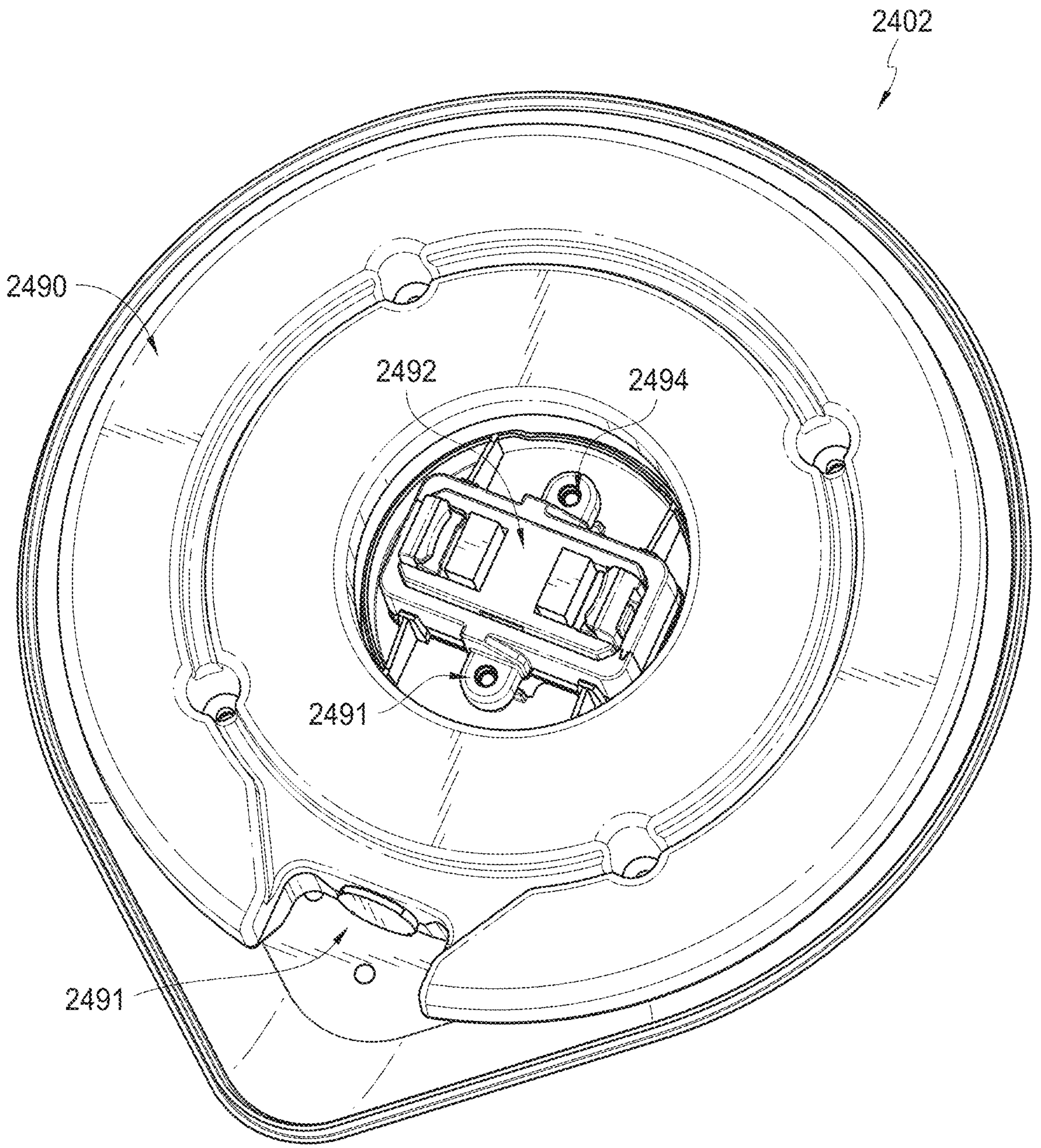
FIG. 24 shows a front perspective view of FIG. 23 with the top cover of the base removed.

FIG. 24 shows a front perspective view of the structure introduced in FIG. 23, but with a top cover of the base 2402 removed. The latch system 2492 can be secured to the bottom feature 2490 of the base 2402. In some embodiments, the bottom feature 2490 provides a ballast or stabilizing weight effect, among other roles, and can be similar to the heavy, anchoring base of a lamp, for example. With such a base, a center of gravity for an entire system can be approximately the same location as, or slightly above, the latch system 2492. As seen in FIG. 24, the latch system 2492 can comprise wings 2494, which can be used to secure the latch system 2492 to the bottom feature 2490 of the base 2402 through the use of screws, nails, bolts or other similar devices. They can facilitate a strong connection between the latch system 2492 and the base 2402. This can be useful because in some embodiments, the entire system can be lifted by the liquid dispenser, such that the base 2490 is dangling from the latch system 2492, and wings 2494 essentially support the base (using screws or the like). Accordingly, robust materials and sizes are helpful for the connecting structures such as the wings 2494 and any related fasteners.

The latch system 2492 can be shaped and oriented to seat a liquid dispenser in an erect and non-tilting position such that it easily occupies an upright tubular space within a hollow supporting tube (e.g., the liquid dispenser holder 1938 of FIG. 19). Advantageously, such a dispenser slides into and out of such a hollow supporting tube with minimal, if any friction or contact with closely adjacent side walls. A close fit can help maximize the volume available within the liquid dispenser, increasing the time between required refills. The top of the latch system 2492 can be parallel to a flat surface on which the base 2402 rests. The latch system 2492 can also be centered, allowing any connected liquid dispenser to also be centered within any hollow supporting tube above, or within a paper towel roll, or both.

FIG. 24 also shows that a notch 2491 can be provided in the generally disc-like shape of the base 2490. Such an opening can provide space for a mechanism supporting a friction feature. For example, the friction feature 1830 of FIG. 18 can have a rod 1863 that is supported in the base 2490 with one or more connection features. These connection features can be located in or near the notch 2491.

Figure 25:
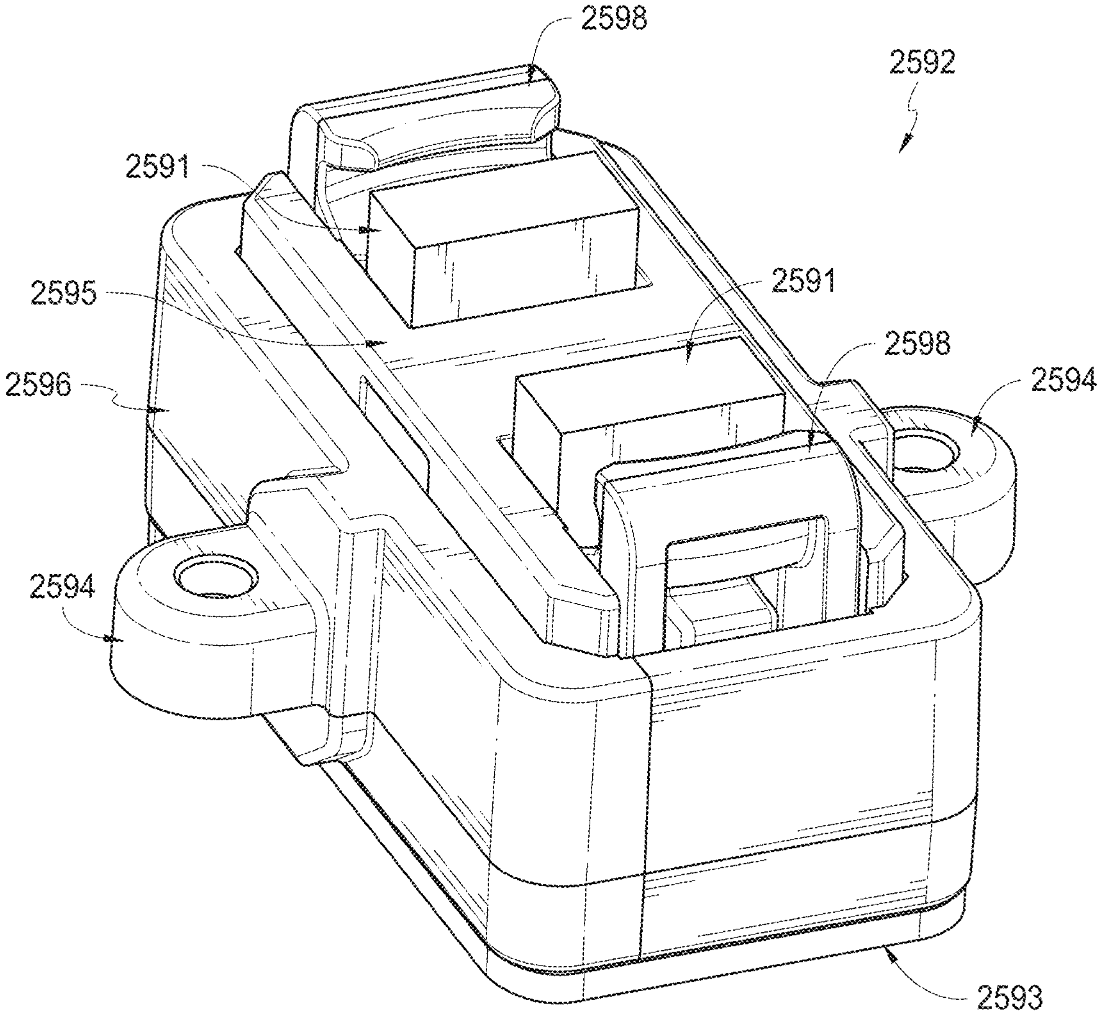
FIG. 25 is a front top perspective view of a latch system.

FIG. 25 is a front top perspective view of a latch system 2592, consistent with other embodiments herein. This illustrates transverse engagement, because latching components (described further below) are activated from above and move in and out, in a transverse direction, closer to and farther away from the elongate axis of a liquid dispenser. The transverse movement can be pivoting movement, as the latches pivot such that their tops move in and out while their bottoms are linked to a pivoting axis.

Figure 29:
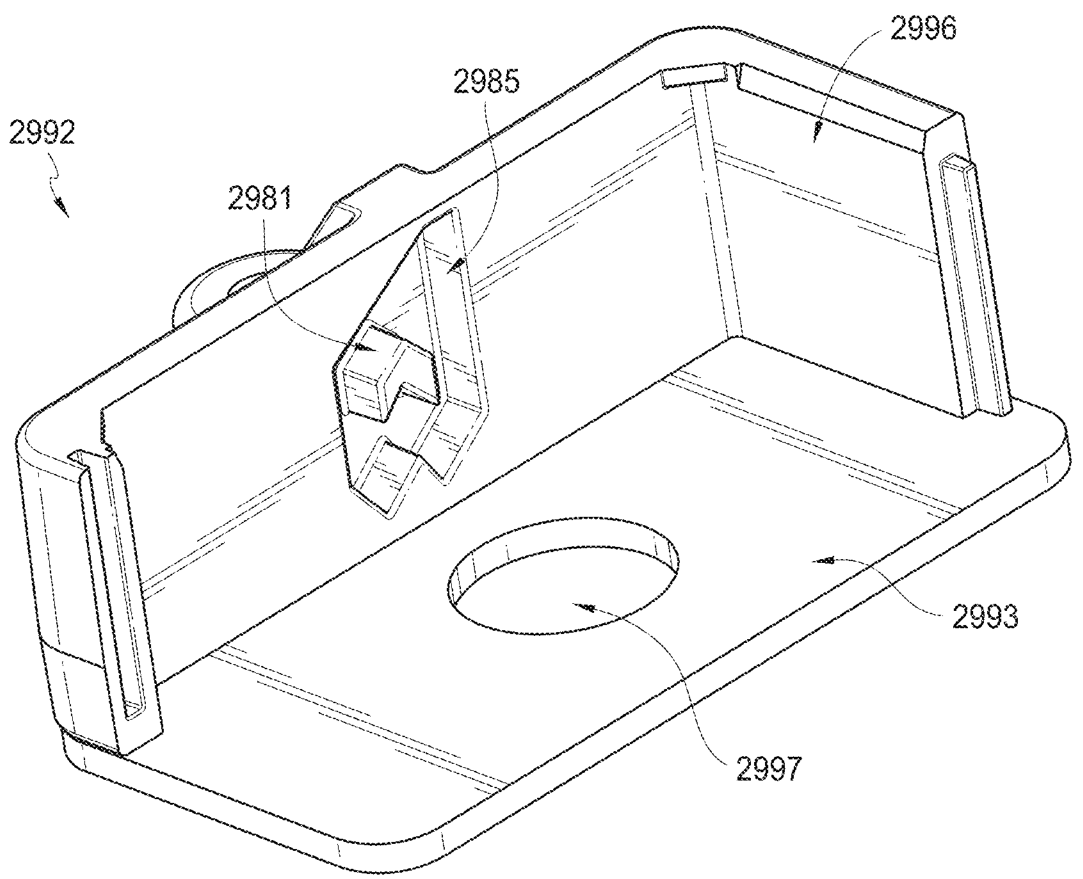
FIG. 29 shows a front top perspective view of the outer casing and the base plate of a latch system.

Turning to the specific components of FIG. 25, The latch system 2592 can comprise an outer casing 2596, a plurality of latches 2598, a catch (not seen in this view), a central spring (not seen in this view), a plurality of stabilizers 2591, a base plate 2593, an inner structure 2595 and mini springs (not seen in this view). The outer casing 2596 can be substantially rectangular in shape with openings in the top and bottom. As seen in FIG. 25, the opening in the top of the outer casing 2596 can be configured to allow the inner structure 2595 to be snugly contained by and disposed in the outer casing 2596. The inner structure 2595 can comprise gaps on its front and back sides, the gaps configured to contain the plurality of latches 2598 and stabilizers 2591. The base plate 2593 may cover the bottom of opening of the outer casing 2594. The outer casing 2594 can comprise wings 2594, which allow the latch system 2592 to be attached to the base through the use of a screw, bolt, or similar fastener. In some embodiments, the inner surfaces of the outer casing 2596 can contain angular cavities (as seen in FIG. 29). The angular cavity areas can be configured to allow the catch (not seen in this view) to move between multiple positions. The structures shown in FIG. 25 generally stabilize, contain, and position the latches and stabilizers 2591 so they can interact with (latch onto and release) a liquid receptacle with cooperating features. Many other configurations are possible, consistent with this example and the underlying principles (e.g., principles of a latch and release system having transverse movement). In some embodiments, the stabilizers 2591 can act as triggers. A liquid container can press down upon their top flat surfaces, pushing them to, in turn, push down on structures (e.g., resilient structures) underneath. This can cause lateral movement of the latches 2598 (e.g., they can spring inwardly to retain a lip of a liquid container), as explained further herein.

Figure 26:
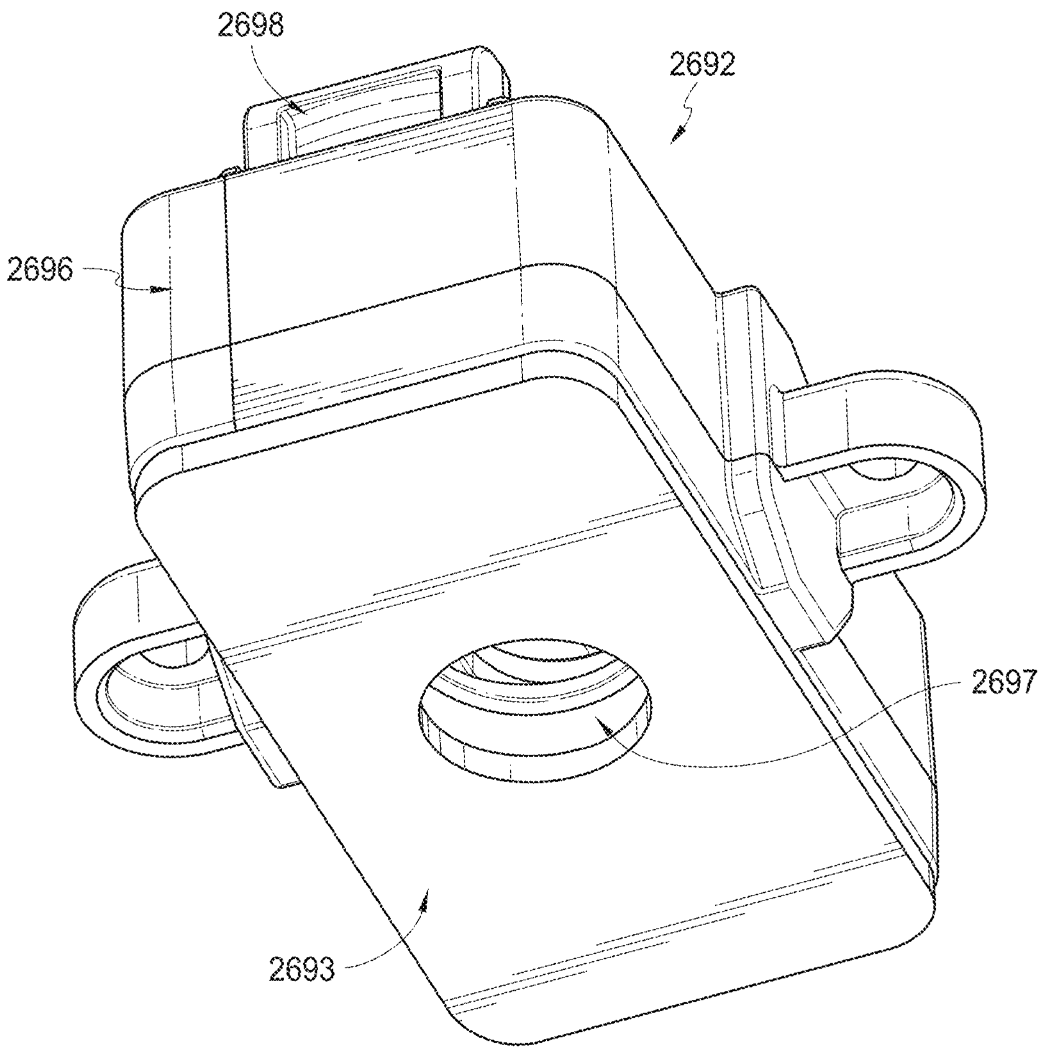
FIG. 26 is bottom front perspective view of the latch system of FIG. 25.

FIG. 26 is a bottom front perspective view of a latch system 2692 as described above. As seen in FIG. 26, the outer casing 2692 can comprise an opening on the bottom side of the outer casing 2692. The base plate 2693 can be configured to cover the bottom opening of the outer casing 2692. Additionally, the base plate 2693 can comprise a hole 2697 configured to allow a spring to extend, connect, or pass through the base plate 2693. In some embodiments, the hole 2697 can be substantially in the center of the base plate 2693. In some embodiments, the hole 2697 can be substantially circular in shape.

Figure 27:
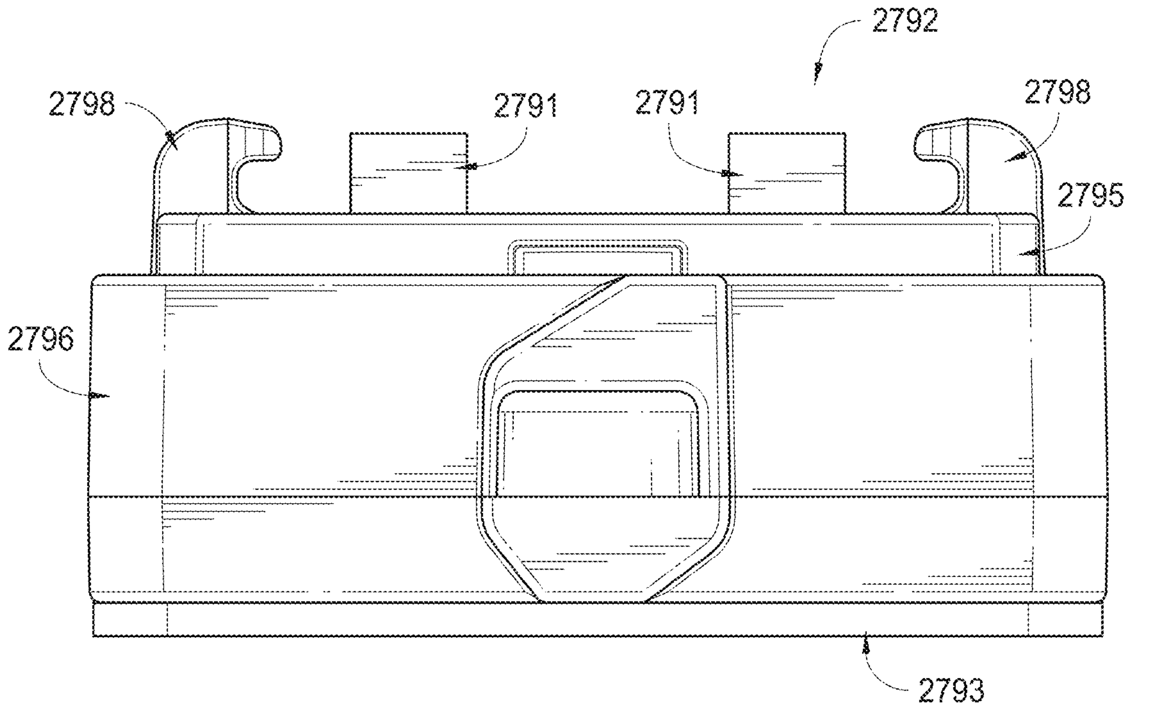
FIG. 27 is a side view of the latch system of FIG. 25.

FIG. 27 is a side view of a latch system 2792 as described above. As seen in FIG. 27, the inner structure 2795 can be disposed within the outer casing 2796 and protrude above it. Additionally, the plurality of latches 2798 can protrude further, above the inner structure 2795. The plurality of stabilizers 2791 may also protrude above the inner structure 2795. The profile shown here can represent the latch system 2792 in a non-latched state. That is, a liquid dispenser is not present, so the stabilizers 2791 (which can also act as triggers or latch controls) are configured to await contact from above by the base of a liquid dispenser. Similarly, the latches 2798 are positioned farther to the left and right (laterally spaced) such that the base of a liquid dispenser can penetrate between them, push down the stabilizers 2791, and cause the latches 2798 to spring or rotate inwardly, grasping and latching to the base of a liquid dispenser. A subsequent, releasing trigger can involve different movements.

Figure 28:
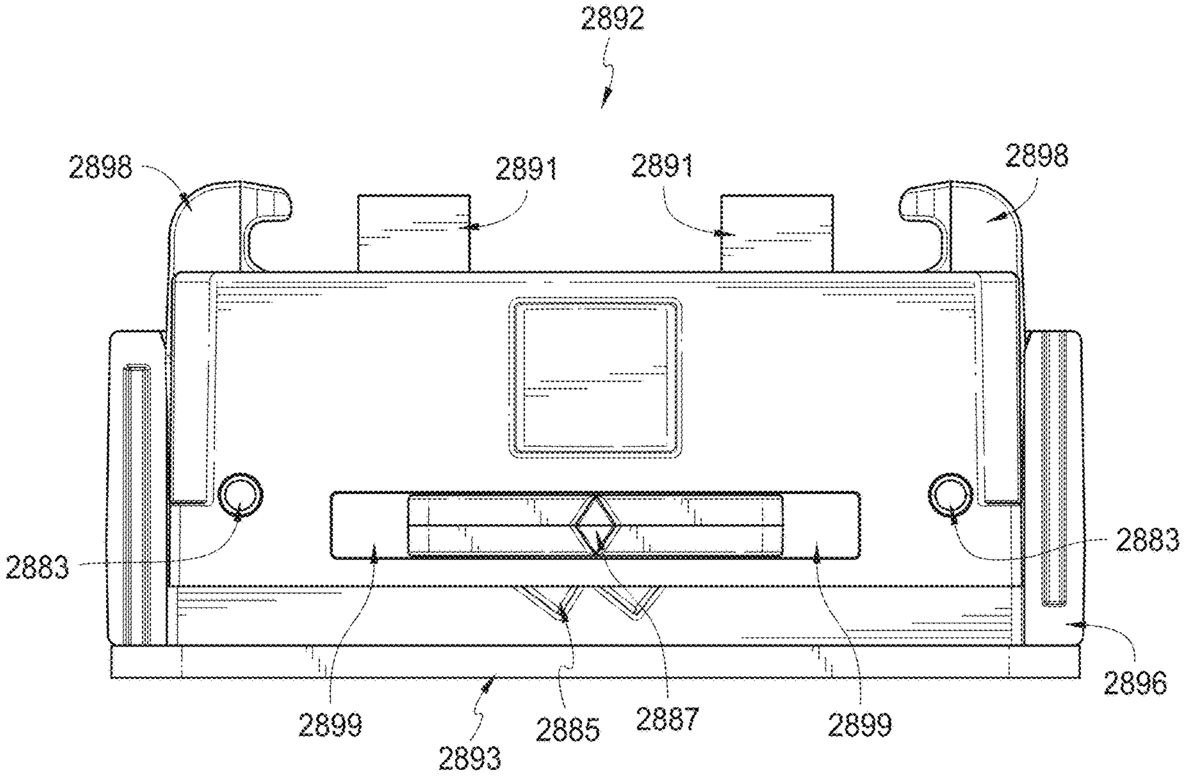
FIG. 28 is another side view of the latch system of FIG. 25 with a portion of the outer casing removed.

FIG. 28 is another side view of a latch system 2892 with a portion of the outer casing 2896 removed. As seen in FIG. 28, the inner structure 2895 can comprise a slot 2899 toward the bottom, wherein a catch 2889 can be disposed. The slot 2899 can be substantially rectangular in shape. The catch 2889 may also be substantially rectangular in shape so as to be disposed within and protrude laterally through the slot 2899 of the inner structure 2895. In some embodiments, the catch 2889 can be configured for lateral translation, within the constraining slot 2899, which provides space to the left and right of the catch 2889 in this figure. the catch 2889 can comprise a plurality of angular protrusions 2887 (protruding toward the viewer, out of the page in this view) configured to engage with angular cavity areas 2885 in the outer structure 2896. A similar protrusion can be found protruding backward, out of the page on the other side of the catch 2889, which can have bilateral symmetry across a line passing between the latches 2898. The plurality of latches 2898 can be secured to the inner structure 2895 through the use of rotation pegs 2883.

FIG. 29 shows a front top perspective view of the outer casing 2996 and base plate 2993. In FIG. 29, one half of the outer casing 2996 is removed to see the inner surfaces. As shown, the angular cavity area 2985 of the outside casing 2996 can comprise an elevated area 2981. In some embodiments, the elevated area 2981 can be substantially near the center of the angular cavity area 2985. The angular cavity 2985, combined with the elevated area 2981, can form a pathway or series of positions through which protruding elements (e.g., the angular protrusion 2887 of FIG. 28) can pass. The W-shaped base of this cavity can form two separate stable positions for an angular protrusion having a diamond shape, for example. Such a protrusion can be allowed to pass over the center peak of the W, as its top point enters the corresponding peaked opening in the elevated area 2981.

Figure 30:
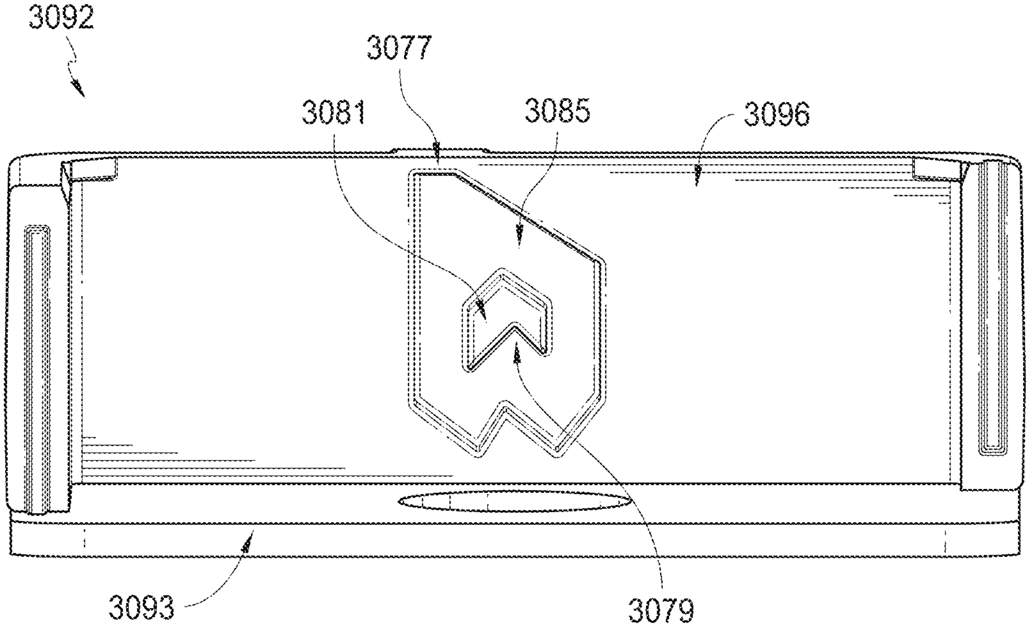
FIG. 30 shows a side view of the outer casing and the base plate of FIG. 29.

FIG. 30 shows a more direct side view of an outer casing 3096 and base plate 3093. As in FIG. 29, one half of the outer casing 3096 is removed to better see the inner surface of the outer casing 3096. Similar to FIG. 29, an angular cavity area 3085 of the outer casing 3096 can be configured such that an angular protrusion (not seen in this view; see 2887 of FIG. 28) of the catch (not seen in this view; see 2889 of FIG. 28) may move between a plurality of positions in the angular cavity area 3085 of the outer casing 3096. One stable position 3079 can be located beneath the elevated portion of the angular cavity area. The side walls and the elevated portion 3081 of the angular cavity area can be configured to constrain movement of the angular protrusion. Another stable position 3077 can be located near the top of the of angular cavity area.

The angular cavity area of the outer casing can be configured such that when a protrusion is located in the top left position 3077 and sufficient downward force is applied to the inner structure, and therefore to the catch, the angular protrusion moves from the top position, down the left channel, and into a left, lower position. The sloped angle of the bottom wall shifts the protrusion to the right, and when the downward force is removed, a spring below can push the catch upward and further to the right, such that the angular protrusion enters the bottom central position 3079. A subsequent downward force can cause the protrusion to move down and to the right, and when the downward force is removed, a spring below can push the catch upward such that the angular protrusion rises vertically, then up to the left until it reaches the upper left position 3077. Thus, under constant spring pressure from below, and periodic downward pressure from above, the channel and notch pattern shown can allow a protrusion to progress through generally counter-clockwise movement in two dimensions between the two stable positions 3077 and 3079. A similar angular cavity mirrors this one as is formed in the side wall 3096 on the opposite side.

Figure 31A:
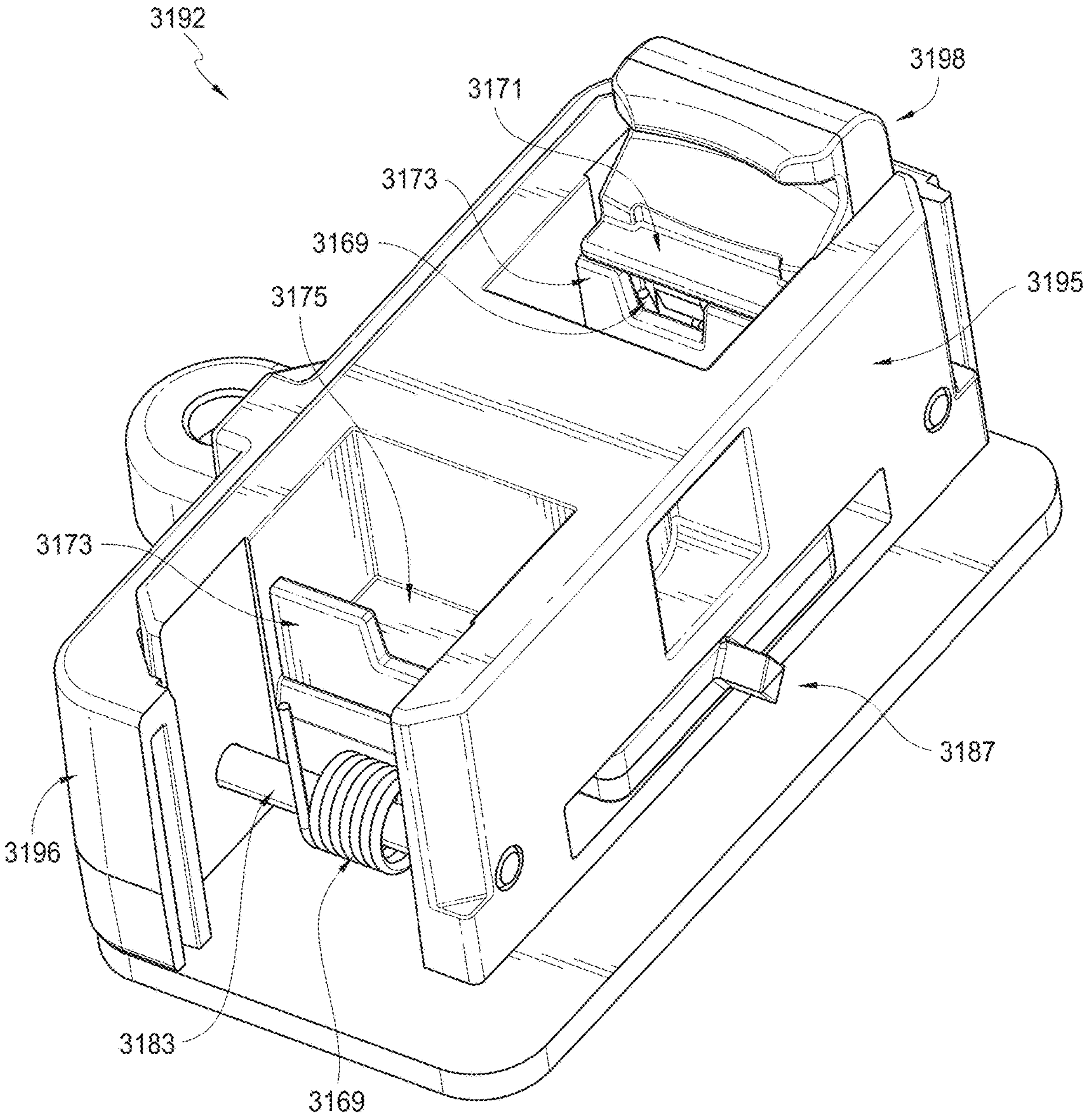
FIG. 31A shows a top front perspective view of a latch system with portions of the latch system removed.

FIG. 31A shows a top front perspective view of a latch system 3192 as described above. In FIG. 31, one half of the outer casing 3196, one of the plurality of latches 3198, and the plurality of stabilizers 3191 are removed to better view the inner structure 3195.

As seen in FIG. 31A, the inner structure 3195 can comprise a cavity or void in each side wherein the plurality of latches 3198 and the plurality of stabilizers (not seen in this view) can be positioned. The inner structure 3195 can comprise a shelf portion 3175 for receiving stabilizers (which can be shaped like a rectangular block). In some embodiments, the height of the shelf portion 3175 can be approximately half that of the inner structure 3195. In some embodiments, the shelf portion 3175 can be configured to allow the plurality of stabilizers (not seen in this view) to be positioned securely in the inner structure 3195.

In some embodiments, the shelf portion 3175 may have a notched wall 3173 adjacent thereto. In some embodiments, the notched wall 3173 is configured to engage a lip 3171 of the latch 3198. In some embodiments, moving the angular protrusion 3187 from the first position (not seen in this view) to the second position (not seen in this view) causes the notched wall 3173 to apply an upward force to the lip 3171 of the latch 3198 and assist in causing the latch 3198 to disengage from the bottom of the fluid dispenser (not seen in this view). In some embodiments, a spring 3169 can be disposed on each of the rotation pegs 3183. The springs 3169 may cause the latches 3198 to engage the bottom of the fluid dispenser (not seen in this view) upon the angular protrusion 3187 moving between positions.

Figure 31B:
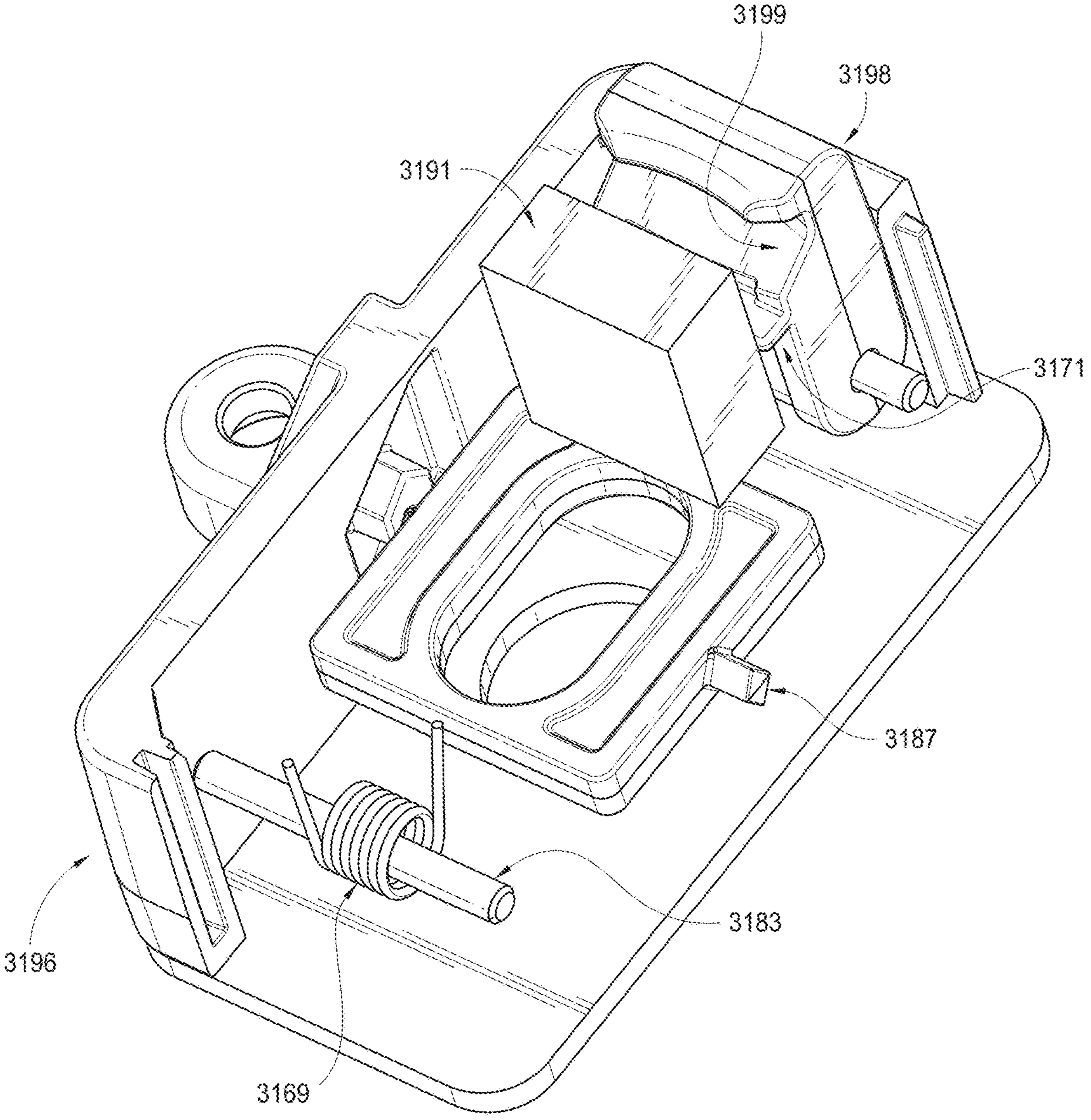
FIG. 31B shows another view of the latch system of FIG. 31A, with additional portions removed.

FIG. 31B shows a top front perspective view similar to FIG. 31A, but with the inner structure 3195 and a few other features removed for convenience. The angular protrusion 3187 has an opposite counterpart that is engaged in an angular cavity area similar to the area 3085 of FIG. 30, in a bottom central position 3079. This has the effect of retaining the inner structure (not shown) and the elements coupled to it in a lower position. The inner structure, removed in this view, can act as a carriage or connecting structure for several moving components. The angular protrusion 3187 and its associated catch element—which this view shows has a central elongate opening designed to accommodate a central spring—can move laterally with one degree of freedom (with respect to the inner structure or carriage that isn't shown here) within a slot such as the slot 2899 of FIG. 28. At the same time, the entire inner structure or carriage—see the structure 3195 of FIG. 31A—can be moving up and down (pushed up by a central spring, not shown, and pushed down by a user inserting a liquid dispenser) with a second degree of freedom that is generally transverse to that of the angular protrusion 3187. Under the constant upward force from a central spring pushing from below, the inner structure can move up and down within the vertical side walls of the outer casing 3196. However, as the angular protrusion 3187 follows the grooved path described above through the angular cavity area (see, e.g., the cavity 3085 of FIG. 30), its two stable positions include upper bounds. For example, the upper left position 3077 (see FIG. 30) interacts with angular protrusions 3187 to prevent the inner structure or carriage from popping up and completely out of the outer casing 3196. Thus, the carriage or inner structure moves cyclically up and down, while the angular protrusion 3187 and its associated catch element moves back and forth as the protrusion and its opposite counterpart each cycle around their grooved paths. The result is an inner structure or carriage having two stable positions, one higher, one lower. It can move between each of these positions in sequence, when pushed downward each time. The resulting non-downward movements (some upward, some lateral) of system components occur automatically as angled grooves guide the angular protrusions 3187 and a central spring constantly pushes upward.

These two positions (one up, one down) can correspond to two related positions (one inward and latched, one outward and unlatched) of the latches 3198. The vertical movement of the inner structure or carriage causes the latches 3198 to pivot about their rotation pegs 3183 such that the latches 3198 sequentially engage, then disengage with grooves at the base of a liquid dispenser. The immediate force that causes the latches to pivot outward and release a liquid dispenser comes from two mini springs 3169. As the liquid dispenser pushes the inner structure or carriage down from the position shown in FIG. 31B, it is freed to move farther upward into the next stable position. The springs 3169 can thus force the latches 3198 to lean farther back because the outer casing 3196 is relatively shorter and not constraining the latches 3198 within such a tall outer wall, which in turn allows the latches to lean farther back, urged by their respective mini springs 3169.

Figure 31C:
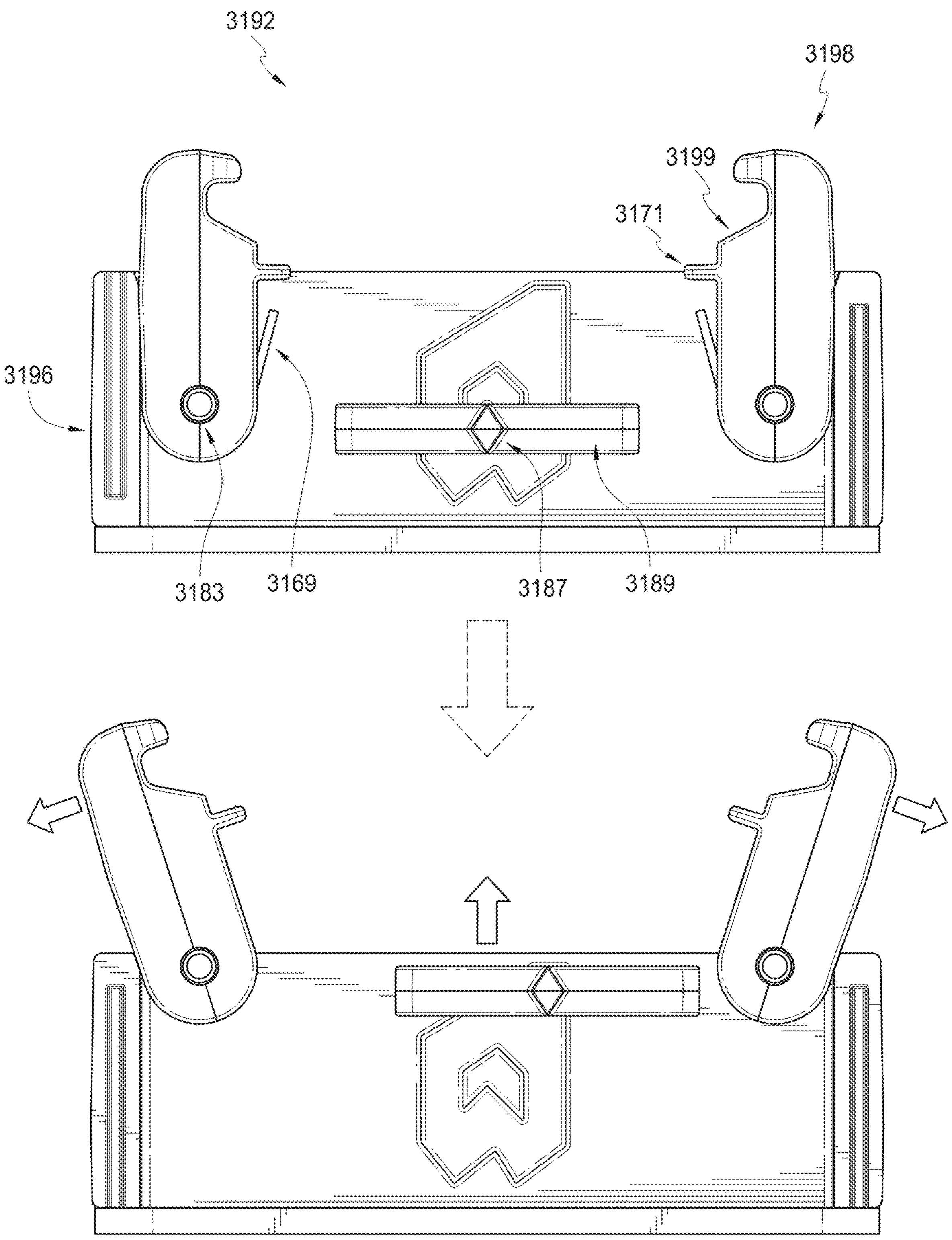
FIG. 31C shows two side views of a portion of the latch system of FIG. 31A, illustrating movement tending to release a liquid container from the latch system.

FIG. 31C shows two relative positions of the latches 3198 and the catch 3189, before and after the inner structure or carriage rises up with respect to the outer casing 3196. As this rise occurs, the angled surface 3199 in each latch 3198 smoothly pushes against and slides past a portion of the base of the liquid dispenser, and the latches 3198 lean farther and farther back, releasing the liquid dispenser (not shown). This increased backward lean is permitted as the inner structure or carriage rises up with respect to the outer casing 3196, exposing more and more of the back of the latch 3198. The mini springs 3169 are therefore able to push the latches 3198 to lean backward. In contrast, when a liquid dispenser pushes down on the inner structure or carriage (not shown in this figure), causing it to sink, side walls of the outer casing 3196 force the latches 3198 to lean increasingly inward, until they engage and latch into correlating grooves or lips of a liquid dispenser. When a user finishes pushing down on the dispenser, the angular protrusion 3187 of the catch 3189 is located within its stable lower position and prevents the inner structure or carriage from immediately rising up again under the influence of a central spring (not shown here). However, when a user pushes down again on the liquid dispenser, the angular protrusion is dislodged and the entire inner structure or carriage is allowed to once again rise up, releasing the liquid dispenser. This cyclical process can be repeated many times.

Figure 32:
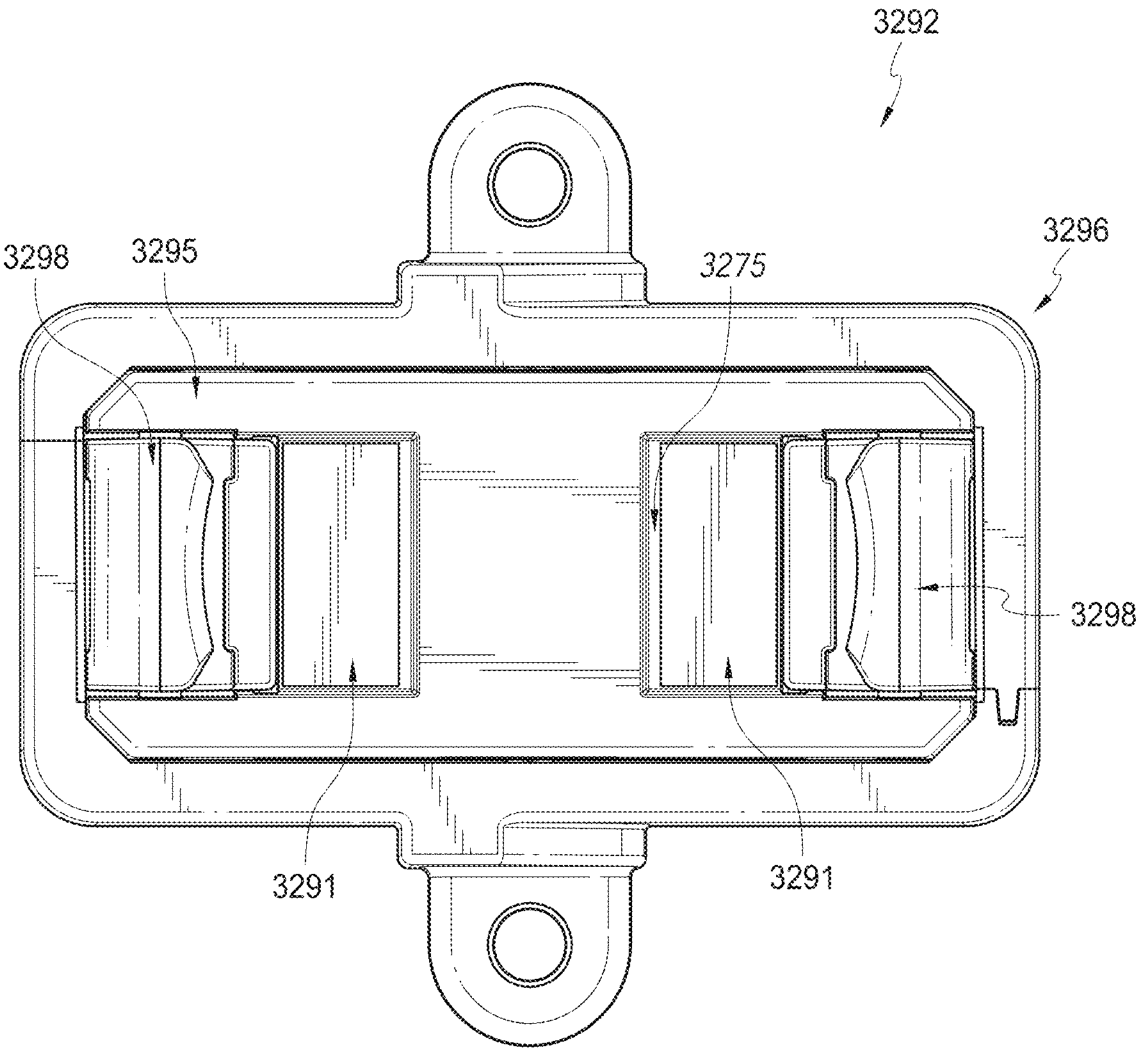
FIG. 32 is a top view of the latch system of FIG. 25.

FIG. 32 is a top view of a latch system 3292 as described in conjunction with the above embodiments. The carriage or inner structure 3295 is in a lower or latched position, and the latches 3298 are not leaning back. As seen in FIG. 32, the outer casing 3296 can comprise an opening that is substantially rectangular configured to snugly contain the carriage or inner structure 3295, with little to no space between the inner walls of the outer casing 3296 and the outer walls of the inner structure 3295. the plurality of stabilizers 3291 can be disposed on the shelf portions 3275 of the inner structure 3295.

Figure 33:
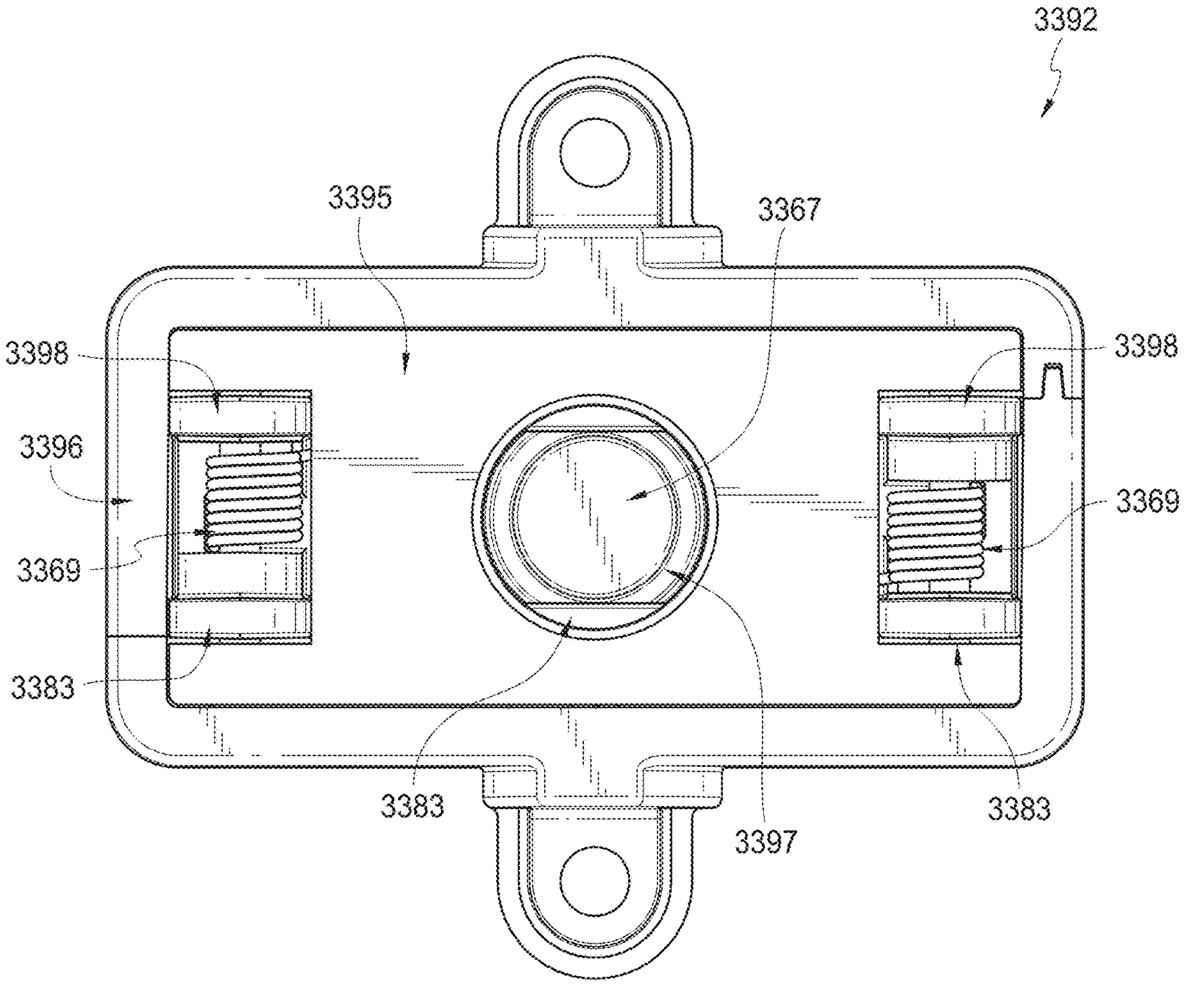
FIG. 33 is a bottom view of the latch system of FIG. 25.

FIG. 33 is a view from below of a latch system 3392 as described in conjunction with the above embodiments (but with a base plate removed—see the base plate 3093 in FIG. 30). As seen in FIG. 33, the plurality of latches 3298 and the springs 3369 can be secured to the inner structure 3295 through the use of rotation pegs 3383. Additionally, as seen in FIG. 33, the carriage or inner structure 3395 and the catch 3393 can comprise a hole 3397 configured to allow a central spring (not shown in this view) to be disposed within the hole 3397. The central spring may exert an upward force on a top surface 3367 of the carriage or inner structure 3395. The upward force exerted by the central spring may assist the plurality of angular 37rotrusions (not seen in this view) on the catch 3393 to move between stable positions as described above.

Figure 34:
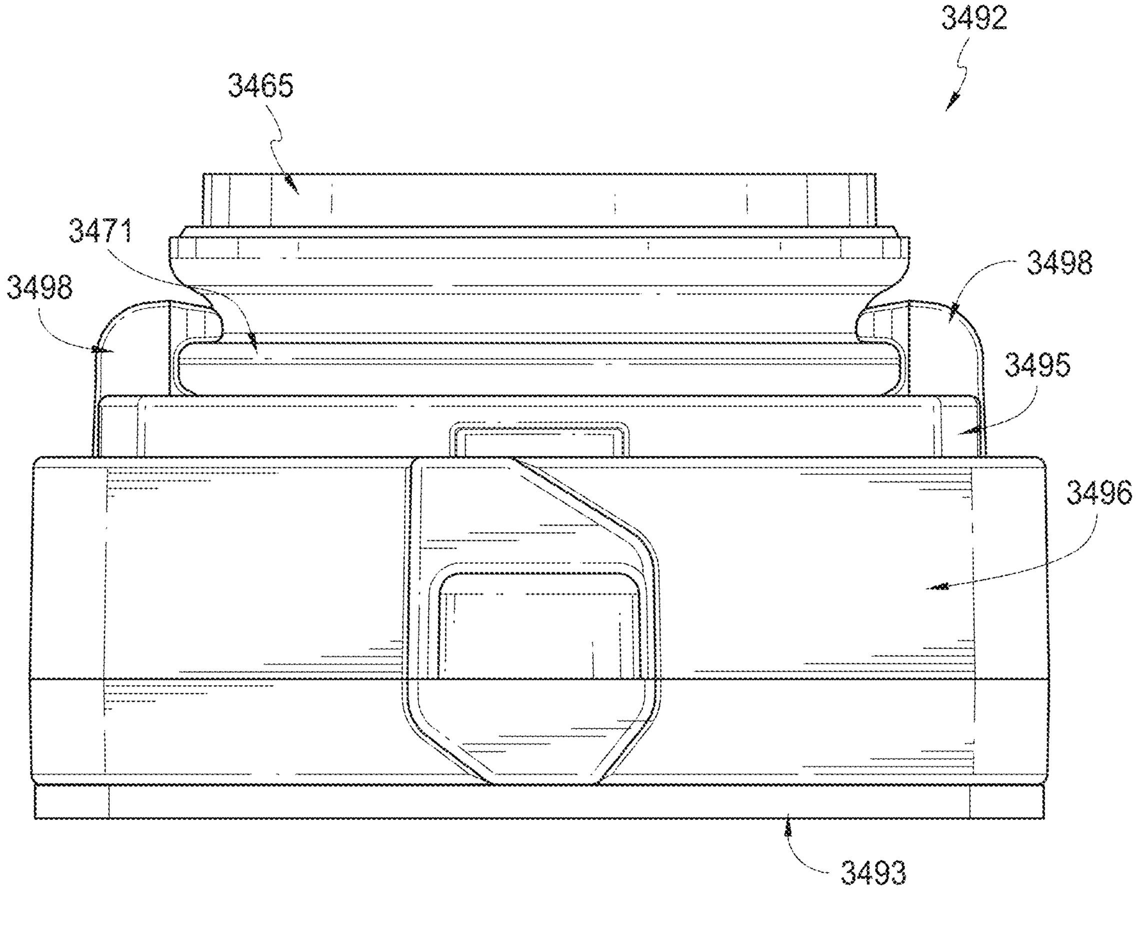
FIG. 34 is a side view of the latch system of FIG. 25 with an object being secured by the system.

FIG. 34 is a side view of a latch system 3492 as described in conjunction with the above embodiments. As shown in FIG. 34, the latch system 3492 can be configured to secure or release an object 3465. In some embodiments, the object 3465 can comprise a lip 3471 that is configured to be retained or released by the plurality of latches 3498. In some embodiments, the object 3465 can be the bottom or base of a fluid dispenser (e.g., connection feature 1970 at the bottom of the liquid dispenser 1908, as illustrated in FIG. 19).

Figure 35:
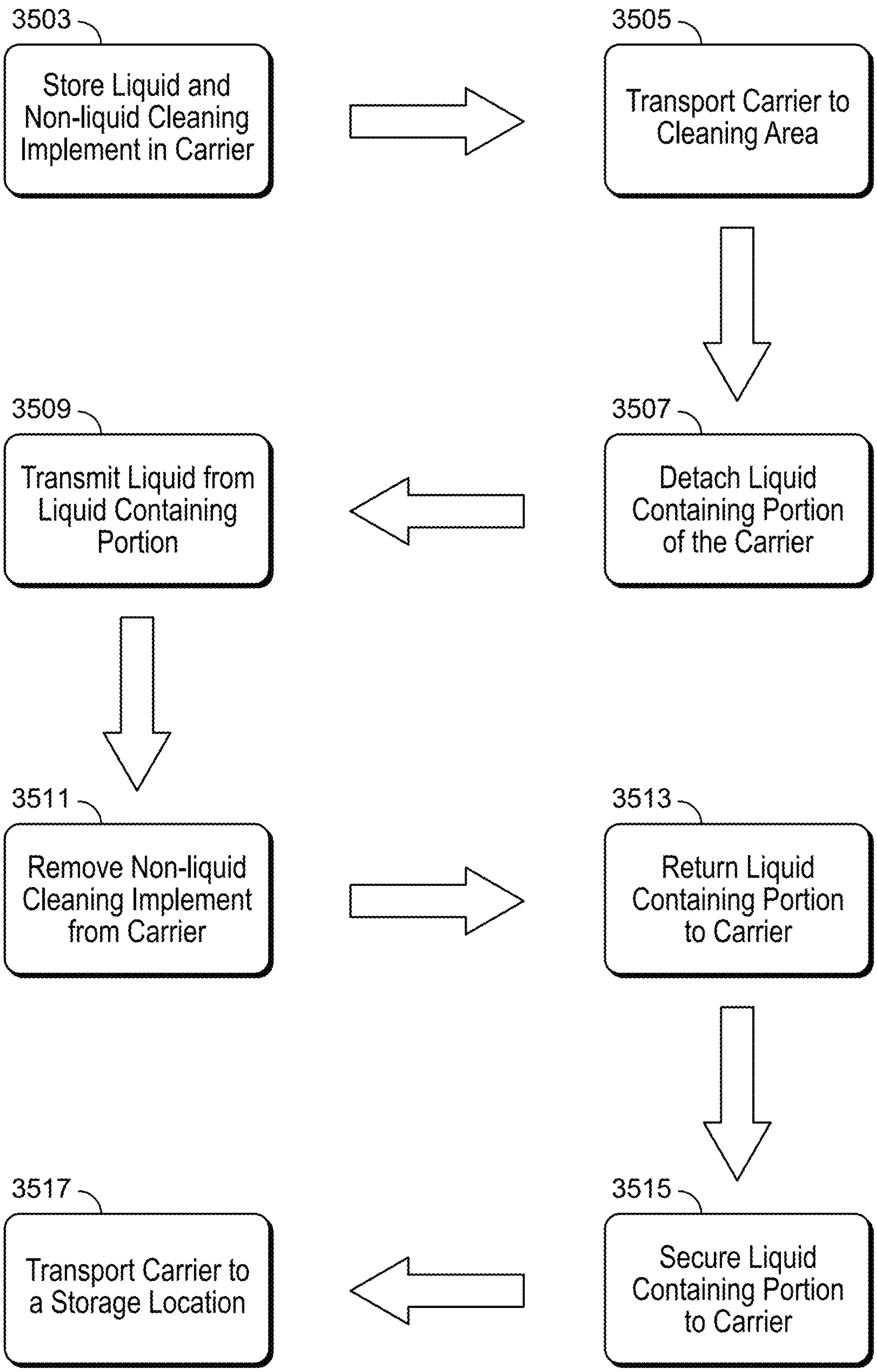
FIG. 35 shows a flow-chart detailing a method of deploying a cleaning device.

FIG. 35 shows a flow-chart detailing some steps of a method of deploying a cleaning device. As seen in FIG. 35, a liquid cleaning implement and a non-liquid implement can be stored in a component carrier at 3503. In some embodiments, the component carrier can be similar to the structure described above in other embodiments. The component carrier may include a base, a liquid dispenser holder, a liquid dispenser and a friction feature like those described above.

The liquid cleaning implement can be stored in a liquid containing portion of the component carrier. In some embodiments the liquid containing portion can be similar to the liquid dispenser described above. In some embodiments, the liquid containing portion can comprise the same elements as the liquid dispenser described above. For example. The liquid containing portion can comprise a nozzle, a straw, a spray trigger, The non-liquid cleaning implement can be stored on a liquid dispenser holder of the component carrier similar to embodiments described above. In some embodiments, the non-liquid cleaning implement can be a paper towel roll.

Once the cleaning implements have been stored, the component carrier can be transported to an area in need of cleaning at 3505. In some embodiments, the release of the liquid containing portion of the component carrier may take the form of a finger hook. In some embodiments, the component carrier can be transported with a single appendage (such as a finger) by using the finger hook to carry the component carrier.

Upon arriving at the area to be cleaned, the liquid containing portion of the carrier can be detached. The liquid containing portion can be detached from the component carrier by applying a downward force to a release of the liquid containing portion at 3507. After detaching the liquid containing portion from the carrier, a liquid cleaning implement can be transmitted from the liquid containing portion at 3509. The liquid can be transmitted through a nozzle of the liquid containing portion. The liquid can be transmitted by applying a downward force to a spray trigger of the liquid containing portion.

After the liquid is transmitted, a non-liquid cleaning implement can be removed from the carrier at 3511. In some embodiments, the non-liquid cleaning implement can be a paper towel roll. In some embodiments, the friction feature may apply a horizontal force to the paper towel roll such that a single paper towel can be removed with a single appendage.

After removing the non-liquid cleaning implement, the liquid containing portion can be returned to the component carrier and secured at 3513. At 3515, in some embodiments, the liquid containing portion can be secured to the component carrier by disposing the liquid containing portion within a liquid dispenser holder of the component carrier and applying a downward force to the liquid containing portion of the carrier.

After returning and securing the liquid containing portion to the component carrier, the component carrier can be returned to the carrier's original location or to a storage location at 3517. As described above, the component carrier can be transported using a single appendage by using the finger hook of the liquid containing portion.

The connection between the sprayer and paper towel holder described above can provide electrical, magnetic, or other benefits in addition to physical support. For example, a sprayer having any electronic components (e.g., an automated pump or spray action, a built-in clock, a built-in light, audio speaker, a refill sensor, etc.) can use the base attachment to recharge a batter through one or more wired or wireless charging connections. Thus, a base can have a larger battery that transfers energy to a smaller battery in the sprayer.

Terminology and Conclusion

Reference throughout this specification to "some embodiments" or "an embodiment" means that a particular feature, structure or characteristic described in connection with the embodiment is included in at least some embodiments. Thus, appearances of the phrases "in some embodiments" or "in an embodiment" in various places throughout this specification are not necessarily all referring to the same embodiment and may refer to one or more of the same or different embodiments. Furthermore, the particular features, structures or characteristics may be combined in any suitable manner, as would be apparent to one of ordinary skill in the art from this disclosure, in one or more embodiments.

As used in this application, the terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Similarly, it should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Rather, inventive aspects lie in a combination of fewer than all features of any single foregoing disclosed embodiment.

A number of applications, publications, and external documents may be incorporated by reference herein. Any conflict or contradiction between a statement in the body text of this specification and a statement in any of the incorporated documents is to be resolved in favor of the statement in the body text.

Terms of equality and inequality (less than, greater than) are used herein as commonly used in the art, e.g., accounting for uncertainties present in measurement and control systems. Thus, such terms can be read as approximately equal, approximate less than, and/or approximately greater than.

While the embodiments of the invention disclosed herein are presently considered to be preferred, various changes and modifications can be made without departing from the scope of the invention. Although described in the illustrative context of certain preferred embodiments and examples, it will be understood by those skilled in the art that the disclosure extends beyond the specifically described embodiments to other alternative embodiments and/or uses and obvious modifications and equivalents. Thus, it is intended that the scope of the claims which follow should not be limited by the particular embodiments described above. The scope of the invention is indicated in the appended claims, and all changes that come within the meaning and range of equivalents are intended to be embraced therein.

We claim:

1. A binary attachment mechanism for liquid dispensers, the mechanism comprising:

an active trigger zone configured to be triggered by a liquid dispenser;

one or more retainer structures configured to sequentially engage and release the liquid dispenser; and an interaction complex connecting the trigger zone to the one or more retainer structures;

wherein the one or more retainer structures form part of a paper towel holder and are configured to engage the liquid dispenser with sufficient strength and stability that the liquid dispenser can serve as a carrying handle to support the paper-towel holder and a paper towel roll.

2. The mechanism of claim 1, wherein the interaction complex comprises a latch carriage.

3. The mechanism of claim 2, wherein the first function comprises engaging or releasing the liquid dispenser.

4. The mechanism of claim 2, wherein interaction complex further comprises at least one spring configured to urge vertical movement of the latch carriage and the mechanism comprises at least one spring configured to urge lateral movement of the one or more retainer structures.

5. The mechanism of claim 1, wherein an initial activation of the trigger zone causes the one or more retainer structures to perform a first function.

6. The mechanism of claim 5, wherein a subsequent activation of the trigger zone causes the one or more retainer structures to perform a second function reversing the first function.

7. The mechanism of claim 5, wherein the second function comprises releasing or securing the liquid dispenser.

8. The mechanism of claim 7, wherein the central spring is further configured to cause the active trigger zone to re-position the active trigger zone and thereby configure the active trigger zone for a second triggering after the active trigger zone is triggered an initial time.

9. The mechanism of claim 7, wherein, when the one or more retainer structures are securing the liquid dispenser, they do so with sufficient strength and stability that the liquid dispenser can serve as a carrying handle.

10. The mechanism of claim 1, further comprising:

a base; and a central spring connected to the base and configured to exert an upward force tending to raise the active trigger zone.

11. The mechanism of claim 1, wherein the active trigger zone is configured to:

securely attach the liquid dispenser to a support base when the liquid dispenser is pushed downward onto the active trigger zone; and to release the liquid dispenser from the support base when the liquid dispenser is pushed downward again toward the active trigger zone.

12. The mechanism of claim 1, wherein the one or more retainer structures configured to sequentially engage and release the liquid dispenser comprise a latch with at least one transverse penetrating element.

13. The mechanism of claim 1, wherein the one or more retainer structures comprise two hooks configured for two positions: one secured position following inward hook movement to grasp and retain the liquid dispenser, and one released position following outward hook movement to release the liquid dispenser.

14. The mechanism of claim 13, wherein the one or more retainer structures further comprise at least two resilient components configured to enable movement in both vertical and transverse directions.

15. The mechanism of claim 1, wherein the interaction complex connecting the trigger zone to the one or more retainer structures comprises a binary latch and supports the active trigger zone such that this zone can be used to actuate the latch from above using pressure from the liquid dispenser.

16. An attachment for paper towel and liquid dispensers, the attachment comprising:

a trigger zone configured to be triggered by a liquid dispenser;

one or more retainers configured to sequentially engage and release the liquid dispenser; and a connector connecting the trigger zone to the one or more retainer structures and comprising a binary latch supporting the trigger zone such that the trigger zone can be used to actuate the latch using pressure from the liquid dispenser.

17. A paper towel and liquid dispenser holder comprising:

a trigger zone configured to be triggered by a liquid dispenser;

one or more retainers configured to sequentially engage and release the liquid dispenser;

a connector comprising at least one spring configured to urge vertical movement of the connector; and at least one spring configured to urge lateral movement of the retainers.

18. An attachment comprising:

a trigger zone configured to be triggered by a liquid dispenser;

one or more retainers forming part of a paper towel holder and configured to engage and release the liquid dispenser such that the liquid dispenser can serve as a carrying handle to support the paper-towel holder and a paper towel roll; and a connector connecting the trigger zone to the one or more retainers.

19. The attachment of claim 18, wherein the connector comprises a latch carriage.

20. The attachment of claim 18, wherein an initial activation motion of the trigger zone causes the one or more retainers to release the liquid dispenser.

21. The attachment of claim 20, wherein a subsequent activation of the trigger zone causes the one or more retainers to secure the liquid dispenser.

22. The attachment of claim 18, further configured such that a same motion or force provided by a user at the trigger zone can both secure and release the liquid dispenser to and from the paper towel.

23. The attachment of claim 18, further comprising a base and a central spring connected to the base and configured to exert an upward force tending to raise the trigger zone.

24. The attachment of claim 23, wherein the central spring is further configured to cause the trigger zone to re-position the trigger zone and thereby configure the trigger zone for a second triggering after the trigger zone is triggered an initial time.

* * * * *